United States Patent [19]
Jones et al.

[11] 4,091,271
[45] May 23, 1978

[54] VALIDATOR FOR SCRIP

[75] Inventors: Thaddeus M. Jones, South Bend, Ind.; Hasmukh R. Shah; Charles D. Nash, both of Hot Springs, Ark.

[73] Assignee: UMC Industries, Inc., New York, N.Y.

[21] Appl. No.: 642,620

[22] Filed: Dec. 19, 1975

Related U.S. Application Data

[62] Division of Ser. No. 432,429, Jan. 10, 1974, Pat. No. 3,937,926.

[51] Int. Cl.² .................. G06K 13/08; H01H 47/00; G06F 7/02
[52] U.S. Cl. ................................. 235/419; 235/480; 361/172
[58] Field of Search ............... 340/149 R, 149 A; 194/4 E; 317/134; 235/61.11 R, 61.11 E, 61.11 D, 61.7 B, 61.7 R

[56] References Cited

U.S. PATENT DOCUMENTS

| | | | |
|---|---|---|---|
| 3,245,534 | 4/1966 | Smith | 194/4 E |
| 3,619,728 | 11/1971 | Cooper | 317/134 |
| 3,673,389 | 6/1972 | Kapsambelis | 235/61.11 R |
| 3,700,858 | 10/1972 | Murthy | 340/146.3 Z |
| 3,701,097 | 10/1972 | Wolff | 235/61.11 E |
| 3,740,530 | 6/1973 | Hoffer | 235/61.7 B |
| 3,761,685 | 9/1973 | Alpert | 235/61.12 R |
| 3,781,805 | 12/1973 | O'Neal | 340/149 R |

*Primary Examiner*—Robert M. Kilgore
*Attorney, Agent, or Firm*—Rogers, Eilers & Howell

[57] ABSTRACT

A piece of scrip is engraved or printed with groups of patterns which can be sensed by a validator for scrip and one of those groups of patterns will define a code which will permit that piece of scrip to be accepted only by a scrip validator or by scrip validators which have that same code stored therein. Two additional groups of patterns define codes which can cause that scrip validator or those scrip validators to automatically respond to the codes stored therein to actuate price-determining relays within a vending machine. Each pattern is formed by a number of spaced parallel lines, and the various patterns on a piece of scrip can be given different identities merely by changing the spacing between the trailing edges of those spaced parallel lines. The patterns in each group of patterns will be sensed in a prescribed sequence, and the sequentially-sensed patterns in any of those groups of patterns can be given various identities. As a result, the scrip validator of the present invention can accept a piece of scrip which has a given number of patterns of specifically-different identities and yet reject a piece of scrip which has those same patterns arranged in a different sequence. In this way, the present invention makes it possible to use permutations, rather than mere combinations, of potentially-usable pattern identities, and thus makes it possible to use just fifteen specifically-different pattern identities to make thirty-two thousand seven hundred and sixty different pieces of scrip. The scrip validator of the present invention stores the codes, which correspond to the codes defined by the patterns on the piece of scrip, in serially-shifted shift registers; and, as each pattern on the piece of scrip is sensed by the scrip validator, the data within the shift registers is serially shifted a plurality of times. The identity of any given pattern can be determined by three signals; and, by utilizing serially-shifted shift registers which have seven or more stages, the present invention enables each shift register to store the pattern-identifying data for at least two patterns. In addition, the serial shifting of the shift registers permits the pattern-identifying data for the various patterns to be presented in fixed sequences. Moreover, by merely changing some of the connections to the input terminals of the shift registers, it is possible to change the codes stored within those shift registers. The frequency which identifies each pattern is sensed by the combination of a digital filter and a counter; and such a combination provides a strict test of the identification of each pattern because it requires the frequency which corresponds to the spacing of the trailing edges of the lines of that pattern to match the frequency of the digital filter, and it also requires that pattern to have a minimum number of lines which have that same spacing.

28 Claims, 26 Drawing Figures

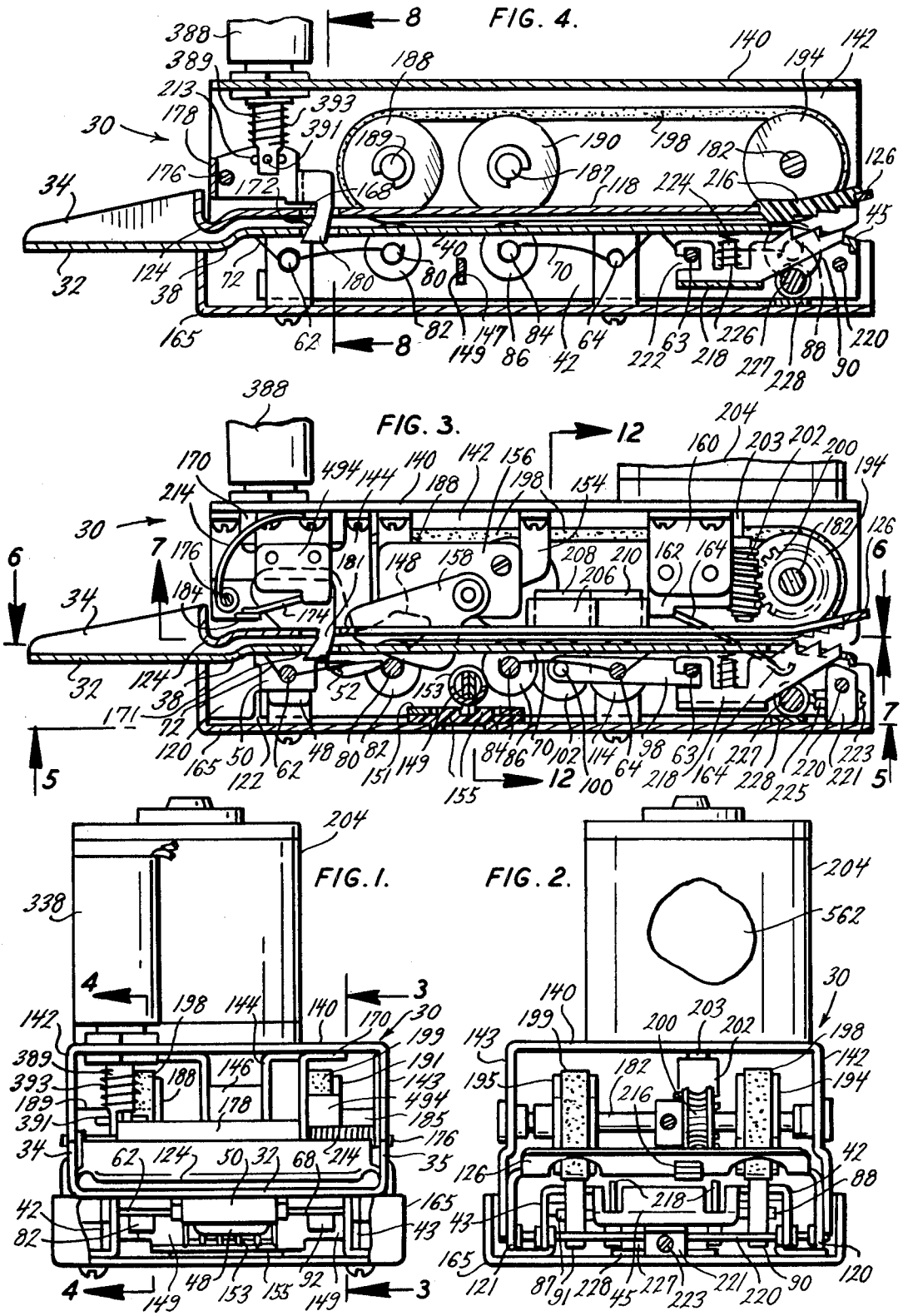

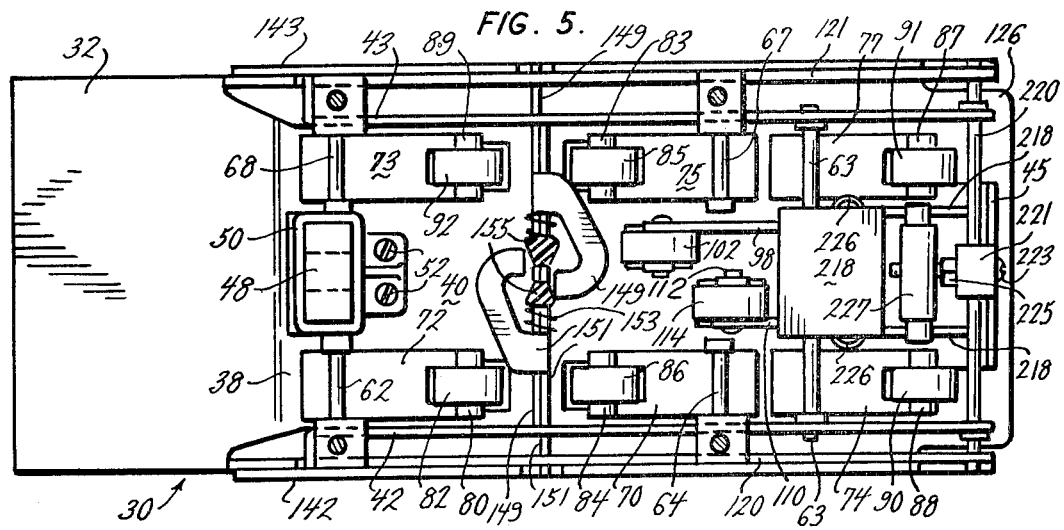
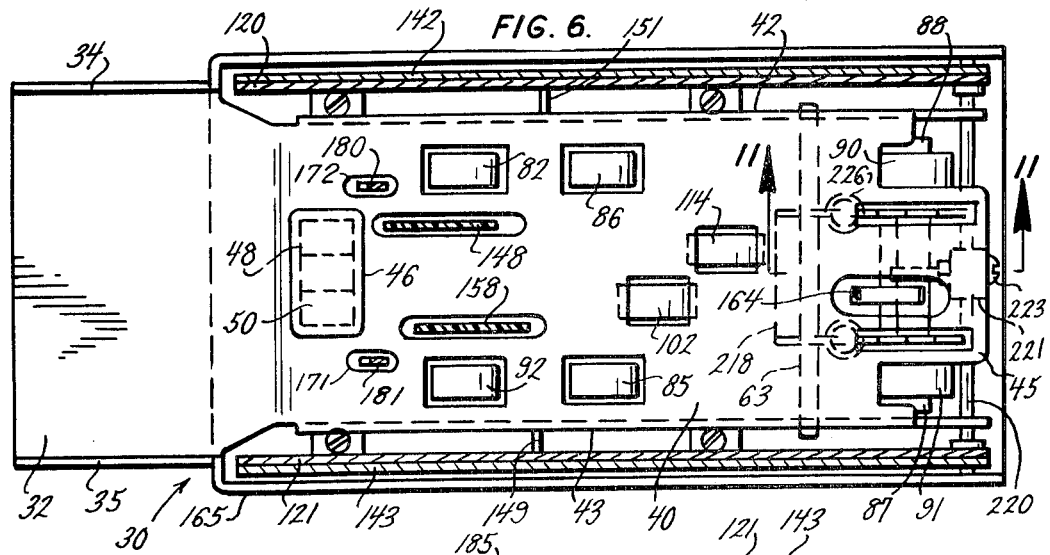
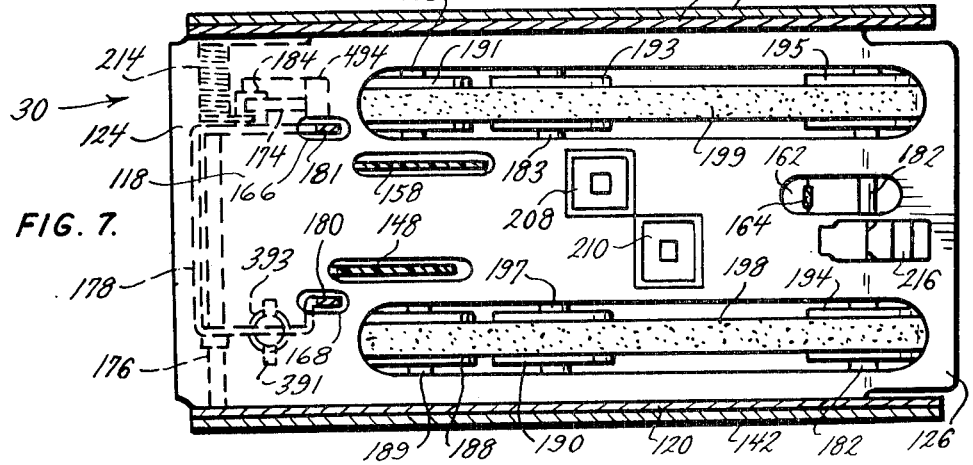

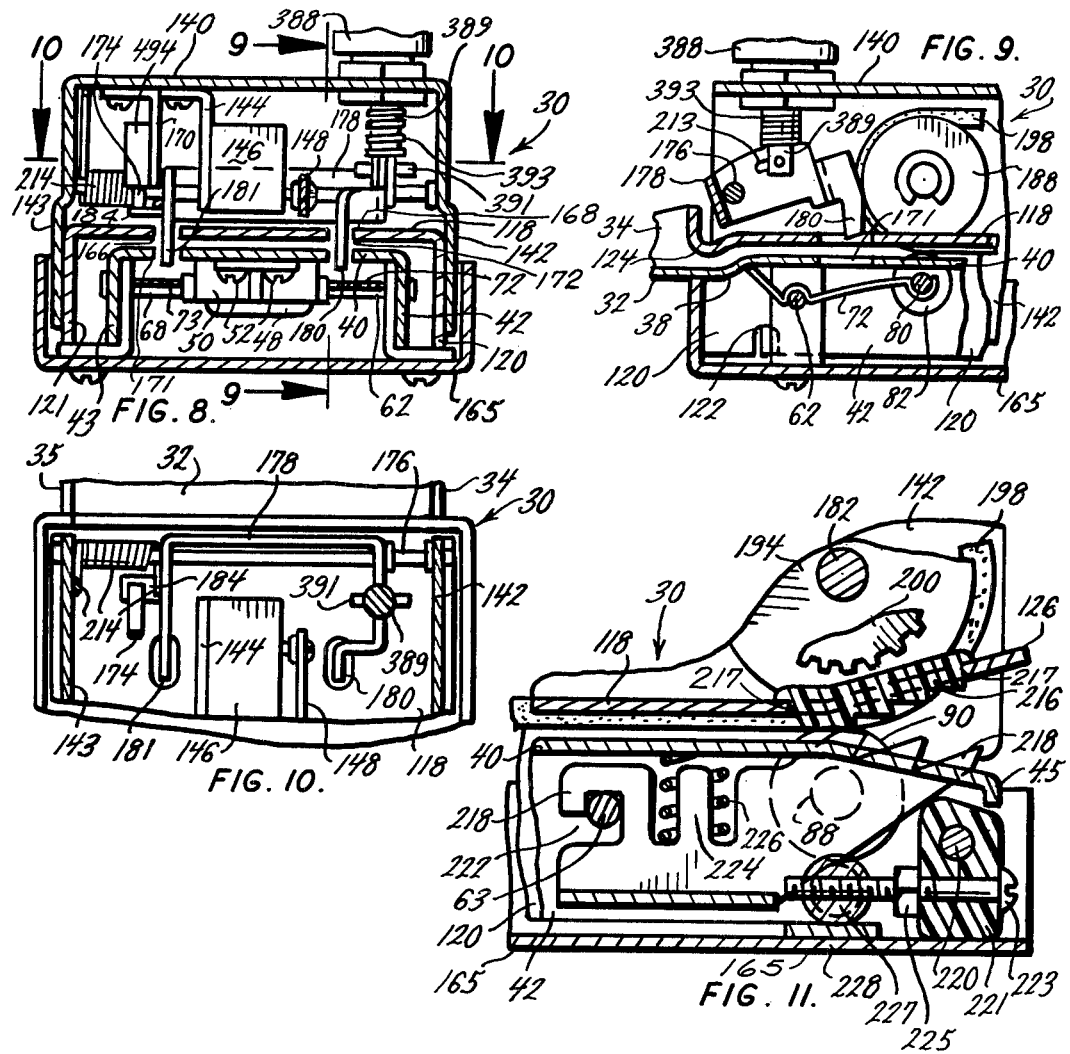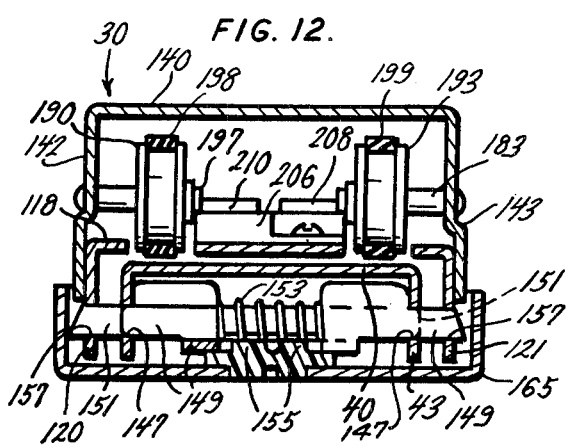

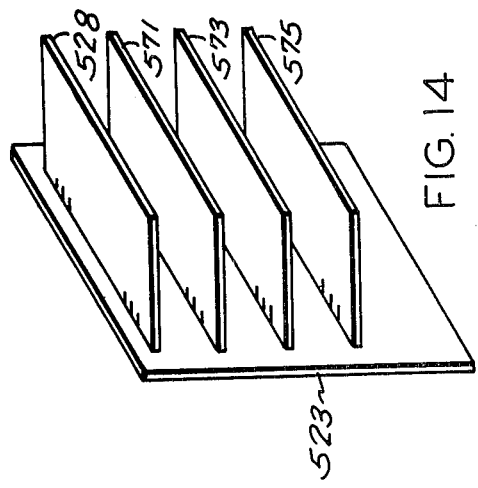
FIG. 14
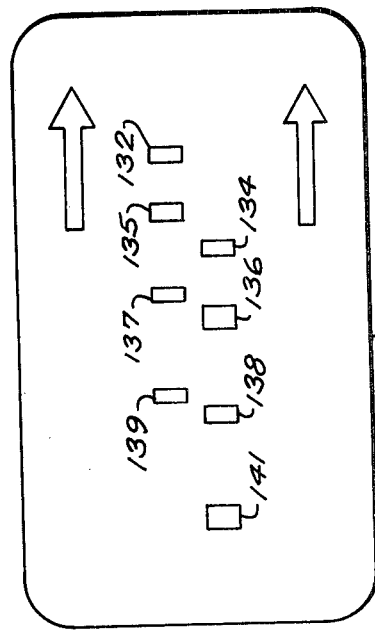
FIG. 13
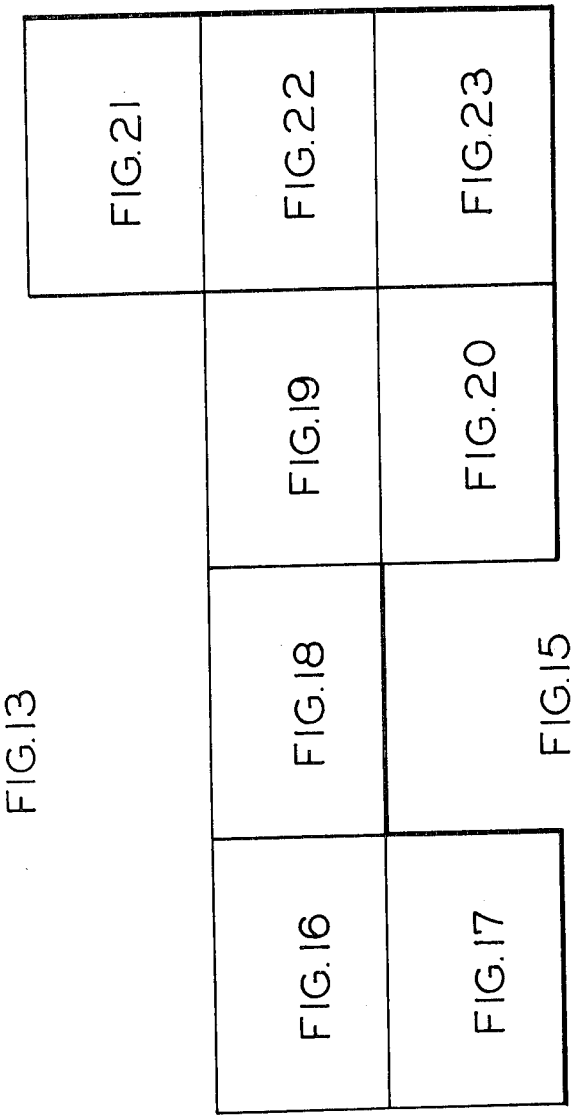

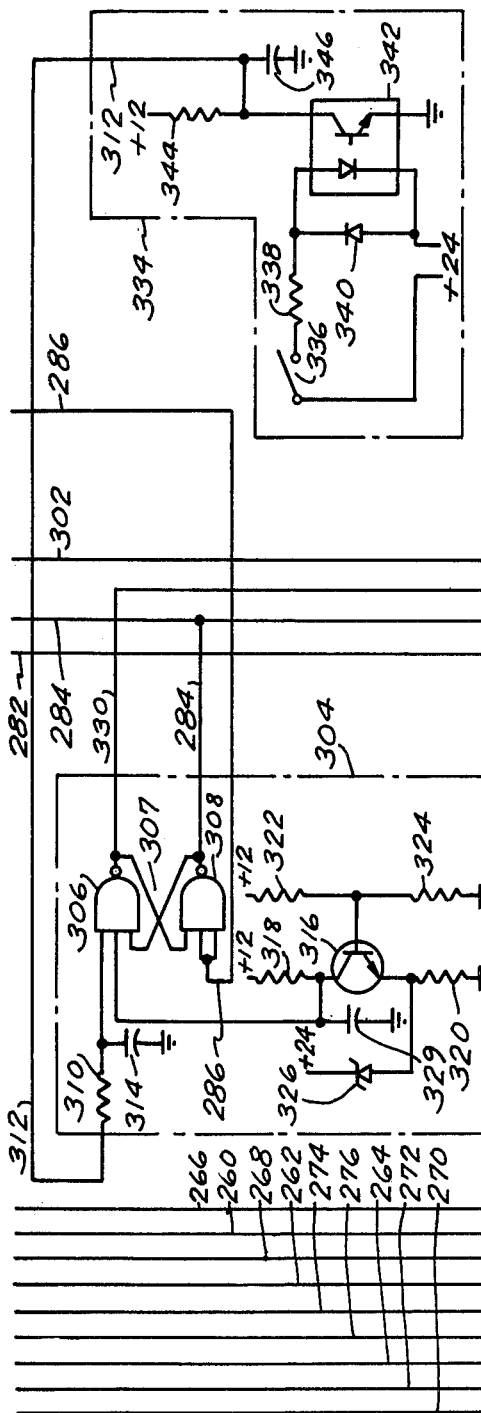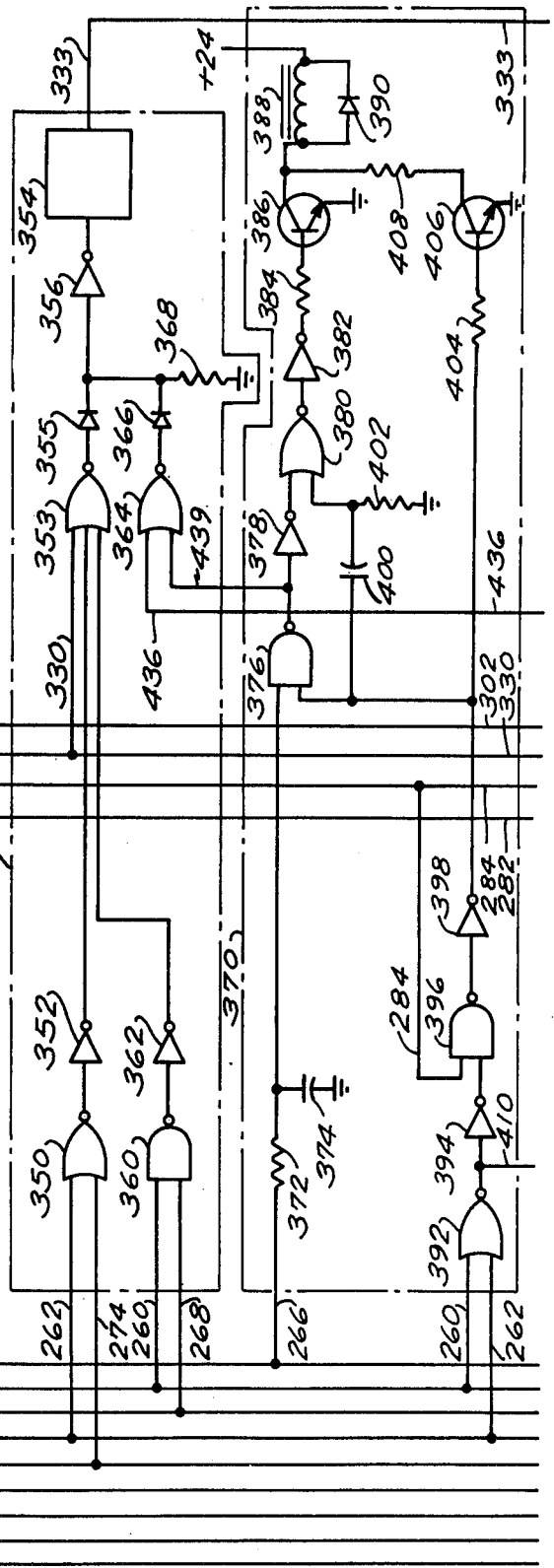
FIG. 22

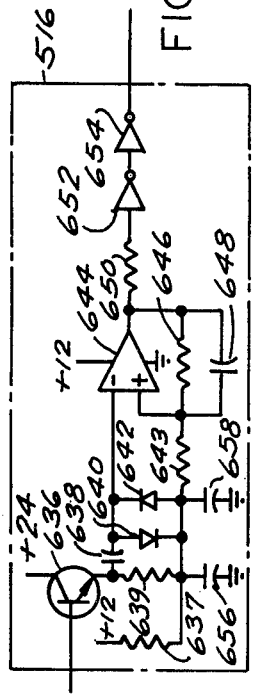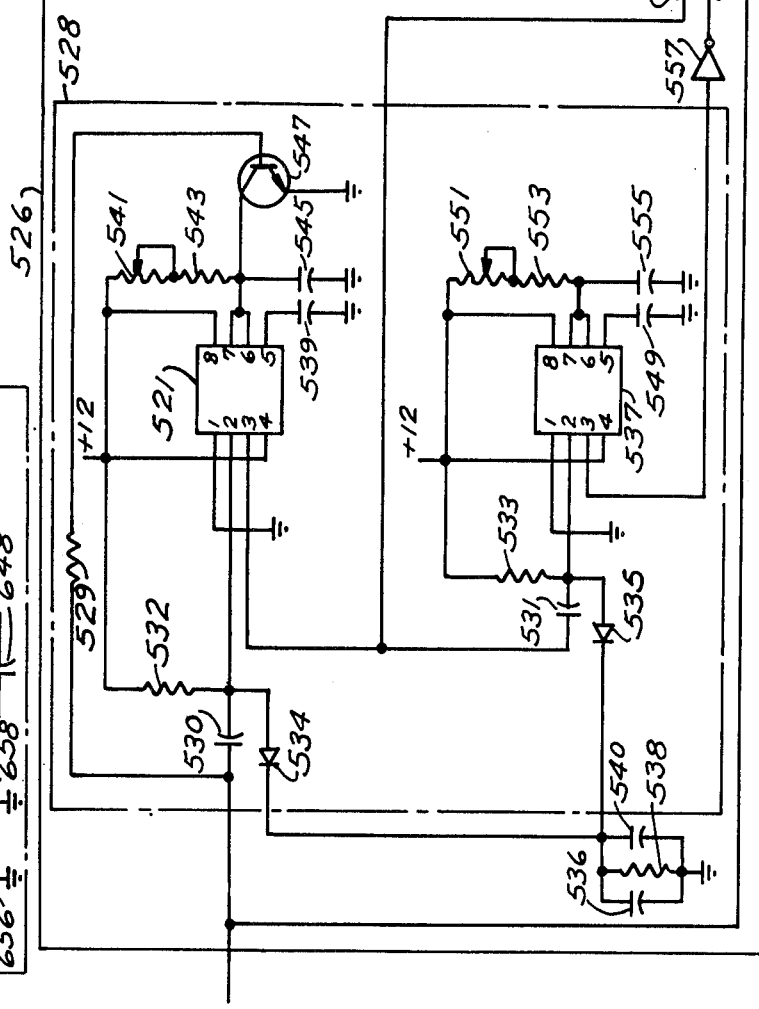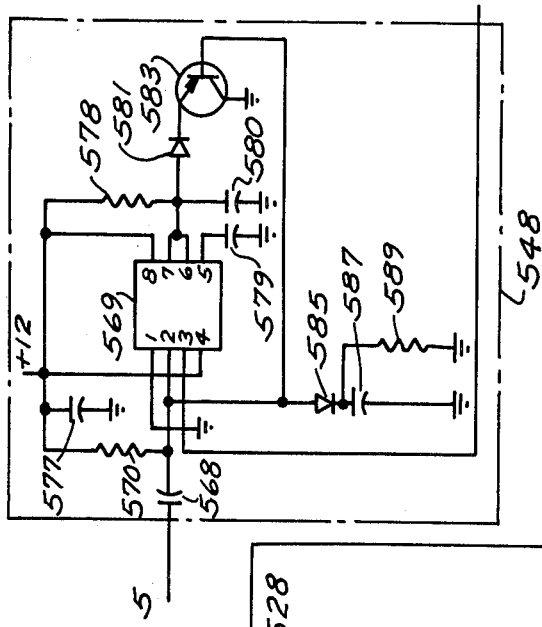
FIG. 26
FIG. 24
FIG. 25

VALIDATOR FOR SCRIP

This is a division, of application Ser. No. 432,429 filed Jan. 10, 1974, now U.S. Pat. No. 3,931,926.

FIELD OF THE INVENTION

The use of one dollar and of higher denomination bills to actuate dispensing machines is becoming progressively popular. However, there are some situations where it is desirable to use scrip rather than money to effect the dispensing of a desired product, material or service. Where scrip is used, an exceptionally high degree of selectivity must be incorporated into the validator for that scrip, because there is far less risk of legal repercussions in the simulating of scrip than there is in the simulating of currency of the United States. The present invention relates to scrip validators which can provide a high degree of selectivity.

SUMMARY OF THE INVENTION

The piece of scrip that is provided by the present invention is engraved or printed with groups of patterns which can be sensed by a validator for scrip; and one of those groups of patterns will define a code which will permit that piece of scrip to be accepted only by a scrip validator or by scrip validators which have that same code stored therein. Two additional groups of patterns define codes which can cause that scrip validator or those scrip validators to automatically respond to the codes stored therein to actuate price-determining relays within a vending machine. It is, therefore, an object of the present invention to provide a piece of scrip which has a number of groups of patterns thereon, which uses one of those groups of patterns to restrict the use of that piece of scrip to a specific scrip validator or to a specific group of scrip validators, and which uses additional of those groups of patterns to cause that scrip validator or those scrip validators to automatically respond to the codes stored therein to actuate price-determining relays within a vending machine.

Each pattern is formed by a number of spaced parallel lines, and the various patterns on a piece of scrip can be given different identities merely by changing the spacing between the trailing edges of those spaced parallel lines. The patterns in each group of patterns will be sensed in a prescribed sequence, and the sequentially-sensed patterns in any of those groups of patterns can be given various identities. As a result, the scrip validator of the present invention can accept a piece of scrip which has a given number of patterns of specifically-different identities and yet reject a piece of scrip which has those same patterns arranged in a different sequence. In this way, the present invention makes it possible to use permutations, rather than mere combinations, of potentially-usable pattern identities, and thus makes it possible to use just fifteen specificallydifferent pattern identities to make thirty-two thousand seven hundred and sixty different pieces of scrip. It is, therefore, an object of the present invention to provide pieces of scrip which have the patterns thereon formed by spaced parallel lines and to provide a scrip validator which senses the patterns on each piece of scrip in a prescribed sequence and hence can distinguish between pieces of scrip which use the same patterns in different positions thereon.

The scrip validator of the present invention stores the codes, which correspond to the codes defined by the patterns on the piece of scrip in serially-shifted shift registers; and, as each pattern on the piece of scrip is sensed by the scrip validator, the data within the shift registers is serially shifted a plurality of times. The identity of any given pattern can be determined by three signals; and, by utilizing serially-shifted shift registers which have seven or more stages, the present invention enables each shift register to store the pattern-identifying data for at least two patterns. In addition, the serial shifting of the shift registers permits the pattern-identifying data for the various patterns to be presented in fixed sequences. Moreover, by merely changing some of the connections to the parallel and serial input terminals of the shift registers, it is possible to change the codes stored within those shift registers. It is, therefore, an object of the present invention to provide a scrip validator which stores the codes, that correspond to the codes defined by the patterns on the piece of scrip, in serially-shifted shift registers and to serially shift those shift registers a plurality of times as each pattern is being sensed.

The shift registers of the present invention are provided with data-converting subcircuits which will shift new data into those shift registers during the sensing of the patterns on a piece of scrip. Those data-converting subcircuits act to increase the code-storing capabilities of those shift registers. It is, therefore, an object of the present invention to provide a scrip validator wherein the shift registers are provided with data-converting sub-circuits which increase the code-storing capabilities of those shift registers.

A person who makes a simulation of an authentic U.S. bill exposes himself to serious legal repercussions, but a person who simulates a piece of scrip does not expose himself to such serious legal repercussions. Consequently, to be practical, a scrip validator must not only be highly selective but must be capable of being quickly and easily reprogrammed. The scrip validator of the present invention has a number of frequency-sensing circuits; and those circuits are grouped so some of them respond to one set of patterns on each piece of scrip and so the others respond to a second set of patterns on each piece of scrip. Those are made as plug-in boards which are interchangeable with each other. If one or more persons develop a piece of scrip which will be accepted by the scrip validator, it is only necessary to replace the frequency-sensing circuits for the one set of patterns on each piece of scrip with the frequency-sensing circuits for the second set of patterns on each piece of scrip and vice versa; and, at such time, that scrip validator will effectively reject that piece of scrip. It is, therefore, an object of the present invention to provide a scrip validator which has a number of frequency-sensing circuits that are made as plug-in boards which are interchangeable with each other and which are grouped so some of them respond to one set of patterns on each piece of scrip and so the others respond to a second set of patterns on each piece of scrip.

In the scrip validator of the present invention, the frequency which identifies each pattern is sensed by the combination of a digital filter and a counter. The digital filter could not provide sufficient security for the scrip validator if it was the sole test of the identity of a pattern on a piece of scrip; because the first pulse of a given frequency will set that digital filter, and then the second pulse of that same frequency would cause that digital filter to develop an output. This means that if a digital filter was used as the sole test of the identity of a pattern on a piece of scrip, any two properly-spaced lines on a piece of scrip could be accepted by that digital filter. By providing the combination of a digital filter and a counter, the scrip validator of the present invention provides a strict test of the identification of each pattern because it requires the frequency which corresponds to the spacing of the trailing edges of the lines of that pattern to match the frequency of the digital filter, and it also requires that pattern to have a minimum number of lines which have that same spacing. It is, therefore, an object of the present invention to provide a scrip validator wherein the frequency which identifies each pattern is sensed by the combination of a digital filter and a counter.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a partially broken-away partially-sectioned front elevational view of one preferred embodiment of scrip transport which can be used as part of the scrip validator of the present invention, FIG. 2 is a rear elevational view of the scrip transport of FIG. 1, FIG. 3 is a vertical section through the scrip transport of FIGS. 1 and 2, and it is taken along the plane indicated by the line 3—3 in FIG. 1, FIG. 4 is another vertical section through the scrip transport of FIGS. 1 and 2, and it is taken along the plane indicated by the line 4—4 in FIG. 1, FIG. 5 is a horizontal section through the scrip transport of FIGS. 1 and 2, and it is taken along the plane indicated by the line 5—5 in FIG. 3, FIG. 6 is another horizontal section through the scrip transport of FIGS. 1 and 2, and it is taken along the plane indicated by the line 6—6 in FIG. 3, FIG. 7 is a further horizontal section through the scrip transport of FIGS. 1 and 2, and it is taken along the plane indicated by the line 7—7 in FIG. 3, FIG. 8 is a further vertical section through the scrip transport of FIGS. 1 and 2, and it is taken along the plane indicated by the line 8—8 in FIG. 4, FIG. 9 is a still further vertical section through the scrip transport of FIGS. 1 and 2, and it is taken along the plane indicated by the line 9—9 in FIG. 8, FIG. 10 is a still further horizontal section through the scrip transport of FIGS. 1 and 2, and it is taken along the plane indicated by the line 10—10 in FIG. 8, FIG. 11 is a vertical section, on a larger scale, through the rear portion of the scrip transport of FIGS. 1 and 2, and it is taken along the plane indicated by the line 11—11 in FIG. 6, FIG. 12 is yet another vertical section through the scrip transport of FIGS. 1 and 2, and it is taken along the broken plane indicated by the broken line 12—12 in FIG. 3, FIG. 13 is a plan view of a piece of scrip which has eight patterns thereon, FIG. 14 is a perspective view of four frequencysensing circuits which are made as printed circuit boards and of a board into which they are plugged, FIG. 15 shows the relative positions which FIGS. 16–23 occupy when they are placed to display the circuit of the scrip validator, FIGS. 16–23 are portions of the circuit of the scrip validator, FIG. 24 is a detailed showing of the PEAK DETECTOR block in FIG. 16, FIG. 25 is a detailed showing of one of the FREQUENCY DETECTOR blocks of FIG. 16, and FIG. 26 is a detailed showing of the ENVELOPE DETECTOR block of FIG. 16.

DESCRIPTION OF SCRIP TRANSPORT

Figure 16:
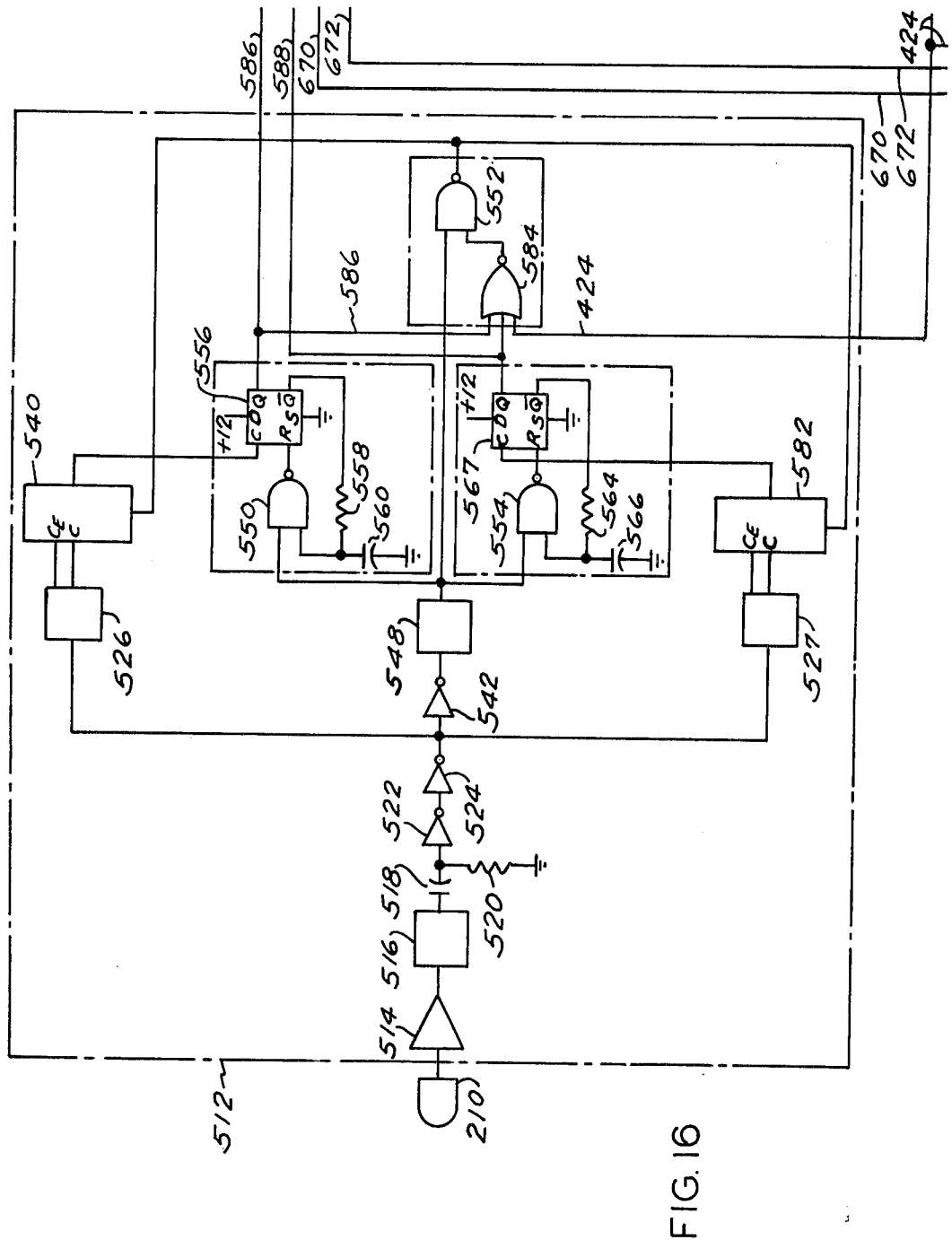

Referring to FIGS. 1–12, the numeral 30 generally denotes one preferred embodiment of scrip transport that is made in accordance with the principles and teachings of the present invention. The numeral 32 denotes a platform which extends outwardly from the front of that scrip transport; and that platform will receive the leading edge of each piece of scrip which is to be tested by the scrip validator of which that scrip transport is a part. A flange 34 and a flange 35 of generally triangular configurations extend upwardly from the sides of the platform 32; and that platform has an upwardly-inclined inner end 38 which merges into a platen 40. An elongated flange 42 and an elongated flange 43 extend downwardly from the elongated sides of the platen 40. The numeral 45 denotes the trailing edge of the platen 40; and that trailing edge inclines downwardly and then terminates in a vertically-directed lip, as shown by FIGS. 3 and 4.

The numeral 62 denotes a headed pin which is secured to the flange 42 and which is adjacent the front of the scrip transport 30. The numeral 64 denotes a further headed pin which is supported by the flange 42 and which is spaced to the right of the headed pin 62. The numeral 63 denotes an elongated pivot which is secured to the flanges 42 and 43 and which is spaced to the right of the headed pin 64.

The numeral 67 denotes a headed pin which is secured to the flange 43 and which is in register with the headed pin 64, and the numeral 68 denotes a headed pin which is secured to the flange 43 and which is in register with the headed pin 62, all as shown by FIG. 5.

The numeral 70 denotes a leaf-type spring which is bent so the right-hand end thereof inclines upwardly to bear against the under surface of the platen 40. That spring is bent to have a downwardly-opening saddle which rests upon the headed pin 64, to have an elongated portion which inclines upwardly and to the left from that saddle, and to have a bifurcated left-hand end with fingers that define an upwardly-opening saddle. The numerals 72 and 74 denote springs which can be identical to the spring 70; but the bifurcated ends of those springs extend to the right rather than to the left in FIGS. 4 and 5. The downwardly-opening saddle of spring 72 rests upon the headed pin 62; and hence that spring is adjacent the front of the platen 40. The downwardly-opening saddle of the spring 74 rests upon the elongated pivot 63; and hence that spring is adjacent the trailing edge of that platen. The numerals 73, 75 and 77 denote leaf-type springs which preferably are identical to, and in register with, the springs 72, 70 and 74. The downwardly-opening saddles of springs 73, 75 and 77 rest, respectively, upon headed pin 68, headed pin 67 and elongated pivot 63.

A short pivot 80 is supported by the upwardly-opening saddle which is defined by the fingers at the bifurcated end of the spring 72; and that pivot rotatably supports a roller 82. A similar pivot 84 is supported by the upwardly-opening saddle which is defined by the fingers at the bifurcated end of the spring 70; and that pivot rotatably supports a roller 86. A further similar pivot 88 is supported by the upwardly-opening saddle which is defined by the fingers at the bifurcated end of the spring 74; and that pivot rotatably supports a roller 90. The numerals 89, 83 and 87 denote pivots which are in register with the pivots 80, 84 and 88 and which are supported by the upwardly-opening saddles that are defined by fingers at the bifurcated ends of springs 73, 75 and 77. The pivots 89, 83 and 87 rotatably support rollers 92, 85 and 91.

The numeral 98 denotes an arm which has a hub that encircles the elongated pivot 63; and a pivot 100 is fixedly secured to the outer end of that arm. That pivot rotatably supports a roller 102. An arm 110 also has the hub thereof encircling the elongated pivot 63; and a pivot 112 is fixedly secured to the outer end of that arm. That pivot rotatably supports a roller 114. Springs, not shown, encircle the elongated pivot 63 and urge the rollers 102 and 114 upwardly relative to the platen 40.

The numeral 118 denotes an upper platen which normally is disposed in parallel relation with, and in close proximity to, the platen 40. The platen 118 has downwardly-directed flanges 120 and 121 at its elongated sides; and each of those flanges has a downwardly-opening slot 122 adjacent the front end thereof. The numeral 124 denotes a semi-cylindrical leading edge of the platen 118; and that semi-cylindrical leading edge is disposed forwardly of the upwardly-inclined rear portion 38 of the platform 32. The platen 118 has an upwardly-inclined trailing edge 126, as shown by FIGS. 3 and 4.

The numeral 140 denotes a cover for the scrip transport 30; and that cover has downwardly-directed flanges 142 and 143 at the elongated sides thereof. The numeral 144 denotes a switch bracket which is secured to the cover 140; and that switch bracket holds a normally-open, single-pole, single-throw switch 146 adjacent the front of the platen 118. The numeral 148 denotes a sturdy but thin actuator for the switch 146; and that actuator extends downwardly through slots in the platens 118 and 40. The leading edge of that actuator is essentially straight, but the trailing edge is convex. The configurations and inclinations of the leading and trailing edges of actuator 148 enable the leading edge and trailing edge, respectively, of a piece of scrip to easily raise that actuator upwardly out of the slot in the platen 40. As a result, the switch actuator 148 permits relatively free movement of pieces of scrip inwardly and outwardly of the scrip transport 30.

The numeral 154 denotes a second switch bracket which is secured to the cover 140; and that switch bracket supports a normally-open, single-pole, single-throw switch 156. The numeral 158 denotes a sturdy but thin actuator for the switch 156; and that actuator extends downwardly through slots in the platens 118 and 40. The configurations and inclinations of the leading and trailing edges of the switch actuator 158 enable the leading edge and trailing edge, respectively, of a piece of scrip to easily raise that actuator upwardly out of the appropriate slot in the platen 40. As a result, the switch actuator 158 permits relatively free movement of pieces of scrip inwardly and outwardly of the scrip transport 30.

The numeral 160 denotes a third switch bracket which is secured to the cover 140; and that switch bracket is adjacent the rear of that cover. That switch bracket supports a normally-open, single-pole, single-throw switch 162; and that switch has an actuator 164 which extends downwardly through slots in the platens 118 and 40. If a person were to attempt to pull a piece of scrip outwardly of the scrip transport 30, after the trailing edge of that piece of scrip had been moved inwardly beyond the actuator 164, that piece of scrip would be intercepted by that actuator. In that event, the actuator 164 would make it impossible for that person to recover that piece of scrip in intact form.

The numerals 188 and 190 denote pulleys which are mounted on short pivots 189 and 187 that are supported by the flange 142; and the numeral 194 denotes a pulley which is mounted on one end of an elongated shaft 182 that is rotatably supported by bushings which are mounted in the flanges 142 and 143. The pulleys 188, 190 and 194 accommodate an elongated endless belt 198; and the lower "run" of that belt is engaged by the upper portions of the rollers 82, 86 and 90. The numerals 191 and 193 denote pulleys which are mounted on short pivots 185 and 183 that are supported by the flange 143; and the numeral 195 denotes a pulley which is mounted on the other end of the elongated shaft 182. The pulleys 191, 193 and 195 support an endless belt 199. A worm wheel 200 is fixedly secured to the shaft 182; and a worm gear 202 meshes with that worm wheel. That worm gear is mounted on the output shaft 203 of a D.C. motor 562 which is enclosed by a motor housing 204 that extends upwardly from the cover 140. That motor is a reversible permanent magnet D.C. motor which drives an A.C. generator by means of an internal connection. That A.C. generator is located within the motor housing 204; and that connection is a direct mechanical connection. In the said preferred embodiment of script transport, the motor 562, the A.C. generator and the connection are parts of a type CYQM Motor With Integral Tachometer Generator which is marketed by the Barber Colman Company as model No. CYQM 23360-3. When the motor 562 is energized in the "forward" direction, it will directly drive the A.C. generator in that direction, and it will drive the lower "runs" of the belts 198 and 199 inwardly of the scrip transport 30. When the motor is energized in the "reverse" direction, it will directly drive the A.C. generator in that direction, and it will drive the lower "runs" of belts 198 and 199 outwardly of that scrip transport.

The numeral 206 denotes a mounting bracket which fixedly holds magnetic heads 208 and 210 in spaced-apart relation. Those magnetic heads are spaced both laterally and longitudinally of the elongated axis of the scrip transport 30; and hence the air gaps of those magnetic heads will sense two laterally-spaced, longitudinally-extending paths.

The numeral 220 denotes an elongated pivot which has the opposite ends thereof secured to the rear portions of the flanges 120 and 121 on the upper platen 118; and that pivot extends through aligned openings in the flanges 42 and 43 on the lower platen 40. As a result, the pivot 220 enables the upper platen 118 — and the cover 140 plus the various components which are mounted on that upper platen and on that cover — to be rotated upwardly and away from the lower platen 40. Such rotation is desirable; because it permits ready and free access to the passageway defined by the lower platen 40 and the upper platen 118. However, the upper platen 118 will normally respond to its weight, to the weight of the cover 140, and to the weight of the components mounted on that upper platen and on that cover to urge the lower face of the lower "runs" of the belts 198 and 199 into intimate engagement with the upper faces of the rollers 82, 85, 86, 90, 91 and 92. The springs 70, 72, 73, 74, 75 and 77 will yield slightly in response to the combined weights of the upper platen 118, of the cover 140, and of the components which are carried by that upper platen and by that cover; but those springs will hold the upper surfaces of the rollers 82, 85, 86, 90, 91 and 92 above the upper surface of the lower platen 40. Those rollers and the rollers 102 and 114 are in register with openings in that lower platen.

The numeral 170 denotes a switch bracket which is secured to the cover 140 a short distance to the right of the switch bracket 144, as those switch brackets are viewed in FIG. 1. The former switch bracket supports a single-pole single-throw switch 494 which has an actuator 174; and that switch is biased toward closed position. As indicated particularly by FIG. 3, the switch 494 is located adjacent the front of the scrip transport 30.

The numeral 176 denotes an elongated pivot which has the ends thereof disposed in openings in the flanges 142 and 143 on the cover 140. The numeral 178 denotes a blocking member which is U-shaped in plan, and which has downwardly-extending fingers 180 and 181 at the free ends of the arms thereof. Those fingers are dimensioned to extend downwardly through slots 168 and 166 in the upper platen 118, and also to extend downwardly through slots 172 and 171 in the lower platen 40. As indicated particularly by FIG. 8, the slots 166 and 171 are in vertical registry and the slots 168 and 172 are in vertical registry. An ear 184 extends outwardly from that arm of the blocking member 178 of which the finger 181 is a part, as shown particularly by FIG. 8; and that ear underlies the actuator 174 of switch 494, as shown by FIGS. 8 and 10. An arcuate slot 213 is provided in that arm of the blocking member 178 of which the finger 181 is a part, and that slot is shown by FIG. 9. The numeral 214 denotes a torsion spring which encircles the left-hand end of the elongated pivot 176, as that pivot is viewed in FIGS. 8 and 10. One end of that torsion spring bears against the under surface of the cover 140, and the other end of that spring bears against the ear 184 on blocking member 178; and that torsion spring biases the fingers 180 and 181 of that blocking member downwardly relative to the platens 118 and 40. However, that spring can yield to permit that blocking member to be moved to the upper position shown by FIG. 9.

A solenoid 388 is mounted on the cover 140; and the plunger 389 of that solenoid has a slot in the lower end thereof. That slot accommodates a portion of the arm of the blocking member 178 which has the slot 213 therein; and a pin 391 extends through aligned openings in the plunger 389 and through the slot 213. That slot enables the solenoid 388 to rotate the blocking member 178 in the counterclockwise direction into the position of FIG. 9 without any binding of pin 391 in that slot. The numeral 393 denotes a helical compression spring which biases the plunger 389 and the blocking member 178 for movement to the position shown by FIGS. 3, 4 and 8; but that spring will yield to permit the solenoid 388 to raise that blocking member to the position shown by FIG. 9.

The numeral 46 denotes a rectangular opening in the lower platen 40 adjacent the front of that platen; and that opening accommodates the upper portion of a plastic mounting 50 for a U-shaped permanent magnet 48. Screws 52 are used to fixedly hold the upper portion of the plastic mounting 50 in position within the opening 46. That magnet will, as a tape, card, or other object is introduced into the scrip transport 30, erase any information which has been encoded into the magnetic particles on that tape, card or other object.

The numeral 216 denotes a toothed member which is mounted within an opening 217 in the upper platen 118, as shown particularly by FIG. 11. The teeth on that toothed member have gently-inclined leading edges but abruptly-inclined trailing edges. The numeral 218 denotes a toothed member which is U-shaped in elevation, as shown particularly by FIG. 2; and the teeth on that toother member are on the upper edges of the sides of that toothed member. The lower edges of those sides incline upwardly from front to rear, as indicated particularly by FIG. 11. Generally L-shaped slots 222 are provided at the left-hand ends of the sides of the toothed member 218, as shown particularly by FIGS. 3, 4 and 11; and those slots accommodate the elongated pivot 63. Projections 224 are provided on each side of the toothed member 218; and one of those projections is shown in detail in FIG. 11. Helical compression springs 226 telescope downwardly over those projections; and the upper ends of those springs bear against the under surface of the platen 40 while the lower ends of those springs bear against the sides of the toothed member 218. The teeth on the upper edges of the sides of the toothed member 218 have gently-inclined leading edges but abruptly-inclined trailing edges, as emphasized particularly by FIG. 11.

The numeral 221 denotes a block which has a horizontally-directed opening therein which can telescope over the elongated pivot 220; and that block is dimensioned to fit under the downwardly-inclined trailing edge 45 of the lower platen 40. The shank of a bolt 223 extends through a horizontally-directed opening in the block 221 which is set at right angles to the opening which accommodates the elongated pivot 220. A nut 225 is threaded onto the shank of the bolt 223 to hold that bolt in assembled relation with the block 221. A cam 227, which has the form of a right-circular cylinder with reduced-diameter ends, has a threaded opening therethrough which accommodates the shank of the bolt 223. The reduced-diameter ends of the cam 227 are in register with the upwardly-inclined lower edges of the sides of the toothed member 218, as shown by FIG. 5.

The numeral 165 denotes a closure for the bottom of the scrip transport 30; and upwardly-extending flanges on that closure extend upwardly above the lower edges of the flanges 142 and 143 of the cover 140. A hardened bearing plate 228 is provided on the upper surface of the bottom of the closure 165; and that hardened bearing plate is in register with the cam 227. That hardened bearing plate will fully support the cam 227, and it will permit repeated shifting of the position of that cam with little wear.

The numeral 147 denotes vertically-directed slots which are provided in the flanges 42 and 43 of the platen 40, and those slots are in register with each other. The numeral 149 denotes a latching member which has the righthand end thereof extending through the slot 147 in the flange 43, as indicated particularly by FIG.

12; and the numeral 151 denotes a similar latching member which has the left-hand end thereof extending through the slot 147 in the flange 42 on that platen. The right-hand end of the latching member 149 also extends into a slot 157 in the flange 121 of the upper platen 118; and the left-hand end of the latching member 151 extends into a slot 157 in the flange 120 of that upper platen. The slots 157 are similar to, and are in register with, the slots 147 in the flanges 42 and 43 of the lower platen 40. A helical compression spring 153 encircles the central portions of the latching members 149 and 151, and it urges the left-hand end of latching member 151 into the slot 157 in flange 120 while urging the right-hand end of latching member 149 into the slot 157 in the flange 121, as those latches and flanges are viewed in FIG. 12. However, that spring can yield to permit the latching members 149 and 151 to be moved inwardly until they are clear of the slots 157 in the flanges 120 and 121 of the platen 118. A rotatable latch release 155 is rotatably mounted within an opening in the closure 165 for the bottom of the scrip transport 30; and that latch release has a slot in the under surface thereof which can accommodate a screwdriver blade or other stiff object and which can respond to rotation of that screwdriver blade or other stiff object to rotate that latch release. The rotation of that latch release will enable ears, which are on the upper surface thereof and which are shown particularly by FIG. 5, to move the latching members 149 and 151 inwardly of the slots 157 in the flanges 120 and 121 of the platen 118.

The scrip transport 30 is essentially identical to the identically numbered bill transport in the said Fishel et al application, except that the magnetic head 210 has been shifted closer to the leading edge of the platen 118, that the magnet 48 has been added, that the blocking member 178 and the elements associated with it have been added, that the toothed members 216 and 218 and the elements associated with the latter toothed member have been added, that the closure 165 has been added, and that the latches 149 and 151 and the elements associated with them have been added. In the said preferred embodiment of scrip transport, the air gaps of the magnetic heads 208 and 210 define parallel lines which are transverse of the longitudinal axis of the platen 118 and which are spaced apart one-half of an inch. The inner faces of the magnetic heads 208 and 210 are spaced apart one-sixteenth of an inch transversely of the longitudinal axis of the platen 118.

The blocking member 178, the solenoid 388, the toothed members 216 and 218, and the adjusting members associated with those toothed members are not, per se, parts of the present invention. Those various members are disclosed and claimed in James R. Pescetto application Ser. No. 405,538 for ANTI-RETRIEVAL DEVICE which was filed on Oct. 11, 1973.

Description of Circuit of Scrip Validator

Figure 21:
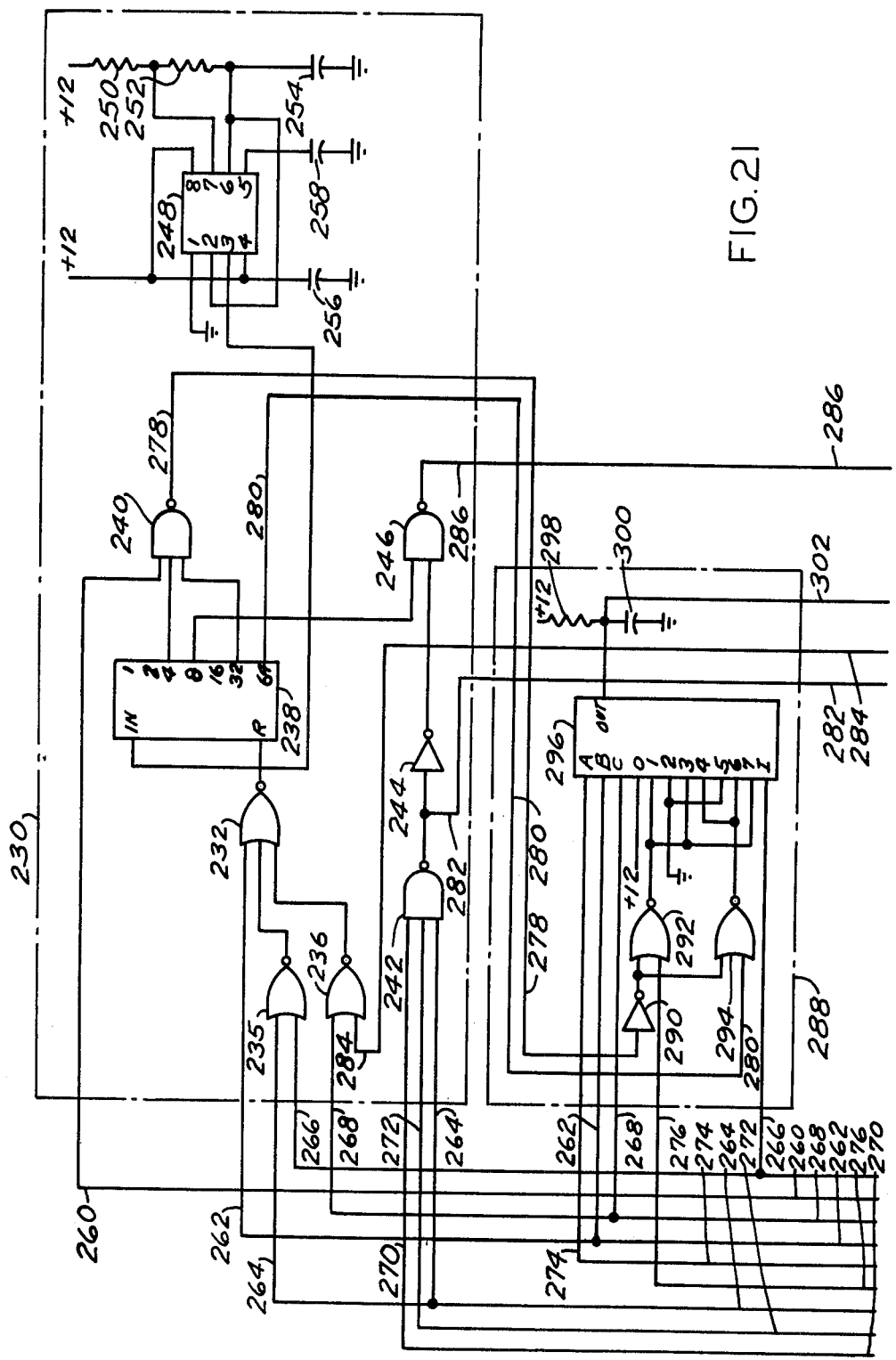

The numeral 230 in FIG. 21 denotes a TIMING BLOCK which includes a BINARY COUNTER 238, a timer 248, NOR gates 232, 235, and 236, NAND gates 240, 242 and 246, an inverter 244, resistors 250 and 252, and capacitors 254, 256 and 258. Although different timers could be used as the timer 248, a Signetics NE555V timer has been found to be very useful. The upper terminal of resistor 250 is connected to a source of regulated twelve volts D.C.; and that resistor coacts with resistor 252 and with capacitors 254, 256 and 258 to cause timer 248 to operate as a pulse generator which will apply pulses to the input terminal of BINARY COUNTER 238 at the rate of one every sixteen and seven-tenths milliseconds. Conductors 260, 262, 264, 266, 268, 270, 272 and 284 extend into that block, and conductors 278, 280, 282 and 286 extend from that block.

The numeral 288 denotes a MULTIPLEXER block which includes a multiplexer 296, NOR gates 292 and 294, an inverter 290, a resistor 298 and a capacitor 300. Although various multiplexers could be used, an RCA 4051 multiplexer has been found to be very useful. That capacitor and that resistor constitute an RC network. Conductors 262, 266, 268, 274, 276, 278 and 280 extend into that block, a conductor 302 extends from that block, and conductors 282 and 284 are shown merely passing through that block.

The numeral 304 in FIG. 2 denotes an ACCEPT LATCH block which includes an NPN transistor 316, a Zener diode 326, resistors 310, 318, 320, 322 and 324, capacitors 314 and 329, and NAND gates 306 and 308. The resistor 310 and the capacitor 314 constitute an RC network which will provide a slight delay time whenever a "0" at the upper input of NAND gate 306 is to be changed to a "1". That NAND gate and NAND gate 308 constitute an electronic "latch" 307 which will respond to the application of a "0" to the upper or middle input of NAND gate 306 to apply a continuous "1" to conductor 330 and to apply a continuous "0" to conductor 284. The transistor 316, the Zener diode 326, the capacitor 329, and the resistors 318, 320, 322 and 324 constitute a "line cording" circuit that is similar to the "line cording" circuit in Carter et al application Ser. No. 405,535 which is entitled PAPER CURRENCY VALIDATOR and which was filed on Oct. 11, 1973. That "line cording" circuit differs from the "line cording" circuit in the said Carter et al application in that the transistor 316 normally is non-conductive whereas the corresponding transistor in the said Carter et al application normally is conductive. In both line cording circuits, the Zener diode controls the state of conductivity of the transistor and will respond to changes in the state of conductivity of that transistor before the changes in supply voltage can cause improper operation of the overall circuit of the scrip validator. The line cording circuit in the ACCEPT LATCH block 304 is an equivalent of the line cording circuit of the said Carter et al application and is not, per se, a part of the present invention. Conductors 312 and 286 extend into that block, and conductors 284 and 330 extend from that block.

The numeral 334 denotes a COLLECT block which includes a single-pole single-throw switch 336, resistors 338 and 344, a diode 340, a capacitor 346, and an optocoupler 342. The switch 336 will be located in the vending machine with which the scrip validator of the present invention is associated; and that switch will close momentarily each time that vending machine dispenses a product. A conductor 312 extends from that block.

The numeral 348 denotes a MOTOR START AND RUN block which includes a MOTOR CONTROLLING sub-block 354; and that sub-block includes the SPEED ADJUSTING sub-block, the SPEED MAINTAINING sub-block, and the MOTOR AND RELAY sub-block in the identically-numbered MOTOR CONTROLLING block in the said Carter et al application. The MOTOR START AND RUN block 348 also includes NOR gates 350, 353 and 364, a NAND gate 360, inverters 352, 356 and 362, diodes 355 and 366, and a resistor 368. Conductors 260, 262, 268, 274, 330, 333,

436 and 439 extend into that block, conductor 330 extends from that block, and conductors 282, 284 and 302 are shown merely passing through that block.

The numeral 370 denotes a BLOCKING FINGER CONTROL block which includes NPN transistors 386 and 406, NOR gates 380 and 392, NAND gates 376 and 396, inverters 378, 382, 394 and 398, solenoid 388, diode 390, resistors 372, 384, 402, 404 and 408, and capacitors 374 and 400. Resistor 372 and capacitor 374 constitute an RC network which will slightly delay any change of an "0" at the upper input of NAND gate 376 to a "1". Resistor 402 and capacitor 400 also constitute an RC network. Conductors 260, 262, 266 and 284 extend into that block, conductors 284, 410 and 439 extend from that block, and conductors 282, 302, 330, 333 and 436 are shown merely passing through that block.

Figure 23:
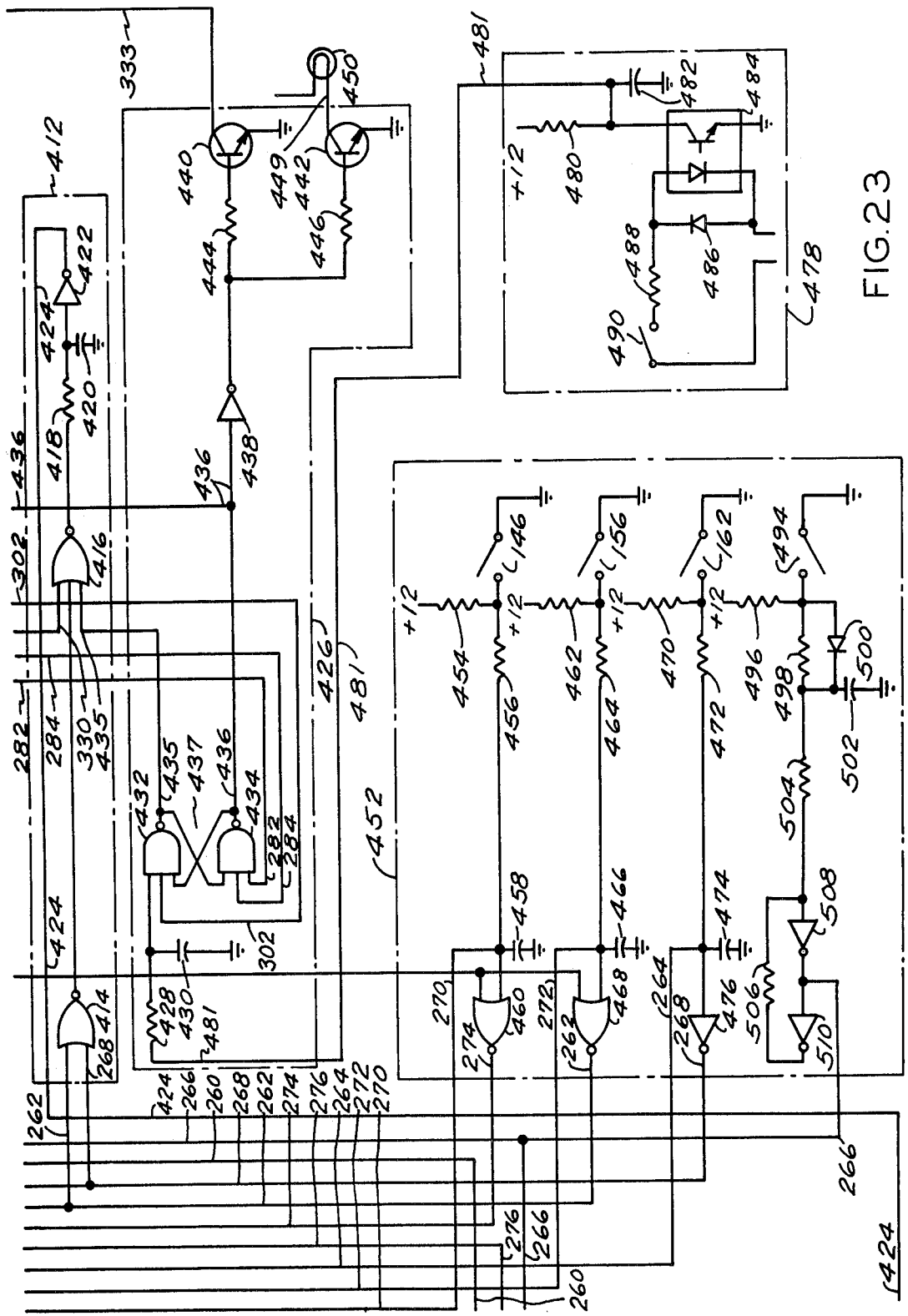

The numeral 412 in FIG. 23 denotes a VALIDATE ENABLE block which includes NOR gates 414 and 416, an inverter 422, a resistor 418, and a capacitor 420. Resistor 418 and capacitor 420 constitute an RC network which will slightly delay any change of a "0" at the input of inverter 422 to a "1". Conductors 262, 268, 330 and 435 extend into that block, conductor 424 extends from that block, and conductors 282, 284, 302, 410 and 436 are shown merely passing through that block.

The numeral 426 denotes a REVERSE LATCH block which includes NAND gates 432 and 434, NPN transistors 440 and 442, an inverter 438, a capacitor 430, and resistors 428, 444 and 446. Resistor 428 and capacitor 430 constitute an RC network which will slightly delay any change of a "0" at the upper input of NAND gate 432 to a "1". That NAND gate and NAND gate 434 constitute an electronic "latch" 437 which will respond to the application of a "0" to the upper input of NAND gate 432 to apply a continuous "1" to conductor 435 and to apply a continuous "0" to conductor 436. Conductors 282, 284, 302, and 481 extend into that block, conductors 333, 435, 436 and 449 extend from that block, and conductor 410 is shown merely passing through that block. The conductor 449 extends to a lamp 450 which is mounted in the vending machine. Whenever that lamp is illuminated, it will indicate that the inserted piece of scrip will be returned to the patron.

The numeral 478 denotes a RETURN SCRIP block which includes a single-pole single-throw switch 490, a diode 486, a capacitor 482, an opto-coupler 484, and resistors 480 and 488. That switch is located in the vending machine; and it can be actuated by a patron of that vending machine in the event the supply of desired product is exhausted or in the event that patron changes his mind and wants his piece of scrip returned to him. Conductor 481 extends from that block.

The numeral 452 denotes a SWITCH block which includes the switches 146, 156, 162 and 494. That block also includes NOR gates 460 and 468, inverters 476, 508 and 510, a diode 500, capacitors 458, 466, 474 and 502 and resistors 454, 456, 462, 464, 470, 472, 496, 498, 504 and 506. Conductor 410 extends into that block, and conductors 262, 264, 266, 268, 270, 272 and 274 extend from that block.

The numeral 512 in FIG. 16 denotes a DETECTION block which includes an amplifier 514, a PEAK DETECTOR sub-block 516, an ENVELOPE DETECTOR sub-block 548, FREQUENCY DETECTOR sub-blocks 526 and 527, counters 540 and 582, flip-flops 556 and 567, NAND gates 550, 552 and 554, a NOR gate 584, inverters 522, 524 and 542, capacitors 518, 560 and 566, and resistors 520, 558, and 564. Although different counters could be used as the counters 540 and 582, the RCA 4017 counters have been found to be very useful. Although different flip-flops could be used as the flip-flops 556 and 567, RCA 4013 flip-flops have been found to be very useful. The circuit of the PEAK DETECTOR sub-block 516 is shown in FIG. 24, the circuit of the FREQUENCY DETECTOR sub-block 526 is shown in FIG. 25, and the circuit of the ENVELOPE DETECTOR sub-block 548 is shown in FIG. 26. The capacitor 518 and resistor 520 constitute a positive going edge detector. The resistor 558 and the capacitor 560 constitute an RC network; and, similarly, the resistor 564 and the capacitor 566 constitute an RC network. A conductor extends into that block from the magnetic head 210, a conductor 424 extends into that block, and conductors 586 and 588 extend from that block.

Figure 17:
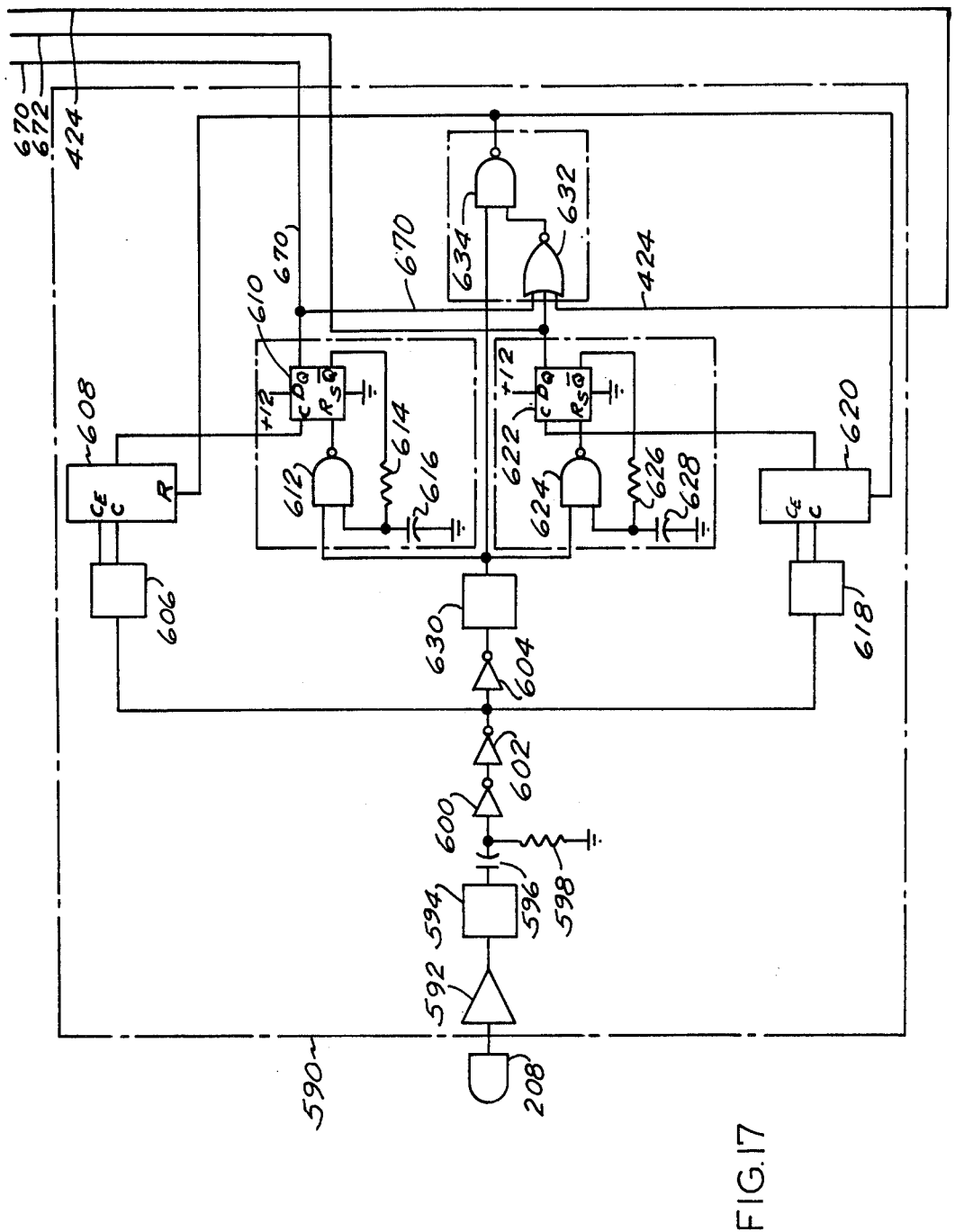

The numeral 590 in FIG. 17 denotes a DETECTION block which includes an amplifier 592, a PEAK DETECTOR sub-block 594, an ENVELOPE DETECTOR sub-block 630, FREQUENCY DETECTOR sub-blocks 606 and 618, counters 608 and 620, flip-flops 610 and 622, NAND gates 612, 624 and 634, NOR gate 632, inverters 600, 602 and 604, capacitors 596, 616 and 628, and resistors 598, 614 and 626. Except for the fact that the FREQUENCY DETECTOR sub-blocks 606 and 618 will be set to respond to frequencies which are specifically different from the frequencies to which either of the FREQUENCY DETECTOR sub-block 526 and 527 will be set, the components and connections in the DETECTION block 590 will preferably be identical to the components and connections in the DETECTION block 512. A conductor extends into that block from the magnetic head 208, a conductor 424 extends into that block, and conductors 670 and 672 extend from that block.

Figure 18:
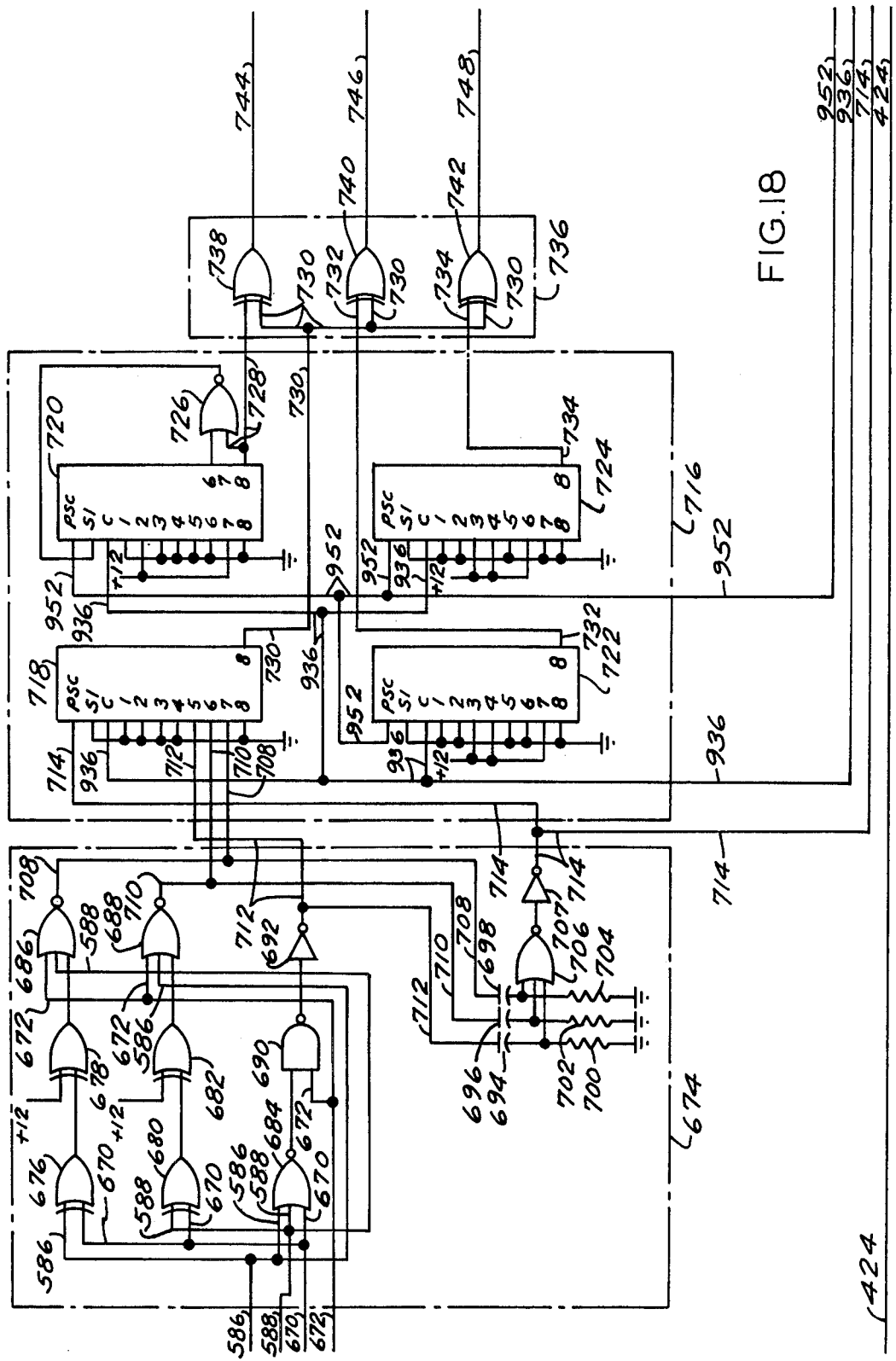

The numeral 674 in FIG. 18 denotes a SIGNAL DECODING block which includes EXCLUSIVE OR gates 676, 678, 680 and 682, NOR GATES 684, 686, 688 and 706, a NAND gate 690, inverters 692 and 707, capacitors 694, 696 and 698, and resistors 700, 702 and 704. Resistor 700 and capacitor 694 constitute an RC network which will function as a differentiating network that will differentiate any change from a "0" to a "1" that will appear on conductor 712 and will apply the resultant differentiated signal to the lower input of NOR gate 706. Similarly, resistor 702 and capacitor 696 constitute an RC network and resistor 704 and capacitor 698 constitute an RC network; and those networks will function as differentiating networks which will differentiate any change from a "0" to a "1" that will appear on the corresponding conductors 710 and 708 and will apply the resultant differentiated signals to the middle and upper inputs respectively of NOR gate 706. Conductor 586, 588, 670 and 672 extend into that block, and conductors 708, 710, 712 and 714 extend from that block.

The numeral 716 denotes a COMPARISON REGISTER block which includes shift registers 718, 720, 722 and 724 and a NOR gate 726. The shift register 718 will store data which is developed by the SIGNAL DECODING block 674 as the patterns on a piece of scrip are being moved past, and sensed by, the magnetic heads 208 and 210; and hence that shift register can be regarded as a memory for sensed data. The shift registers 720, 722 and 724 store pre-programmed data, and hence those shift registers can be regarded as a memory for pre-programmed data. Although different shift registers could be used, the RCA 4021 shift registers have been found to be very useful. Conductors 708, 710, 712, 714, 936 and 952 extend into that block, and conductors 728, 730, 732 and 734 extend from that block.

The numeral 736 denotes a PATTERN REGISTER DECODING block which includes EXCLUSIVE OR gates 738, 740 and 742. Conductors 728, 730, 732 and 734 extend into that block, and conductors 744, 746 and 748 extend from that block.

Figure 19:
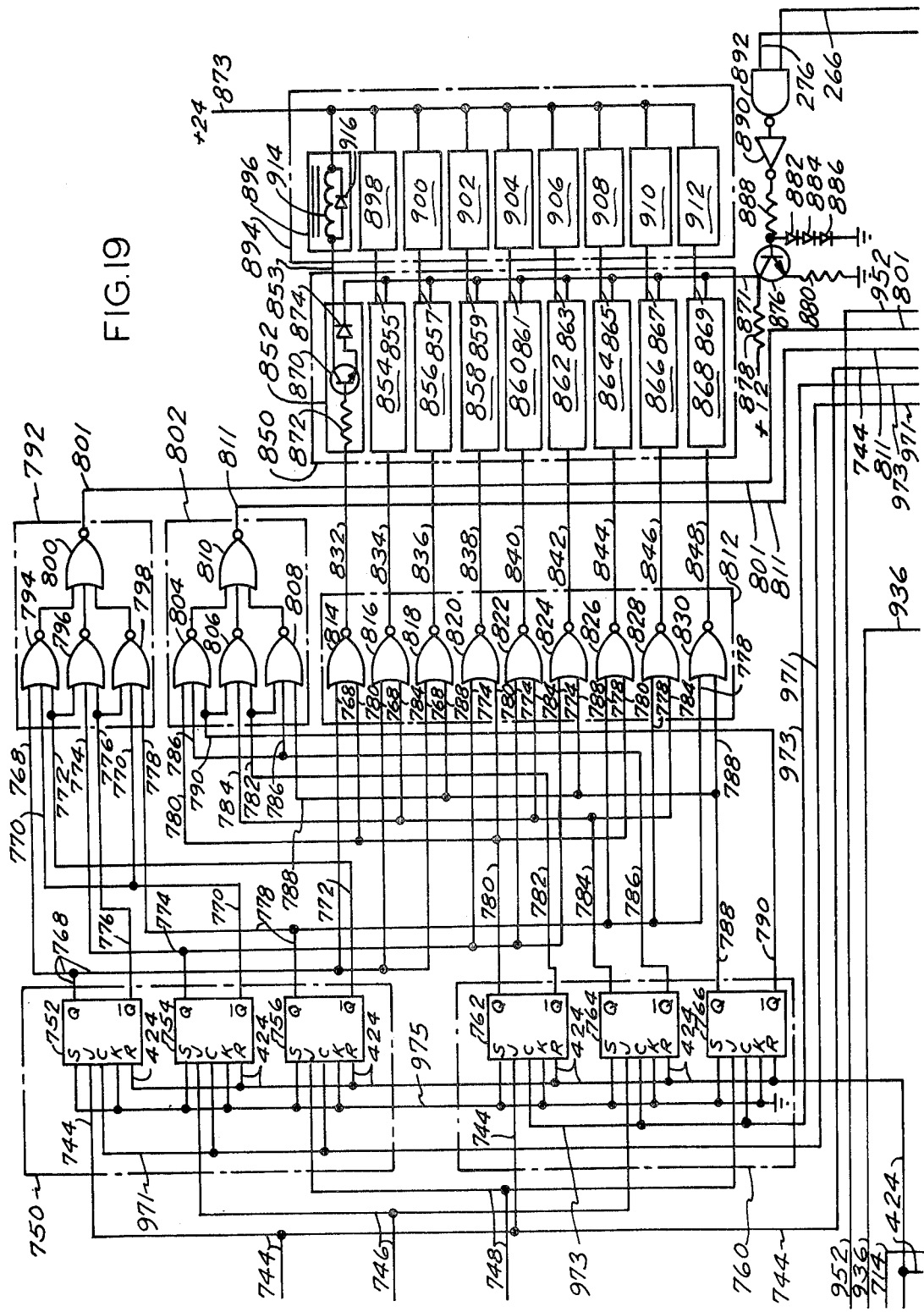

The numeral 750 in FIG. 19 denotes a DATA FIELD 2 FLIP-FLOP block which includes flip-flops 752, 754 and 756. Although different flip-flops could be used as the flip-flops 752, 754 and 756, each of those flip-flops preferably is one-half of an RCA 4027 flip-flop. Conductors 424, 744, 746, 748, 971 and 975 extend into that block, and conductors 768, 770, 772, 774, 776 and 778 extend from that block. Conductor 975 connects the K inputs of those flip-flops to ground; and hence once those flip-flops have been "set", they will remain set until a "1" is applied to the reset terminals thereof.

The numeral 760 denotes a DATA FIELD 3 FLIP-FLOP block which includes flip-flops 762, 764 and 766. Although different flip-flops could be used as the flip-flops 762, 764 and 766, each of those flip-flops preferably is one-half of an RCA 4027 flip-flop. Conductors 424, 744, 746, 748 and 973 extend into that block, conductors 780, 782, 784, 786, 788, 790 and 975 extend from that block, and conductor 971 is shown merely passing through that block. Conductor 975 connects the K inputs of those flip-flops to ground; and hence once those flip-flops have been "set", they will remain set until a "1" is applied to the reset terminals thereof.

The numeral 792 denotes a DATA FIELD 2 SELECTION block which includes NOR gates 794, 796, 798 and 800. The outputs of the NOR gates 794, 796 and 798 are connected to the three inputs of the NOR gate 800. Conductors 768, 770, 772, 774, 776 and 778 extend into that block, and a conductor 801 extends from that block. The numeral 802 denotes a DATA FIELD 3 SELECTION block which includes NOR gates 804, 806, 808 and 810. The outputs of the NOR gates 804, 806 and 808 are connected to the three inputs of the NOR gate 810. Conductors 780, 782, 784, 786, 788 and 790 extend into that block, and a conductor 811 extends from that block.

The numeral 812 denotes a SELECTION DECODER block which includes NOR gates 814, 816, 818, 820, 822, 824, 826, 828 and 830. Conductors 768, 774, 778, 780, 784 and 788 extend into that block, and conductors 832, 834, 836, 838, 840, 842, 844, 846 and 848 extend from that block.

The numeral 850 denotes a PRICE LINE ENABLE block which includes sub-blocks 852, 854, 856, 858, 860, 862, 864, 866 and 868. As indicated by block 852, each of those blocks includes an NPN transistor 870, a diode 874 and a resistor 872. Conductors 832, 834, 836, 838, 840, 842, 844, 846, 848 and 871 extend into that block, and conductors 853, 855, 857, 859, 861, 863, 865, 867 and 869 extend from that block.

The numeral 894 denotes a PRICE LINE RELAY block which is located in the vending machine, and that block includes sub-blocks 896, 898, 900, 902, 904, 906, 908, 910 and 912. As indicated by block 896, each of those blocks includes a relay coil 914 and a diode 916. Conductors 853, 855, 857, 859, 861, 863, 865, 867, 869 and 873 extend into that block. The relays in the sub-blocks of the PRICE LINE RELAY block 894 will control suitable relay contacts in the vending machine.

The collector of an NPN transistor 876 is directly connected to the conductor 871 which extends into the PRICE LINE ENABLE block 850, and a resistor 878 connects that collector to a source of regulated D.C. A resistor 880 connects the emitter of that transistor to ground, and series-connected diodes 882, 884 and 886 displace the base of that transistor from ground. A NAND gate 892 has the output thereof connected to the base of transistor 876 by an inverter 890 and a resistor 888. Conductors 266 and 276 are connected to the inputs of that NAND gate. The numeral 918 in FIG. 20 denotes a CLOCK GENERATOR block which includes a flip-flop 920, registers 930 and 934, NOR gates 922 and 932, an inverter 924, a capacitor 926 and a resistor 928. The NOR gate 922 will coact with inverter 924, capacitor 926 and resistor 928 to constitute an oscillator which will develop clock pulses at the output of that NOR gate and which will apply those clock pulses to the clock input of register 930. Although different flip-flops could be used as the flip-flop 920, that flip-flop preferably is one-half of an RCA 4027 flip-flop. Although different registers could be used as the registers 930 and 934, each of those registers preferably is one-half of an RCA 4015 register. Conductor 714 extends into that block and conductors 936 and 938 extend from that block.

The numeral 940 denotes a DATA FIELD AND VALIDATION block which includes a shift register 942, registers 954 and 982, a flip-flop 978, NOR gates 956 and 980, NAND gates 944, 958, 960, 962 and 964, inverters 950, 966, 968, 970, 972 and 988, capacitors 948, 977 and 986, and resistors 946, 975 and 984. The input terminals one, three and seven of shift register 942 are connected together and to the source of regulated plus twelve volts D.C., and input terminals two, four through six and eight are connected together and to ground. Resistor 975 and capacitor 977 constitute an RC network which will delay any change of a "1" at the input of inverter 972 to a "0". Resistor 946 and capacitor 948 constitute an RC network which will delay any change of a "1" at the input of inverter 950 to a "0". The resistor 984 and capacitor 986 constitute an RC network which will delay any change of a "1" at the input of inverter 988 to a "0". The K input of flip-flop 978 is connected to ground; and hence once that flip-flop has been set, it cannot be reset until a "1" is applied to the reset input thereof. Conductors 424, 714, 744, 801, 811 and 938 extend into that block, and conductors 260, 276, 424, 952, 971 and 973 extend from that block.

The PEAK DETECTOR 516 of FIG. 24 includes an NPN transistor 636 which has the collector thereof connected to a source of 24 volts and which has the emitter thereof connected to ground by a resistor 639 and parallel-connected capacitors 656 and 658. One of those capacitors is a relatively large value capacitor and the other of those capacitors is a relatively small value capacitor to facilitate the by-passing of essentially all transients to ground. A resistor 637 is connected between the source of 12 volts and the junction between resistor 639 and capacitor 656. The transistor 636 and those resistors function as an emitter-follower which provides half-wave rectification of the signals which are applied to the PEAK DETECTOR 516. The output of that emitter-follower is a half-wave rectified signal which has an amplitude between five and six volts. Because the signals, which are applied to the base of transistor 636, were generated as magnetic lines moved into and out of register with the narrow gap of the magnetic head, those signals will have the form of narrow pulses; and hence the half-wave rectified signal will have essentially vertical leading edges.

The numeral 638 denotes a capacitor, and the numerals 640 and 642 denote back-to-back diodes. That capacitor will act as a differentiator; and those back-to-back diodes will provide a charging and discharging circuit for that capacitor. Consequently, the combination of that capacitor and of those diodes will respond to each half-wave pulse from the emitter-follower to provide a limited-amplitude, steep-sided, positive-going pulse and negative-going pulse which are contiguous. That positive-going pulse will terminate and that negative-going pulse will begin at the time the discharging of that capacitor reverse biases the diode 640 and forward biases the diode 642 in response to a half-wave pulse from the emitter-follower; and the zero crossing between that positive-going pulse and that negative-going pulse will occur immediately after the positive-going half-wave pulse from the emitter-follower reches its peak. Because the half-wave rectified signal will have essentially-vertical leading edges, and because the pulses generated by the magnetic head 210 will be narrow, the PEAK DETECTOR 516 can precisely sense the zero crossings. Consequently, the output of capacitor 638 and of diodes 640 and 642 is a limited-amplitude, positive-going pulse and a limited-amplitude negative-going pulse which are contiguous and which have the zero crossing therebetween closely in register with the peak of the positive-going half-wave pulse from the emitter-follower.

The numeral 644 denotes an operational amplifier which has a feedback resistor 646 and a feedback capacitor 648. Resistors 637 and 643 supply a positive voltage to the non-inverting input of that amplifier; and the output of the combination constituted by capacitor 638 and the diodes 640 and 642 is applied to the inverting input of that amplifier. One terminal of that amplifier is connected to ground and another terminal of that amplifier is connected to the source of twelve volts.

A current-limiting resistor 650 connects the output of amplifier 640 to the input of an inverter 652, and the output of that inverter is connected to the input of an inverter 654; and the latter inverter applies the output of the PEAK DETECTOR 516 to the left-hand terminal of the capacitor 518 in the DETECTION block 512. If desired, the current-limiting resistor 650 could be connected directly to the left-hand terminal of the capacitor 518; but, in the said preferred embodiment, the operational amplifier 644 is located a substantial distance away from the capacitor 518, and hence the inverters 652 and 654 were provided to compensate for resistive and interfacing losses.

The amplifier 644 acts as a zero crossing detector and normally maintains a "0" at the output thereof. Whenever that amplifier detects zero crossings, it will apply positive-going square wave pulses to the input of inverter 652; and the leading edges of those positive-going square wave pulses will correspond closely in time with the peaks of the positive-going amplified pulses developed by the amplifier 514. Because the peaks of those positive-going amplified pulses correspond closely in time with the trailing edge-to-edge spacings of the lines in the pattern being sensed by the magnetic head 210, the leading edges of the positive-going square wave pulses at the output of the PEAK DETECTOR 516 will correspond closely in time with the trailing edge-to-edge spacings of the lines in the pattern being sensed.

The sub-block 526 in FIG. 25 includes timers 521 and 537, an NPN transistor 547, potentiometers 541 and 551, a NOR gate 559, inverters 557 and 561, diodes 534 and 535, capacitors 530, 531, 536, 539, 540, 545, 549 and 555, and resistors 532, 533, 538, 543 and 553. The components which are shown within the dotted-line enclosure 528 constitute a timer module which is mounted on a printed circuit board that is shown in FIG. 14 as being a plug-in printed circuit board. That plug-in circuit board is releasably connectable to a printed circuit board which will include the NOR gate 559, the inverters 557 and 561, capacitors 536 and 540 and resistor 538, and the corresponding NOR gates, inverters, capacitors and resistors of corresponding timer modules which are parts of the FREQUENCY DETECTOR blocks 527, 606, and 618, and which are made as plug-in printed circuit boards. The numeral 571 denotes the plug-in timer module for FREQUENCY DETECTOR 527, the numeral 573 denotes the plug-in timer module for the FREQUENCY DETECTOR 606, and the numeral 575 denotes the plug-in timer module for the FREQUENCY DETECTOR 618. By making those timer modules as plug-in printed circuit boards which are readily connectable to and separable from the circuit board 523, the present invention makes it possible to quickly and simply change the frequencies which the patterns on the pieces of scrip must cause the magnetic heads 208 and 210 to develop.

The ENVELOPE DETECTOR 548 of FIG. 26 includes a timer 569 which has a capacitor 568 connected to pin 2 thereof. Although different timers could be used, the NE555V timer marketed by the Signetics Corporation has been found to be very useful. Pin 1 of timer 569 is directly connected to ground, and pin 5 is connected to ground by a capacitor 579. Pins 4 and 8 are directly connected to a source of plus plus twelve volts, and a capacitor 577 is connected between that source and ground. A resistor 570 connects that source to pin 2, and a resistor 578 connects that source to the interconnected pins 6 and 7. Those interconnected pins are connected to ground by a capacitor 580, and they are connected to the emitter of a PNP transistor 583 by a diode 581. The right-hand terminal of capacitor 568 also is connected to the base of transistor 583 and to the anode of a diode 585. The cathode of that diode is connected to ground by a capacitor 587 and a resistor 589. The timer 569, the transistor 583 and the associated capacitors, resistors and diodes constitute a re-triggerable monostable multivibrator.

Normally the capacitor 580 has a "0" at the upper terminal thereof; but whenever a negative-going pulse is applied to pin 2 of timer 569, that timer will develop a "1" at pin 3 thereof; and that "1" will remain at pin 3 until the charge on the capacitor 580 rises to a predetermined value — which it will normally do at the end of eight milliseconds.

However, if, prior to the end of that eight millisecond time interval, a further negative-going pulse is applied to pin 2 of timer 569 by the capacitor 568, that negative-going pulse also will be applied to the base of transistor 583 and will momentarily render that transistor conductive. Thereupon, capacitor 580 will be discharged by that transistor and then that capacitor will have to start charging all over again when that transistor becomes non-conductive. Each time capacitor 580 is discharged, the re-setting of the re-triggerable monostable multivibrator will be postponed for a further eight millisecond time interval. Consequently, as long as negative-going pulses are applied to the ENVELOPE DETECTOR 548 at intervals of less than eight milliseconds — as will be the case whenever an authentic pattern is being sensed — a "1" will continue to appear at pin 3 and hence at the output of that ENVELOPE DETECTOR.

Authentic Piece of Scrip: Referring particularly to FIG. 13, the numeral 130 denotes one preferred piece of scrip that is provided by the present invention. That piece of scrip is made from stiff paper which can be printed or engraved to provide sharp, precisely-spaced lines of magnetic ink thereon. That piece of scrip is four and one-half inches long and two and five-eighths inches wide. Arrows are printed or engraved on one surface of that piece of scrip to indicate the leading edge of that piece of scrip.

The numerals 132, 134, 135, 136, 137, 138, 139 and 141 denote discrete patterns which are printed or engraved on that surface of that piece of scrip on which the arrows are printed or engraved. Although those patterns are shown by FIG. 13, those patterns will be concealed in actual use — either by overprinting those patterns with an obscuring design or mass or by providing a thin non-magnetic light-opaque coating over the surface of that piece of scrip. Each pattern is formed by parallel lines which have exactly the same spacing between the trailing edges thereof, which have exactly the same widths, and which have at least a predetermined amount of magnetic material therein. Moreover, those parallel lines must have precisely-formed leading and trailing edges.

The spacing of the lines in the patterns 132, 134, 135 and 136 are distinctively different from each other; and hence, as those patterns move past the air gaps of the appropriate magnetic heads, distinctively-different frequencies will be developed. In the said preferred embodiment, the frequency defined by pattern 132 matches the frequency of FREQUENCY DETECTOR 526, the frequency defined by pattern 134 matches the frequency of FREQUENCY DETECTOR 618, the frequency defined by pattern 135 matches the frequency of FREQUENCY DETECTOR 527, and the frequency defined by pattern 136 matches the frequency of FREQUENCY DETECTOR 606. Those four patterns constitute data field 1 of the piece of scrip 130; and patterns 132 and 135 are aligned to be sensed by magnetic head 210, whereas patterns 134 and 136 are aligned to be sensed by magnetic head 208.

The spacing of the lines in the patterns 137 and 138 are distinctively different from each other; but the spacing of the lines in the pattern 137 must equal the spacing of the lines in pattern 132 or 135, and the spacing of the lines in the pattern 138 must equal the spacing of the lines in pattern 134 or 136. Pattern 137 is aligned with patterns 132 and 135, and thus will be sensed by magnetic head 210, whereas pattern 138 is aligned with patterns 134 and 136, and thus will be sensed by magnetic head 208. The patterns 137 and 138 constitute data field 2 of the piece of scrip.

The spacing of the lines in the patterns 139 and 141 are distinctively different from each other; but the spacing of the lines in the pattern 139 must equal the spacing of the lines in pattern 132 or 135, and the spacing of the lines in the pattern 141 must equal the spacing of the lines in pattern 134 or 136. Pattern 139 is aligned with patterns 132 and 135, and thus will be sensed by magnetic head 210, whereas pattern 141 is aligned with patterns 134 and 136 and thus will be sensed by magnetic head 208. 139 and 141 constitute data field 3 of the piece of scrip.

The patterns 132, 135, 137 and 139 are displaced forwardly relative to the patterns 134, 136, 138 and 141, as shown by FIG. 13. That displacement corresponds to the longitudinal displacement of the magnetic heads 210 and 208. Also the patterns 132, 135, 137 and 139 are displaced laterally from the patterns 134, 136, 138 and 141 to keep the magnetic head 208 from responding to any of the lines in the patterns 132, 135, 137 and 139, and also to keep the magnetic head 210 from responding to any of the lines in the patterns 134, 136, 138 and 141.

The patterns 132, 134, 135 and 136 are located on the piece of scrip 130 so the signal which is developed by the FREQUENCY DETECTOR and counter corresponding to each pattern is developed at a specifically different time; and, further, that the signals corresponding to patterns 132, 134, 135 and 136 are developed in succession. Similarly, the patterns 137 and 138 are located on the piece of scrip 130 so the signal which is developed by the FREQUENCY DETECTOR and counter corresponding to each pattern is developed at a specifically different time; and, further, that the signals corresponding to patterns 137 and 138 are developed in succession; and the patterns 139 and 141 are located on the piece of scrip 130 so the signal which is developed by the FREQUENCY DETECTOR and counter corresponding to each pattern is developed at a specifically different time; and, further, that the signals corresponding to patterns 139 and 141 are developed in succession.

Each of the patterns 132, 134, 135, 136, 137, 138, 139 and 141 must have at least one more line than the total count required by the counter corresponding to that pattern. This is necessary because the FREQUENCY DETECTORS do not respond to the first line of any pattern to apply a signal to the counter associated with it. Also the total number of lines in each of the patterns 132, 134, 135, 136, 137, 138, 139 and 141 must not exceed twice the count to which the counter, which is connected to the FREQUENCY DETECTOR corresponding to that pattern has been pre-set.

At-Rest Condition Of Scrip Validator: In the at-rest condition of the scrip validator, switches 146, 156, 162 and 494 of FIG. 23 are open; and, consequently, "1"s are applied to the lower inputs of NOR gates 460 and 468, and to the inputs of inverters 476 and 508. In addition, "1"s appear on conductors 264, 270 and 272. The "1"s at the lower inputs of NOR gates 460 and 468 will provide "0"s on conductors 274 and 262; and the "1"s at the inputs of inverters 476 and 508 will provide "0"s on conductors 268 and 266.

In the at-rest condition of the scrip validator, no pieces of scrip will be in the transport 30, and the belts 198 and 199 will be at rest. Consequently, "0"s will appear on the conductors 586, 588, 670 and 672 which originate in the DETECTION blocks 512 and 590 in FIGS. 16 and 17, respectively. The SIGNAL DECODING block 674 of FIG. 18 will respond to those "0"s to apply "0"s to conductors 708, 710, 712 and 714. The COMPARISON REGISTER block 716 and the PATTERN REGISTER DECODING block 736 of FIG. 18 will apply "0"s to the conductors 744, 746 and 748.

The DATA FIELD 2 FLIP-FLOP block 750, the DATA FIELD 3 FLIP-FLOP block 760, the SELECTION DECODER block 812, the DATA FIELD 2 SELECTION block 792, and the DATA FIELD 3 SELECTION block 802 of FIG. 19 leave the transistors in the sub-blocks of the PRICE LINE ENABLE block 850 non-conductive, and thereby keep the relay coils in the sub-blocks of the PRICE LINE RELAY block 894 un-energized. Also, the DATA FIELD 2 SECTION block 792 and the DATA FIELD 3 SELECTION block 802 apply "1's" to the conductors 801 and 811. The CLOCK GENERATOR block 918 of FIG. 20 will provide a "0" on conductor 936 which extends to the COMPARISON REGISTER block 716, and it will provide a "0" on conductor 938 which extends to the DATA FIELD AND VALIDATION block 940. The latter block will apply "0's" to conductors 971 and 973 which extend to the DATA FIELD 2 FLIP-FLOP block and to the DATA FIELD 3 FLIP-FLOP block. Also, the DATA FIELD AND VALIDATION block 940 will provide a "1" on conductor 260 and a "0" on conductor 276.

The TIMING block 230 of FIG. 21 will provide a "0" on conductor 282 and will provide a "1" on conductor 286; the MULTIPLEXER block 288 will provide a "1" on conductor 302. The ACCEPT LATCH block 304 of FIG. 22 will provide a "0" on conductor 330 and a "1" on conductor 284; and the COLLECT block 334 will provide a "1" on conductor 312. The MOTOR START AND RUN block 348 will permit the motor 562 within the MOTOR CONTROLLING sub-block 354 to be de-energized.

The "1", which conductor 260 applies to the upper input of NOR gate 392 in the BLOCKING FINGER CONTROL block 370 of FIG. 22 will cause that NOR gate to apply a "0" to the input of inverter 394. The "1" which that inverter will apply to the lower input of NAND gate 396 will coact with the "1" which conductor 284 applies to the upper input of that NAND gate to cause that NAND gate to apply a "0" to the input of inverter 398. The resulting "1" at the output of that inverter is applied to the lower input of NAND gate 376, to the left-hand terminal of capacitor 400 and, via resistor 404, to the base of NPN transistor 406. The conductor 266 will be applying a "0" to the upper input of NAND gate 376, and hence the "1" which inverter 398 applies to the lower input of that NAND gate will not be effective at this time. However, the "1" which inverter 398 applies to the base of transistor 406 will render that transistor conductive; and hence current will flow from the source of plus twenty-four volts D.C. via solenoid 388, resistor 408 and the collector-emitter circuit of transistor 406 to ground. The value of the current which can flow through resistor 408 is large enough to hold the solenoid 388 energized, but it is not large enough to enable that solenoid to move the blocking member 178 from the blocking position of FIGS. 3, 4 and 8 to the unblocking position of FIG. 9. However, at this time the blocking member 178 will be in the un-blocking position; and the value of the current flowing through solenoid 388 will be large enough to cause that solenoid to continue to hold that blocking member in that position.

The VALIDATE ENABLE block 412 of FIG. 23 will provide a "1" on conductor 424; and the REVERSE LATCH block 426 will provide a "0" on conductor 435, will provide a "1" on conductor 333, and will supply no power to the lamp 450. The RETURN SCRIP block 478 will apply a "1" to conductor 481 which extends to the REVERSE LATCH block 426.

Operation of Scrip Validator When An Authentic Piece Of Scrip Is Inserted: Each authentic piece of scrip 130 will have instructions printed or engraved thereon that will indicate which face of that piece of scrip should face upwardly, and which edge of that piece of scrip should be the leading edge, when that piece of scrip is placed adjacent the platform 32 of the scrip transport 30. The leading edge of the piece of scrip 130 will be moved inwardly of that scrip transport; and, because the blocking member 178 is held in its raised position by the energization of solenoid 388, the fingers 180 and 182 of the blocking member will not bar or impede the inward movement of the leading edge of the piece of scrip 130. That leading edge will be moved far enough inwardly to cause the actuator 148 of switch 146 to close that switch; and, thereupon, a "0" will be applied to the lower input of NOR gate 460 in the SWITCH block 452 of FIG. 23. At this time, the NOR gate 392 in the BLOCKING FINGER CONTROL block 370 of FIG. 22 will be responding to the "1" on conductor 260 to apply a "0" to the upper input of NOR gate 460 and also to the upper input of NOR gate 468. Consequently, NOR gate 460 will apply a "1" to conductor 274 and thus to the lower input of NOR gate 350 in the MOTOR START AND RUN block 348 of FIG. 22. Conductor 262 will be applying a "0" to the upper input of NOR gate 350; and hence that NOR gate will apply a "0" to the input of inverter 352 — with consequent application of a "1" to the middle input of NOR gate 353. The resulting "0" at the output of that NOR gate will back bias diode 355; and inverter 356 will respond to the consequent "0" at the input thereof to apply a "1" to the MOTOR CONTROLLING block 354. As explained in detail in the said Carter et al application, a "1" at the input of the MOTOR CONTROLLING block 354 will cause the motor 562 to operate through output shaft 203, worm gear 202 and worm wheel 200 to drive the lower "runs" of belts 198 and 199 inwardly of the transport 30; and those lower "runs" will cause the piece of scrip 130 to move inwardly of that transport.

The "1" on conductor 274 also will be applied to the A input of the multiplexer 296 in the MULTIPLEXER block 288 of FIG. 21; and, thereupon, the signal at input terminal one of that multiplexer will appear at the output terminal of that multiplexer. Under all normal and usual conditions, the conductor 276 will be applying a "0" to the lower input of NOR gate 292 on that MULTIPLEXER block, and inverter 290 in that block will be applying a "0" to the upper input of that NOR gate, and also to the upper input of NOR gate 294. As a result, NOR gate 292 will normally apply a "1" to input terminal one, and hence also to input terminals three and seven, of multiplexer 296; and, as switch 146 closes, that "1" will appear at the output of that multiplexer and hence on conductor 302. Because a "1" appears on conductor 302, the REVERSE LATCH block 426 of FIG. 23 will not reverse the motor 562. However, if for any reason, conductor 276 has been applying a "1" to the lower input of NOR gate 292, that NOR gate would have applied a "0" rather than a "1" to input terminals one, three and seven of multiplexer 296, and the output terminal of that multiplexer would have applied a "0" to conductor 302. In that event, the REVERSE RELAY block 426 would have caused the motor 562 to reverse.

As the switch 146 closed, it applied a "0" to conductor 270, and thus to the upper input of NAND gate 242 in the TIMING block 230 of FIG. 21, thereby causing that NAND gate to apply a "1" to the input of inverter 244 and also to conductor 282. The "1" on conductor 282 is applied to the lowermost input of NAND gate 434 in the REVERSE LATCH block 426 of FIG. 23;

and that NAND gate and NAND gate 432 constitute an electronic "latch". Consequently, when and if the "0" at the upper input of NAND gate 434 changes from a "0" to a "1"; the output of NAND gate 434 will be able to change to a "0". The "1" at the input of inverter 244 in the TIMING BLOCK 230 will cause that inverter to apply a "0" to the lower input of NAND gate 246; but because BINARY COUNTER 238 has been maintaining a "0" at the upper input of that NAND gate, the application of "0" to the lower input of that NAND gate will not change the output of that NAND gate. However, that "0" will cause NAND gate 246 to continue to provide a "1" at the output thereof after the BINARY COUNTER 238 starts counting.

The belts 198 and 199 will continue to move the piece of scrip 130 inwardly of the transport 30; and, very quickly, the leading edge of that piece of script will cause actuator 158 to close switch 156. At this time, that piece of scrip will be holding both of the switches 146 and 156 closed. The closing of switch 156 will apply a "0" to the lower input of NOR gate 468 in SWITCH block 452 and will apply a "0" to conductor 272. Because conductor 410 is applying a "0" to the upper input of NOR gate 468, that NOR gate will apply a "1" to conductor 262; and that "1" will be applied to the upper input of NOR gate 350 in the MOTOR START AND RUN block 348. However, because conductor 274 has been applying a "1" to the lower input of that NOR gate, the "1" on conductor 262 will not change the output of that NOR gate. The "1" on conductor 262 also will be applied to the upper input of NOR gate 414 in the VALIDATE ENABLE block 412 of FIG. 23; and that NOR gate will apply a "0" to the middle input of NOR gate 416. At this time, NAND gate 306 in the ACCEPT LATCH block 304 is applying a "0" to conductor 330 and thus to the upper input of NOR gate 416; and NAND gate 432 in the REVERSE LATCH block 426 will be applying a "0" to conductor 435 and thus to the lower input of NOR gate 416. That NOR gate will respond to those three "0" inputs to apply a "1" to the input of inverter 422 via resistor 418; and that inverter will apply a "0" which constitutes a "validate enable" signal to conductor 424. That "0" will be applied to the lowermost input of NOR gate 584 in DETECTION block 512 of FIG. 16, and also to the lowermost input of NOR gate 632 in DETECTION block 590 of FIG. 17. At this time, the flip-flop 556 in DETECTION block 512 is applying a "0" to the uppermost input of NOR gate 584, and the flip-flop 567 is applying a "0" to the middle input of that NOR gate; and, similarly, the flip-flop 610 in DETECTION block 590 is a "0" to the uppermost input of NOR gate 632 and flip-flop 622 is applying a "0" to the middle input of that NOR gate. Consequently, NOR gate 584 will apply a "1" to the lower input of NAND gate 552; and NOR gate 632 will apply a "1" to the lower input of NAND gate 634. Because the ENVELOPE DETECTOR 548 in DETECTION block 512 is applying a "0" to the upper input of NAND gate 552, and because the ENVELOPE DETECTOR 630 in DETECTION block 590 is applying a "0" to the upper input of NAND gate 634, the NAND gate 552 will be applying "1's" to the re-set terminals of counters 540 and 582, and the NAND gate 634 will be applying "1's" to the re-set terminals of counters 608 and 620.

Figure 20:
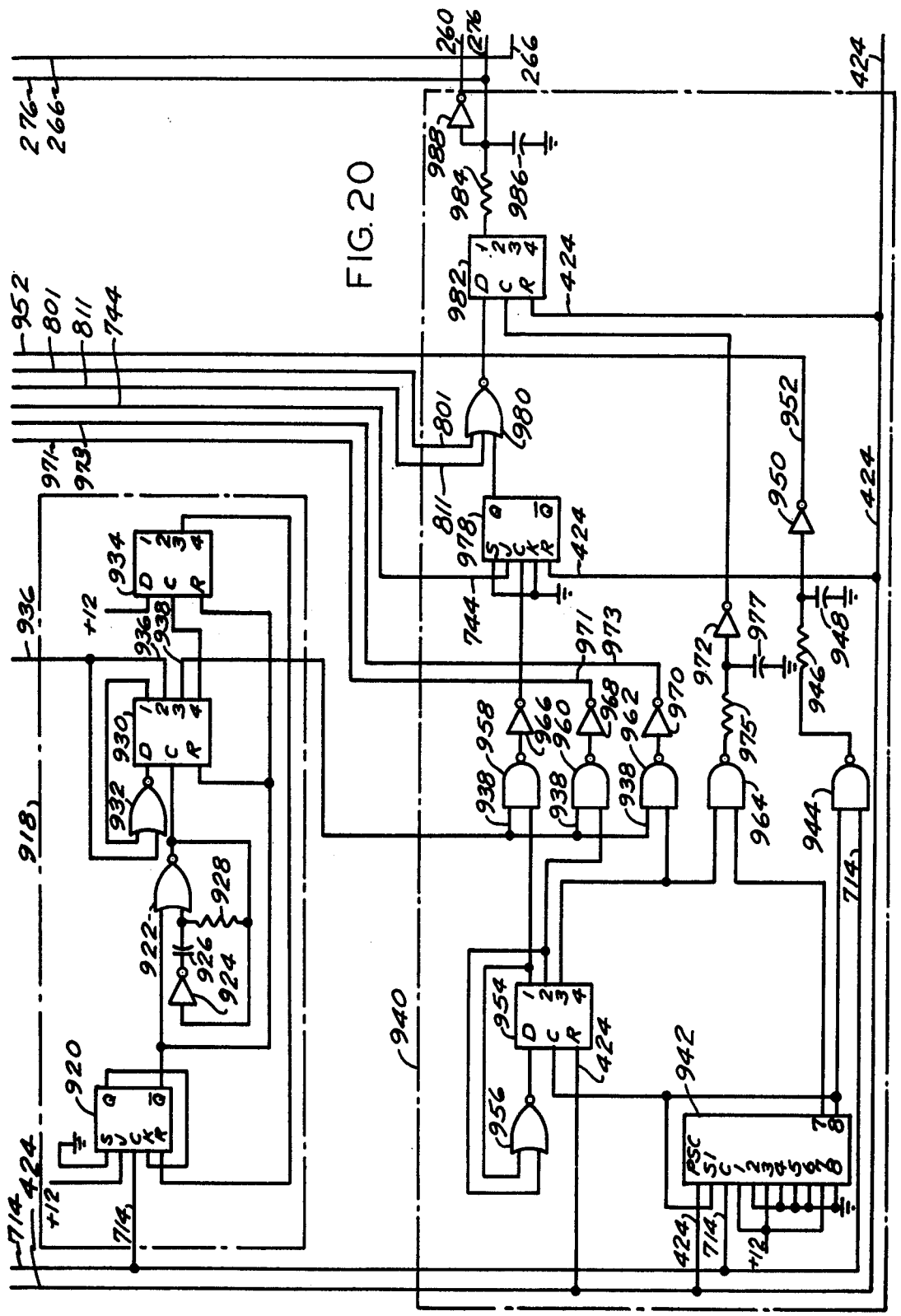

Conductor 424 also will apply "0" to the parallel serial control terminal of the shift register 942 in the DATA FIELD AND VALIDATION block 940 of FIG. 20, and thereby will "enable" the serial input of that register. The "0" on conductor 424 will be applied to the re-set input of flip-flop 978 and to the re-set inputs of counters 954 and 982 in that block; and that "0" will "enable" that flip-flop and those counters. The "0" on conductors 424 will be applied to the re-set inputs of flip-flops 752, 754 and 756 in the DATA FIELD 2 FLIP FLOP block 750 of FIG. 19, and to the re-set inputs of the flip-flops 762, 764 and 766 in the DATA FIELD 3 FLIP FLOP block 760.

The "1", which NOR gate 468 in the SWITCH block 452 of FIG. 23 is applying to the conductor 262, will be applied to the lower input of NOR gate 392 in the BLOCKING FINGER CONTROL block 370 of FIG. 22. However, the application of that "1" will not, at this time, be significant; because conductor 260 has been applying a "1" to the upper input of the NOR gate. The "1" on conductor 262 also will be applied to the upper input of NOR gate 232 in the TIMING block 230; and the resulting "0" at the re-set terminal of BINARY COUNTER 238 permits that BINARY COUNTER to start counting in response to the pulses from the PULSE GENERATOR 248. Those pulses are applied to the input of that BINARY COUNTER at the rate of one every sixteen and seven-tenths milliseconds. Conductor 262 additionally applies the "1" thereon to the B input of multiplexer 296 in the MULTIPLEXER block 288 in FIG. 21; and that "1" will coact with the "1" at the A input of that multiplexer to connect input terminal three, and hence input terminals one and seven, to the output of that multiplexer. Under ordinary and usual conditions, the signal which will be applied to the input terminals one, three and seven at this time will be a "1"; and hence a "1" will be applied to conductor 302. However, if in some way the conductor 276 had a "1" rather than a "0" thereon, NOR gate 292 would be applying a "0" to input terminals one, three and seven of the multiplexer 296; and hence a "0" would appear on conductor 302. That "0" would cause NAND gates 434 and 432 in the REVERSE LATCH block of FIG. 23 to apply a "0" to conductor 436; and that "0" would act through inverter 438, resistor 444, NPN transistor 440, and conductor 333 to cause the motor 562 to reverse.

The "0" which appeared on conductor 272 as switch 156 was closed, will be applied to the middle input of NAND gate 242 in the TIMING block 230 of FIG. 21. Although that "0" will not be effective at this time, it will enable that NAND gate to keep a "1" at the output thereof even after the switch 146 re-opens.

As the piece of scrip is moved inwardly of the transport 30 by the belts 198 and 199, the BINARY COUNTER 238 in the TIMING block 230 of FIG. 21 will continue to count. Approximately 67 milliseconds after switch 156 was closed, a "1" will appear at the binary four output of that BINARY COUNTER, and thus at the middle input of NAND gate 240. That "1" will not be significant at this time because the binary thirty-two output is "0" and will cause NAND gate 240 to maintain a "1" at the output thereof. The "1" will continue to appear at the binary four output of the BINARY COUNTER 238 through count seven; but approximately 134 milliseconds after switch 156 was closed, "0" will again appear at the binary four output, and a "1" will appear at the binary eight output. However, as indicated previously herein, the "0" at the output of inverter 244 will be inhibiting NAND gate 246; and hence the "1" at the upper input of that NAND gate will be unable to change the output of that NAND gate. The "1" will continue to appear at the binary eight output through count fifteen; and while the count of twelve through fifteen, the "1" will re-appear at the binary four output. However, both NAND gates 240 and 246 will be inhibited at this time, and hence those NAND gates will continue to provide "1's" at the outputs hereof. While the count is 20 through 23, a "1" will appear at the binary four output but NAND gate 240 will be inhibited; and while the count is 24 through 31, a "1" will appear at the binary eight output, but NAND gate 246 will still be inhibited. While the count is 28 through 31, a "1" will again appear at binary four output, but NAND gate 240 will still be inhibited.

As the belts 198 and 199 continue to move the piece of scrip 130 inwardly of the transport 30, the patterns 132, 135, 137 and 139 will successively engage and pass beyond the air gap of the magnetic head 210, and the patterns 134, 136, 138 and 141 will successively engage and move past the air gap of the magnetic head 208. The pattern 132 will engage the air gap of the magnetic head 210 after the switch 156 was closed but before the switch 162 is closed; but the switch 162 will be closed before the pattern 141 reaches and then moves beyond the air gap of a magnetic head 208. For the purposes of this description, it will be assumed that the signals which magnetic head 208 develops as each of the patterns 134, 136, 138 and 141 engages and moves past the air gap of that magnetic head meet the requirements of the circuitry in FIGS. 16 and 17, all as explained hereinafter in the section entitled Validation Of Authentic Piece of Scrip. Similarly, it will be assumed that the signals which magnetic head 210 develops as each of the patterns 132, 135, 137 and 139 engages and moves past the air gap of that magnetic head meet the requirements of that circuitry.

As the switch 162 closes, a "0" will be applied to conductor 264 and to the input of inverter 476; and that inverter will apply a "1" to conductor 268. The "0" on conductor 264 will be applied to the lower input of NAND gate 242 in the TIMING block 230 of FIG. 21, but that "0" will not be significant at this time because conductors 270 and 272 are applying "0's" to the upper and middle inputs of that NAND gate. The "0" on conductor 264 also is applied to the upper input of NOR gate 235 in that block; and that "0" will coact with the "0" which conductor 266 is applying to the lower input of that NOR gate to cause that NOR gate to develop a "1" at the output thereof, and thus at the middle input of NOR gate 232. That "1" is not significant at this time, because conductor 262 is applying a "1" to the upper input of that NOR gate; but that "1" will keep a "0" at the output of that NOR gate after the switch 156 re-opens.

The "1" which inverter 476 applies to conductor 268 will be applied to the upper input of NOR gate 236; but that "1" will not be significant at this time because conductor 284 is applying a "1" to the lower input of that NOR gate, and thus is causing that NOR gate to apply a "0" to the lower input of NOR gate 232. The "1" on conductor 268 also is applied to the C input of the multiplexer 296 in the MULTIPLEXER block 288 of FIG. 21; and that "1" will coact with the "1's" which are applied to the A and B inputs of that multiplexer to connect input terminal seven, and hence input terminals one and three, to the output terminal of that multiplexer. Further, conductor 268 will apply the "1" thereon to the lower input of NAND gate 360 in the MOTOR START AND RUN block 348 of FIG. 22, and that "1" will coact with the "1" which conductor 260 is applying to the upper input of that NAND gate to cause that NAND gate to apply a "0" to the input of inverter 362. The resulting "1" at the output of that inverter will be applied to the lower input of NOR gate 353; but, because inverter 352 is applying a "1" to the middle input of that NOR gate, the output of that NOR gate will remain unchanged. However, the "1" which is applied by the inverter 362 will keep the output of NOR gate 353 a "0" even after switches 146 and 156 re-open. In addition, conductor 268 will apply a "1" to the lower input of NOR gate 414 in the VALIDATE ENABLE block 412 of FIG. 23; but that "1" will not be significant at this time because conductor 262 is applying a "1" to the upper input of that NOR gate.

As the belts 198 and 199 continue to move the piece of scrip 130 inwardly of the scrip transport 30, the trailing edge of that piece of scrip will move beyond the actuator 148 of switch 146 and, thereupon, that switch will re-open. This will occur approximately 518 milliseconds after that switch was closed. A "1" will reappear on conductor 270 and will be applied to the upper input of NAND gate 242; and, at this time, the "0's" on conductors 272 and 264 will cause that NAND gate to continue to apply a "1" to conductor 282 and to the input of inverter 244. The re-opening of switch 146 will cause a "0" to reappear on conductor 274; and that conductor will apply "0" to the A input of the multiplexer 296 in the MULTIPLEXER block 288. At this time, the signal at input terminal six of that multiplexer will be applied to the output terminal; and that input signal will be a "1" because NAND gate 240 will be applying a "1" to conductor 278 and the binary output terminal 64 of BINARY COUNTER 238 will be applying a "0" to conductor 280. NAND gate 240 will continue to apply a "1" to conductor 278 until the count within that BINARY COUNTER reaches 36, which will occur approximately 601 milliseconds after the closing of switch 156. Binary output terminal 64 of the BINARY COUNTER 238 will continue to apply "0" to conductor 280 until a total of 64 counts has been counted, which will occur approximately 1069 milliseconds after switch 156 was closed.

The re-opening of switch 146 also causes conductor 274 to re-apply a "0" to the lower input of NOR gate 350; but, at that time, conductor 262 is applying a "1" to the upper input of that NOR gate. Consequently, that NOR gate will continue to have a "0" at the output thereof.

As the belts 198 and 199 continue to move the piece of scrip 130 inwardly of the scrip transport 30, the trailing edge of that piece of scrip will move beyond the actuator 158 of switch 156 and thereby permit that switch to re-open. This will occur approximately five hundred milliseconds after that switch was closed. As switch 156 re-opens, a "1" will be reapplied to conductor 272 and a "0" will be re-applied to conductor 262. The "1" on conductor 272 will be applied to middle input of NAND gate 242 in the TIMING block 230, but that "1" will not be significant at this time because conductor 264 is continuing to apply a "0" to the lower input of that NAND gate. The "0" on conductor 262 will be applied to the upper input of NOR gate 232 in the TIMING block 230; but the output of that NOR gate will continue to be a "0" because NOR gate 235 is applying a 37 1" to the middle input of that NOR gate. The "0" on conductor 262 is re-applied to the B terminal of the multiplexer 296 in the MULTIPLEXER block 288. At this time, the signal at input terminal four, and hence at input terminal six of that multiplexer will be applied to the output terminal; and that input signal will be a "1".

Conductor 262 also will re-apply a "0" to the upper input of NOR gate 350; and that NOR gate will apply a "1" to the input of inverter 352. The resulting "0" at the middle input of NOR gate 353 will not be significant at this time because the inverter 362 is maintaining a "1" at the lower input of that NOR gate. Conductor 262 additionally will re-apply a "0" to the lower input of NOR gate 392 in the BLOCKING FINGER CONTROL block 370, but that "0" will not be significant at this time because conductor 260 is applying a "1" to the upper input of that NOR gate. Further, conductor 262 will re-apply a "0" to the upper input of NOR gate 414, but that "0" will not be significant at this time because conductor 268 is continuing to apply a "1" to the lower input of that NOR gate.

The re-opening of switch 156 will occur before the pattern 141 engages the air gap of magnetic head 208; and until that pattern engages that air gap, the motor 562 will continue to drive the belts 198 and 199, the BINARY COUNTER 238 will continue to count, the solenoid 388 will continue to hold the blocking member 178 in its raised position, and the circuits in FIGS. 16 through 20 will respond to the successive passage of the rest of the pattern on the piece of scrip 130 past the air gaps of the magnetic heads. During the passage of the various patterns past those air gaps, comparisons will be made which will develop a validation signal, all as described in detail in the immediately following section.

Processing of Authentic Piece of Scrip: As the pattern 132 on the piece of scrip 130 engaged and moved past the air gap of magnetic head 210, DETECTION block 512 momentarily applied a "1" to conductor 586 and permitted "0" to remain on conductor 588, and DETECTION block 590 permitted "0's" to remain on conductors 670 and 672. The "1" on conductor 586 was momentarily applied to the upper input of EXCLUSIVE OR gate 676, to the upper input of NOR gate 684, and to the middle input of NOR gate 688; and the "0" on conductor 588 was applied to the upper input of EXCLUSIVE OR gate 630, to the middle input of NOR gate 684, and to the middle input of NOR gate 686. The "0" on conductor 670 was applied to the lower input of EXCLUSIVE OR gate 676, to the lower input of EXCLUSIVE OR gate 680, and to the lower input of NOR gate 684; and the "0" on conductor 672 was applied to the lower input of NAND gate 690 and to the upper inputs of NOR gates 686 and 688.

The EXCLUSIVE OR gates 676, 678, 680 and 682 coacted with NAND gate 690, with NOR gates 684, 686 and 688 and with inverter 692 to momentarily apply a "1" on conductor 708 and "0's" on conductors 710 and 712. The "1" on conductor 708 was momentarily applied to input terminal seven of shift register 718 of the COMPARISON REGISTER block 716 and also, via capacitor 698, to the upper input of NOR gate 706. The "0" on conductor 710 was momentarily applied to input terminal six of that shift register; and also, via capacitor 696, to the middle input of NOR gate 706. The "0" on conductor 712 was momentarily applied to input terminal five of that shift register; and also, via capacitor 694, to the lower input of NOR gate 706. The inverter 707 momentarily responded to the "0" at the output of NOR gate 706 to apply a "1" to conductor 714; and that conductor applied that "1" to COMPARISON REGISTER block 716, to CLOCK GENERATOR block 918, and to DATA FIELD AND VALIDATION block 940.

The momentary "1" which conductor 714 applied to the COMPARISON REGISTER block 716 was applied to the parallel serial control of shift register 718; and, thereupon that shift register parallel loaded the data at inputs one through eight thereof. Because input terminals one through four and eight are permanently connected together and to ground, and because conductors 712 and 170 were applying "0's" to input terminals five and six, the only "1" which was loaded into the shift register 718 was the "1" which conductor 708 applied to input terminal seven. That shift register retained that parallel loaded information even though the "1" on conductor 708, and hence the "1" on conductor 714, were applied only momentarily.

The application of the "1" by conductor 714 to the DATA FIELD AND VALIDATION block 940 clocked the shift register 942, and thereby serially shifted the data in that shift register one stage. This means that a "0" will appear at output terminal seven, and thus at the lower input of NAND gate 964; and it also means that a "1" will appear at output terminal eight, and thus at the upper input of NAND gate 944, at the serial input of that shift register, and at the clock input of counter 954. The application of the "0" to the lower input of NAND gate 964 will not be effective at this time because a "0" has been applied to the upper input of that NAND gate by output terminal three of counter 954. The application of the "1" to the clock input of counter 954 will make the output at terminal one thereof, and hence at the lower input of NAND gate 958, a "1". The "1" at the lower input of NAND gate 958 will not be effective at this time because output terminal three of counter 930 is applying a "0" to the upper input of that NAND gate, and is thus holding a constant "1" at the output of that NAND gate. The application of a "1" to the upper input of NAND gate 944 will coact with the "1" which was applied to the lower input of that NAND gate by conductor 714 to develop a "0" at the output of that NAND gate. Inverter 950 will apply a "1" to conductor 952 and thus to the parallel serial control of shift registers 720, 722 and 724; and will thereby cause the data at the input terminals one through eight of those shift registers to be parallel loaded into those shift registers. This means that terminals one, three through six and eight of shift register 720 will have "0's" and that input terminals two and seven of that shift register will have "1's", that input terminals one, two, five, six and eight of shift register 722 will have "0's" and that input terminals three, four and seven of that shift register will have "1's", and that input terminals one, two, five, seven and eight of shift register 724 will have "0's" and that input terminals three, four and six of that shift register will have "1's".

The momentary application by conductor 714 of the "1" to the CLOCK GENERATOR block 918 of FIG. 20 will cause the flip-flop 920 to apply a "1" to the upper output thereof, and thus to the K input thereof; and also will cause that flip-flop to apply a "0" to the upper input of NOR gate 922 and to the re-set terminals of counters 930 and 934. The NOR gate 922, the inverter 924, the capacitor 926 and the resistor 928 constitute an oscillator which will apply positive-going clock pulses to the clock input of counter 930; and that counter will respond to those clock impulses to continuously "clock in" the data at the output of NOR gate 932.

That data is controlled by the signals at output terminals one and two of that counter.

At the end of the first clock pulse from NOR gate 922, a "1" will appear at output terminal one and "0"s will appear at output terminals two, three and four of counter 930. At the end of the second clock pulse, "0"s will appear on output terminals one, three and four and a "1" will appear at output terminal two of that counter; and that "1" will be applied by conductor 936 to the clock inputs of the shift registers 718, 720, 722 and 724. The resulting serial shifting of the data in those shift registers will provide a "1" at output terminal eight of shift register 718 and hence on conductor 730, will provide a "0" at output terminal six and a "1" at output terminal eight of shift register 720 and hence on conductor 728, will provide a "1" at output terminal eight of shift register 722 and hence on conductor 732, and will leave a "0" at output terminal eight of shift register 724 and hence on conductor 734. In addition, the serial shifting of shift register 720 will shift the "1", which NOR gate 726 had been applying to the serial input of that shift register, into the first stage of that shift register. Simultaneously, because the serial inputs of the shift registers 718, 722 and 724 are grounded, those shift registers shifted "0"s into the first stages thereof.

The "1" on conductor 730 will be applied to the lower inputs of EXCLUSIVE OR gates 738, 740 and 742. EXCLUSIVE OR gate 738 will have "1"s at both inputs thereof, and hence will apply a "0" to conductor 744, and EXCLUSIVE OR gate 740 will have "1"s at both inputs thereof, and hence will apply a "0" to conductor 746, but EXCLUSIVE OR gate 742 will have a "0" at the upper input thereof and will have a "1" at the lower input thereof, and hence will apply a "1" to conductor 748. Conductor 746 applies the "0" at the output of EXCLUSIVE OR gate 740 to the J input of flip-flop 754 and to the J input of flip-flop 764, and conductor 748 applies the "1" at the output of EXCLUSIVE OR gate 742 to the J input of flip-flop 756 and to the J input of flip-flop 766. In addition, conductor 744 is applying the "0" at the output of EXCLUSIVE OR gate 738 to the J input of flip-flop 752 and to the J input of flip-flop 762. However, at this time, the inverters 968 and 970 in the DATA FIELD AND VALIDATION block 940 in FIG. 20 are applying "0"s to the clock inputs of all of the flip-flops 752, 754, 756, 762, 764 and 766 via conductors 971 and 973. Consequently, the application by conductors 744, 746 and 748 of signals to the J inputs of those flip-flops is not significant at this time. The "0" on conductor 744 also is applied to the J input of flip-flop 978 in the DATA FIELD AND VALIDATION block 940; but, at this time, "0" appears on the clock input of that flip-flop and hence no change will occur in the output of that flip-flop.

At the end of the third clock pulse from NOR gate 922, "0"s will appear at output terminals one, two and four and a "1" will appear at output terminal three of counter 930; and conductor 938 will apply that "1" to the upper inputs of NAND gates 958, 960 and 962 in the DATA FIELD AND VALIDATION block 940. Because "0"s are applied to the lower inputs of NAND gates 960 and 962 by counter 954, the outputs of those NAND gates will remain unchanged. However, because output terminal one of counter 954 is applying a "1" to the lower input of NAND gate 958, the application of a "1" to the upper input of that NAND gate by conductor 938 will cause that NAND gate to apply a "0" to the input of inverter 966. That inverter will apply a "1" to the clock input of flip-flop 978; but, because "0" is being applied to the J input of that flip-flop by conductor 744, the output of that flip-flop will remain unchanged.

At the end of the fourth clock pulse from NOR gate 922, "0"s will appear at output terminals two and three and "1"s will appear at output terminals one and four of counter 930. The "1" at output terminal four will be applied to the clock input of counter 934; and, thereupon, the "1" at the data input of the latter counter will appear at output terminal one and "0"s will appear at output terminals two, three and four of that latter counter. The "0" at output terminal three will continue to appear at the re-set input of flip-flop 920.

At the end of the fifth clock pulse from NOR gate 922, "0"s will appear at output terminals one, three and four, and a "1" will appear at output terminal two, of counter 930. The resulting "1" at the clock inputs of shift registers 718, 720, 722 and 724 will cause those shift registers to shift the data therein. A further "0" will be shifted into the first stage of each of the shift registers 718, 722 and 724, and the "0" at the output of NOR gate 726 will be shifted into the first stage of shift register 720. "0"s will appear at output terminals eight of shift registers 718, 720 and 722, a "0" will appear at output terminal six of shift register 720, and a "1" will appear at output terminal eight of shift register 724. EXCLUSIVE OR gates 738, 740 and 742 will respond to the resulting "0"s on conductors 728, 730 and 732 and to the resulting "1" on conductor 734 to apply "0"s to conductors 744 and 746 and a "1" to conductor 748. Because inverters 968 and 970 are still applying "0"s to the clock inputs of flip-flops 752, 754, 756, 762, 764 and 766, the signals on conductors 744, 746 and 748 can not affect the states of those flips-flops. The "0" on conductor 744 also is applied to the J input of flip-flop 978 in the DATA FIELD AND VALIDATION block 940; but, at this time, "0" appears on the clock input of that flip-flop and hence no change will occur in the output of that flip-flop.

At the end of the sixth clock pulse from NOR gate 922, "0"s will appear at output terminals one, two and four and a "1" will appear at output terminal three of counter 930; and conductor 938 will apply that "1" to the upper inputs of NAND gates 958, 960 and 962 in the DATA FIELD AND VALIDATION block 940. Because "0"s are applied to the lower inputs of NAND gates 960 and 962 by counter 954, the outputs of those NAND gates will remain unchanged. However, because output terminal one of counter 954 is applying a "1" to the lower input of NAND gate 958, the application of a "1" to the upper input of that NAND gate by conductor 938 will cause that NAND gate to apply a "0" to the input of inverter 966. That inverter will apply a "1" to the clock input of flip-flop 978; but, because "0" is being applied to the J input of that flip-flop by conductor 744, the output of that flip-flop will remain unchanged.

At the end of the seventh clock pulse from NOR gate 922, "0"s will appear at output terminals two and three and "1"s will appear at output terminals one and four of counter 930. The "1" at output terminal four will be applied to the clock input of counter 934; and, thereupon, the "1" at the data input of the latter counter will appear at output terminal two and "0"s will appear at output terminals one, three and four of that latter counter. The "0" at output terminal three will continue to appear at the re-set input of flip-flop 920.

At the end of the eighth clock pulse from NOR gate 922, "0's" will appear at output terminals one, three and four, and a "1" will appear at output terminal two of counter 930. The resulting "1" at the clock inputs of shift registers 718, 720, 722 and 724 will cause those shift registers to shift the data therein. A further "0" will be shifted into the first stage of each of the shift registers 718, 720, 722 and 724, and the "1" at the output of NOR gate 726 will be shifted into the first stage of shift register 720. "0's" will appear at output terminals eight of all of the shift registers 718, 720, 722 and 724. In addition, a "0" will appear at output terminal six of shift register 720. EXCLUSIVE OR gates 738, 470 and 742 will respond to the resulting "0's" on conductors 728, 730, 372 and 734 to apply "0's" to conductors 744, 746 and 748. Because inverters 968 and 970 are still applying "0's" to the clock inputs of flip-flops 752, 754, 756, 762, 764 and 766, the signals on conductors 744, 746 and 748 can not affect the states of those flip-flops. The "0" on conductor 744 also is applied to the J input of flip-flop 978 in the DATA FIELD AND VALIDATION block 940; but, at this time, "0" appears on the clock input of that flip-flop and hence no change will occur in the output of that flip-flop.

At the end of the ninth clock pulse from NOR gate 922, "0's" will appear at output terminals one, two and four and a "1" will appear at output terminal three of counter 930; and conductor 938 will apply that "1" to the upper inputs of NAND gates 958, 960 and 962 in the DATA FIELD AND VALIDATION block 940. Because "0's" are applied to the lower inputs of NAND gates 960 and 962 by counter 954, the outputs of those NAND gates will remain unchanged. However, because output terminal one of counter 954 is applying a "1" to the lower input of NAND gate 958, the application of a "1" to the upper input of that NAND gate by conductor 938 will cause that NAND gate to apply a "0" to the input of inverter 966. That inverter will apply a "1" to the clock input of flip-flop 978; but, because "0" is being applied to the J input of that flip-flop by conductor 744, the output of that flip-flop will remain unchanged.

At the end of the tenth clock pulse from NOR gate 922, "0's" will appear at output terminals two and three and "1's" will appear at output terminals one and four of counter 930. The "1" at terminal four will be applied to the clock input of counter 934; and, thereupon, the "1" at the data input of the latter counter will appear at output terminal three and "0's" will appear at output terminals one, two and four of that latter counter. The "1" at output terminal three will be applied to the re-set input of flip-flop 920 and will re-set that flip-flop. The resulting "1" at the lower output of that flip-flop will be applied to the upper input of NOR gate 922 — with consequent halting of the development of clock pulses at the output of that NOR gate.

The continued movement of the piece of scrip 130 inwardly of the scrip transport 30 will permit the rest of the lines of pattern 132 to pass beneath the air gap of the magnetic head 210, and the FREQUENCY DETECTOR 526 will respond to those lines to apply additional signals to the input of counter 540. However, that counter was re-set by the "1" at the output of NAND gate 552, at the end of the momentary "1" which appeared on conductor 586, all as explained hereinafter in the section entitled Validation of Authentic Piece of Scrip; and hence those signals will be counted by that counter. However, because the total number of lines in pattern 132 does not exceed twice the count to which the counter 540 has been pre-set, that counter will not cause the DETECTION block 512 to apply a second "1" to conductor 586.

During the movement of the pattern 132 past the air gap of the magnetic head 210, ten clock pulses were developed at the output of NOR gate 922 and were applied to counter 930; and that counter responded to the second, fifth and eighth of those pulses to serially shift the data in the shift registers 718, 720, 722 and 724 three times. At the end of each serial shift, the EXCLUSIVE OR gates 738, 740 and 742 compared the signals at output terminals of shift registers 720, 722 and 724 with the signal at output terminal eight of shift register 718. Because the outputs of EXCLUSIVE OR gates 740 and 742 are connected only to the J inputs of flip-flops 752, 754, 756, 762, 764 and 766, and because inverters 968 and 970 maintained "0's" at the clock inputs of all of those flip-flops, the comparisons made by those two EXCLUSIVE OR gates were not significant. However, in addition to being connected to the J inputs of flip-flops 752, 754, 756, 762, 764 and 766, the output of EXCLUSIVE OR gate 738 is connected to the J input of flip-flop 978. Consequently, the output of EXCLUSIVE OR gate 738 was applied to the J input of flip-flop 978 at the time the counter 930 responded to the third, sixth and ninth of the clock pulses, from NOR gate 922, to cause NAND gate 958 and inverter 966 to apply clocking pulses to that flip-flop. If at the end of those third, sixth and ninth clock pulses, the output of EXCLUSIVE OR gate had been a "1" instead of a "0", the flip-flop 978 would have changed its state, and it would thereafter retain that changed state throughout the further sensing of the piece of scrip 130. Such a change of state of flip-flop 978 would lead to the rejection of that piece of scrip. In the sense that flip-flop 978 will change its state at the ends of any of the third, sixth and ninth clock pulses if the output of EXCLUSIVE OR gate 738 is a "1", and will not change its state at such times if the output of that EXCLUSIVE OR gate is a "0", that flip-flop acts as a comparator. This means that during the movement of the pattern 132 past the air gap of the magnetic head 210, three comparisons were made of the states of the output of EXCLUSIVE OR gate 738.

Each time a "1" is applied to conductor 714, the pre-wired connections to input terminals one through four and eight of shift register 718 will cause "0's" to be loaded in the stages one through four and eight, and the signals which the SIGNAL DECODING block 674 applies to conductors 712, 710 and 708 will be loaded into stages five through seven of that shift register; as indicated in detail hereinbefore, and as shown hereinafter by Section A of TABLE I, that block applies "0's" to conductors 712 and 710 and a "1" to conductors 708 whenever the "1" on conductor 714 is applied as a result of the sensing of pattern 132. Section A also shows the states which the stages of shift registers 720, 722 and 724 will assume in response to the pre-wired connections to the input terminals thereof whenever NAND gate 944 responds to a "1" on conductor 714 to cause inverter 950 to apply a "1" to the parallel serial controls of those shift registers. Further, TABLE I shows the signals which are at output terminals six and eight of the shift registers 718, 720, 722 ad 724. The data, which is loaded into the shift register 718, can be seen to be supplied in part by pre-wired connections and in part by signals which are a function of the patterns on the inserted piece of scrip; whereas the data which is loaded into the shift registers 720, 722 and 724 is supplied solely by pre-wired connections.

During the sensing of pattern 132, the data in each of the shift registers 718, 720, 722 and 724 was serially shifted three times; and each time the signals at the serial inputs were shifted into the first stages of those shift registers. Because the serial inputs of shift registers 718, 722 and 724 are pre-wired to ground, the signals which were successively shifted into the first stages of those three shift registers were "0's". However, because the serial input of shift register 720 is connected to the output of NOR gate 726, various signals were applied to that input and were shifted into the first stage of that shift register, all as shown by TABLE II hereof. In that TABLE, the first group of lines "2", "5" and "8" show the input signals developed during the sensing of pattern 132; and the next seven groups of lines "2", "5" and "8" show the signals developed during the sensing of patterns 134, 135, 136, 137, 138, 139 and 141.

At the end of each shift of data within the shift registers 718, 720, 722 and 724, signals appeared at the output terminals six and eight of those shift registers; and the values of those signals are shown in TABLE III hereof. Also shown in TABLE III are the signals which appear at the outputs of EXCLUSIVE OR gates 738, 740, and 742. In TABLE III, the first group of lines "2", "5" and "8" show the output signals developed during the sensing of pattern 132; and the next seven groups of lines "2", "5" and "8" show the output signals developed during the sensing of patterns 134, 135, 136, 137, 138, 139 and 141.

TABLE I

Section A
STATES OF STAGES AFTER "1" IS APPLIED
TO PSC TERMINAL AS PATTERN 132 IS SENSED

| Stages | 718 | 720 | 722 | 724 |
| --- | --- | --- | --- | --- |
| Input Into 1 | 0 | 0 | 0 | 0 |
| Input Into 2 | 0 | 1 | 0 | 0 |
| Input Into 3 | 0 | 0 | 1 | 1 |
| Input Into 4 | 0 | 0 | 1 | 1 |
| Input Into 5 | 0 | 0 | 0 | 0 |
| Input Into 6 | 0 | 0 | 0 | 1 |
| Input Into 7 | 1 | 1 | 1 | 0 |
| Input Into 8 | 0 | 0 | 0 | 0 |
| Output From 6 | — | 0 | — | — |
| Output From 8 | 0 | 0 | 0 | 0 |

Section B
STATES OF STAGES AFTER "1" IS APPLIED
PSC TERMINAL AS PATTERN 134 IS SENSED

| Stages | 718 | 720 | 722 | 724 |
| --- | --- | --- | --- | --- |
| Input Into 1 | 0 | 1 | 0 | 0 |
| Input Into 2 | 0 | 0 | 0 | 0 |
| Input Into 3 | 0 | 1 | 0 | 0 |
| Input Into 4 | 0 | 0 | 0 | 0 |
| Input Into 5 | 1 | 1 | 0 | 0 |
| Input Into 6 | 0 | 0 | 1 | 1 |
| Input Into 7 | 0 | 0 | 1 | 1 |
| Input Into 8 | 0 | 0 | 0 | 0 |
| Output From 6 | — | 0 | — | — |
| Output From 8 | 0 | 0 | 0 | 0 |

Section C
STATES OF STAGES AFTER "1" IS APPLIED
TO PSC TERMINAL AS PATTERN 135 IS SENSED

| Stages | 718 | 720 | 722 | 724 |
| --- | --- | --- | --- | --- |
| Input Into 1 | 0 | 1 | 0 | 0 |
| Input Into 2 | 0 | 0 | 0 | 0 |
| Input Into 3 | 0 | 1 | 0 | 0 |
| Input Into 4 | 0 | 1 | 0 | 0 |
| Input Into 5 | 0 | 0 | 0 | 0 |
| Input Into 6 | 1 | 1 | 0 | 0 |
| Input Into 7 | 0 | 0 | 0 | 0 |
| Output From 6 | — | 1 | — | — |
| Output From 8 | 0 | 0 | 0 | 0 |

Section D

TABLE I-continued
STATES OF STAGES AFTER "1" IS APPLIED
TO PSC TERMINAL AS PATTERN 136 IS SENSED

| Stages | 718 | 720 | 722 | 724 |
| --- | --- | --- | --- | --- |
| Input Into 1 | 0 | 0 | 0 | 0 |
| Input Into 2 | 0 | 1 | 0 | 0 |
| Input Into 3 | 0 | 0 | 0 | 0 |
| Input Into 4 | 0 | 1 | 0 | 0 |
| Input Into 5 | 0 | 0 | 0 | 0 |
| Input Into 6 | 1 | 1 | 0 | 0 |
| Input Into 7 | 1 | 1 | 0 | 0 |
| Input Into 8 | 0 | 0 | 0 | 0 |
| Output From 6 | — | 1 | — | — |
| Output From 8 | 0 | 0 | 0 | 0 |

Section E
STATES OF STAGES AFTER "1" IS APPLIED
TO PSC TERMINAL AS PATTERN 137 IS SENSED

| Stages | 718 | 720 | 722 | 724 |
| --- | --- | --- | --- | --- |
| Input Into 1 | 0 | 0 | 0 | 0 |
| Input Into 2 | 0 | 1 | 0 | 0 |
| Input Into 3 | 0 | 0 | 1 | 1 |
| Input Into 4 | 0 | 0 | 1 | 1 |
| Input Into 5 | 0 | 0 | 0 | 0 |
| Input Into 6 | 0 | 0 | 0 | 1 |
| Input Into 7 | 1 | 1 | 1 | 0 |
| Input Into 8 | 0 | 0 | 0 | 0 |
| Output From 6 | — | 0 | — | — |
| Output From 8 | 0 | 0 | 0 | 0 |

Section F
STATES OF STAGES AFTER "1" IS APPLIED
TO PSC TERMINAL AS PATTERN 138 IS SENSED

| Stages | 718 | 720 | 722 | 724 |
| --- | --- | --- | --- | --- |
| Input Into 1 | 0 | 1 | 0 | 0 |
| Input Into 2 | 0 | 0 | 0 | 0 |
| Input Into 3 | 0 | 1 | 0 | 0 |
| Input Into 4 | 0 | 0 | 0 | 0 |
| Input Into 5 | 1 | 1 | 0 | 0 |
| Input Into 6 | 0 | 0 | 1 | 1 |
| Input Into 7 | 0 | 0 | 1 | 1 |
| Input Into 8 | 0 | 0 | 0 | 0 |
| Output From 6 | — | 0 | — | — |
| Output From 8 | 0 | 0 | 0 | 0 |

Section G
STATES OF STAGES AFTER "1" IS APPLIED
TO PSC TERMINAL AS PATTERN 139 IS SENSED

| Stages | 718 | 720 | 722 | 724 |
| --- | --- | --- | --- | --- |
| Input Into 1 | 0 | 0 | 0 | 0 |
| Input Into 2 | 0 | 1 | 0 | 0 |
| Input Into 3 | 0 | 0 | 1 | 1 |
| Input Into 4 | 0 | 0 | 1 | 1 |
| Input Into 5 | 0 | 0 | 0 | 0 |
| Input Into 6 | 0 | 0 | 0 | 1 |
| Input Into 7 | 1 | 1 | 1 | 0 |
| Input Into 8 | 0 | 0 | 0 | 0 |
| Output From 6 | — | 0 | — | — |
| Output From 8 | 0 | 0 | 0 | 0 |

Section H
STATES OF STAGES AFTER "1" IS APPLIED
TO PSC TERMINAL AS PATTERN 141 IS SENSED

| Stages | 718 | 720 | 722 | 724 |
| --- | --- | --- | --- | --- |
| Input Into 1 | 0 | 1 | 0 | 0 |
| Input Into 2 | 0 | 0 | 0 | 0 |
| Input Into 3 | 0 | 1 | 0 | 0 |
| Input Into 4 | 0 | 0 | 0 | 0 |
| Input Into 5 | 0 | 1 | 0 | 0 |
| Input Into 6 | 1 | 0 | 1 | 1 |
| Input Into 7 | 1 | 0 | 1 | 1 |
| Input Into 8 | 0 | 0 | 0 | 0 |
| Output From 6 | — | 0 | — | — |
| Output From 8 | 0 | 0 | 0 | 0 |

TABLE II
SIGNALS APPLIED TO SERIAL INPUTS
AS CLOCK PULSES ARE DEVELOPED
BY NOR GATE 922

| Pulse | Pattern | 718 | 720 | 722 | 724 |
| --- | --- | --- | --- | --- | --- |
| 2 | 132 | 0 | 1 | 0 | 0 |
| 5 | 132 | 0 | 0 | 0 | 0 |
| 8 | 132 | 0 | 1 | 0 | 0 |
| 2 | 134 | 0 | 1 | 0 | 0 |
| 5 | 134 | 0 | 0 | 0 | 0 |
| 8 | 134 | 0 | 1 | 0 | 0 |

TABLE II-continued

| | SIGNALS APPLIED TO SERIAL INPUTS AS CLOCK PULSES ARE DEVELOPED BY NOR GATE 922 | | | | |
|---|---|---|---|---|---|
| Pulse | Pattern | 718 | 720 | 722 | 724 |
| 2 | 135 | 0 | 0 | 0 | 0 |
| 5 | 135 | 0 | 1 | 0 | 0 |
| 8 | 135 | 0 | 0 | 0 | 0 |
| 2 | 136 | 0 | 0 | 0 | 0 |
| 5 | 136 | 0 | 0 | 0 | 0 |
| 8 | 136 | 0 | 0 | 0 | 0 |
| 2 | 137 | 0 | 1 | 0 | 0 |
| 5 | 137 | 0 | 0 | 0 | 0 |
| 8 | 137 | 0 | 1 | 0 | 0 |
| 2 | 138 | 0 | 1 | 0 | 0 |
| 5 | 138 | 0 | 0 | 0 | 0 |
| 8 | 138 | 0 | 1 | 0 | 0 |
| 2 | 139 | 0 | 1 | 0 | 0 |
| 5 | 139 | 0 | 0 | 0 | 0 |
| 8 | 139 | 0 | 1 | 0 | 0 |
| 2 | 141 | 0 | 1 | 0 | 0 |
| 5 | 141 | 0 | 0 | 0 | 0 |
| 8 | 141 | 0 | 1 | 0 | 0 |

TABLE III

| | | SIGNALS DEVELOPED AT OUTPUT TERMINALS AS CLOCK PULSES ARE DEVELOPED BY NOR GATE 922 | | | | | | | |
|---|---|---|---|---|---|---|---|---|---|
| Pulse | Pat. | 718 Ter.8 | 720 Ter.6 | 720 Ter.8 | 722 Ter.8 | 724 Ter.8 | Ex.OR 738 | Ex.OR 740 | Ex.OR 742 |
| 2 | 132 | 1 | 0 | 1 | 1 | 0 | 0 | 0 | 1 |
| 5 | 132 | 0 | 0 | 0 | 0 | 1 | 0 | 0 | 1 |
| 8 | 132 | 0 | 0 | 0 | 0 | 0 | 0 | 0 | 0 |
| 2 | 134 | 0 | 1 | 0 | 1 | 1 | 0 | 1 | 1 |
| 5 | 134 | 0 | 0 | 0 | 1 | 1 | 0 | 1 | 1 |
| 8 | 134 | 1 | 1 | 1 | 0 | 0 | 0 | 1 | 1 |
| 2 | 135 | 0 | 0 | 0 | 0 | 0 | 0 | 0 | 0 |
| 5 | 135 | 1 | 1 | 1 | 0 | 0 | 0 | 1 | 1 |
| 8 | 135 | 0 | 1 | 0 | 0 | 0 | 0 | 0 | 0 |
| 2 | 136 | 1 | 0 | 1 | 0 | 0 | 0 | 1 | 1 |
| 5 | 136 | 1 | 1 | 1 | 0 | 0 | 0 | 1 | 1 |
| 8 | 136 | 0 | 0 | 0 | 0 | 0 | 0 | 0 | 0 |
| 2 | 137 | 1 | 0 | 1 | 1 | 0 | 0 | 0 | 1 |
| 5 | 137 | 0 | 0 | 0 | 0 | 1 | 0 | 0 | 1 |
| 8 | 137 | 0 | 0 | 0 | 0 | 0 | 0 | 0 | 0 |
| 2 | 138 | 0 | 1 | 0 | 1 | 1 | 0 | 1 | 1 |
| 5 | 138 | 0 | 0 | 0 | 1 | 1 | 0 | 1 | 1 |
| 8 | 138 | 1 | 1 | 1 | 0 | 0 | 0 | 1 | 1 |
| 2 | 139 | 1 | 0 | 1 | 1 | 0 | 0 | 0 | 1 |
| 5 | 139 | 0 | 0 | 0 | 0 | 1 | 0 | 0 | 1 |
| 8 | 139 | 0 | 0 | 0 | 0 | 0 | 0 | 0 | 0 |
| 2 | 141 | 1 | 1 | 0 | 1 | 1 | 1 | 0 | 0 |
| 5 | 141 | 1 | 0 | 0 | 1 | 1 | 1 | 0 | 0 |
| 8 | 141 | 0 | 1 | 1 | 0 | 0 | 1 | 0 | 0 |

The "1's" which must be applied to the parallel serial controls of shift registers 720, 722 and 724 are controlled by shift register 942 and NAND gate 944; and those "1's" will be applied during the sensing of the first, fifth and seventh patterns on a piece of scrip. Initially, stages one, three and seven of shift register 942 have "1's" therein, and stages two, four through six and eight have "0's" therein. In response to the "1" which is applied to conductor 714 as pattern 132 is sensed, shift register 942 will shift a "1" into stage eight thereof and will apply that "1" to the upper input of NAND gate 944. That "1" will coact with the momentary "1" which conductor 714 applies to the lower input of that NAND gate to cause that NAND gate to apply a "0" to the input of inverter 950 — with consequent application of a "1" to the parallel serial controls of shift registers 720, 722 and 724. In this way, shift register 942 and NAND gate 944 apply a "1" to the parallel serial controls of shift registers 720, 722 and 724 as the first "1" is applied to conductor 714.

At the same time the second "1" is applied to conductor 714, shift register 942 will shift a "0" into stage eight thereof and will apply that "0" to the upper input of NAND gate 944; and hence that NAND gate will be unable to respond to the momentary "1" on conductor 714 to cause inverter 950 to apply a "1" to the parallel serial controls of shift registers 720, 722 and 724. Similarly, when each of the third and fourth "1's" is applied to the conductor 714, the momentary "1" on conductor 714 will be unable to cause inverter 950 to apply a "1" to the parallel serial controls of shift registers 720, 722 and 724. However, at the time the fifth "1" is applied to conductor 714, shift register 942 will shift a "1" into stage eight thereof and will apply that "1" to the upper input of NAND gate 944; and hence that NAND gate will respond to the momentary "1" on conductor 714 to cause inverter 950 to apply a "1" to the parallel serial controls of shift registers 720, 722 and 724. When the sixth "1" is applied to conductor 714, shift register 942 will shift a "0" into stage eight thereof and will apply that "0" to the upper input of NAND gate 944; and hence that NAND gate will be unable to respond to the momentary "1" on conductor 714 to cause inverter 950 to apply a "1" to the parallel serial controls of shift registers 720, 722 and 724. However, when the seventh "1" is applied to conductor 714 shift register 942 will shift a "1" into stage eight thereof and will apply that "1" to the upper input of NAND gate 944; and hence that NAND gate will respond to the momentary "1" on conductor 714 to cause inverter 950 to apply a "1" to the parallel serial controls of shift registers 720, 722 and 724.

Prior to the first shift of the data in shift register 942, a "1" appears at output terminal seven and is applied to the lower input of NAND gate 964. However, because counter 954 applies a "0" to the upper input of that NAND gate, the "1" at the lower input of that NAND gate is not effective. The first, second and third shift of the data in shift register 942 will cause "0's" to appear at output terminal seven and hence at the lower input of NAND gate 964, but those "0's" will not change the output of that NAND gate. The fourth shift of the data in shift register 942 will again cause a "1" to appear at output terminal seven; but again that "1" will not change the output of NAND gate 964. The fifth shift of the data in shift register 942 will again cause a "0" to appear at output terminal seven; but again that "0" will not change the output of NAND gate 964. The sixth shift of the data in shift register 942 will again cause a "1" to appear at output terminal seven; but again that "1" will not change the outout of NAND gate 964. The seventh shift of the data in shift register 942 will again cause a "0" to appear at output terminal seven; but again that "0" will not change the output of NAND gate 964. The eighth shift of the data in shift register 942 will again cause a "1" to appear at output terminal seven; and, because counter 954 will be applying a "1" to the upper input of NAND gate 964, that NAND gate will develop a "0" at the output thereof.

All of this means that although the shift register 718 is parallel loaded as each pattern is being sensed, the shift registers 720, 722 and 724 will be parallel loaded only while the first pattern of the data field 1 is being sensed, while the first pattern of data field 2 is being sensed, and while the first pattern of data field 3 is being sensed. Further, it means that although a "1" initially appears at the seventh output terminal of shift register 942, and also appears at the terminal as a result of the fourth, sixth and eighth shifts of the data in that shift register, only the "1" which appears at that output terminal as a result of the eighth data shift will change the output of NAND gate 964.

At the time a "1" is applied to conductor 952, and hence to the parallel serial controls of shift registers 720, 722 and 724, pre-set values will be loaded into the stages of those shift registers because all of the numbered inputs of those shift registers are pre-wired to ground or to the source of plus 12 volts. Specifically, inputs one, three through six and eight of shift register 720, inputs one, two, five, six and eight of shift register 722, and inputs one, two, five, seven and eight of shift register 724 are connected to ground, and the remaining numbered terminals of those shift registers are connected to the source of twelve volts.

As the pattern 134 engages and moves past the air gap of magnetic head 208, DETECTION block 590 will momentarily apply a "1" to conductor 672 and will permit a "0" to remain on conductor 670. The "1" on conductor 672 will be momentarily applied to the lower input of NAND gate 690 and to the upper inputs of NOR gates 686 and 688, and the "0" on conductor 670 will appear at the lower inputs of EXCLUSIVE OR gates 676 and 680 and at the lower input of NOR gate 684. Conductor 588 will apply a "0" to the upper input of EXCLUSIVE OR gate 680 and to the middle inputs of NOR gates 684 and 686; and conductor 586 will apply a "0" to the upper input of EXCLUSIVE OR gate 676, to the upper input of NOR gate 684 and to the middle input of NOR gate 688. The EXCLUSIVE OR gates 676, 678, 680 and 682 will coact with NAND gate 690, with NOR gates 684, 686 and 688, and with inverter 692 to momentarily apply a "1" to conductor 712 and to permit "0" to remain on conductor 708 and 710. The "1" on conductor 712 will be momentarily applied to input terminal five of shift register 718 and, via capacitor 694, to the lower input of NOR gate 706; and the "0's" on conductors 708 and 710 will be applied to the input terminals seven and six of that shift register and, via capacitors 698 and 696, to the upper and middle inputs of that NOR gate. That NOR gate and inverter 707 will momentarily apply a "1" to conductor 714 and thence to the parallel serial control of shift register 718, to CLOCK GENERATOR block 918, and to DATA FIELD AND VALIDATION block 940. The momentary "1" which conductor 714 applies to the parallel serial control of shift register 718 will cause that shift register to parallel shift the data at the numbered inputs of that shift register. The application of that "1" to the DATA FIELD AND VALIDATION block 940 serially shifted the data in shift register 942 one stage; and the resulting "0" at output terminal seven of that shift register will be applied to the lower input of NAND gate 964, and the resulting "0" at output terminal eight will be applied to the serial input of that shift register, to the clock input of counter 954, and to the upper input of NAND gate 944. The application of the "0" to the lower input of NAND gate 964 will not change the output of that NAND gate. The application of the "0" to the upper input of NAND gate 944 will not change the output of that NAND gate; and the application of the "0" to the clock input of the counter 954 will not change the output of that counter. The momentary "1" on conductor 714 will cause CLOCK GENERATOR block 918 to start developing a further series of clock pulses, and to respond to the second, fifth and eighth clock pulses to apply "1's" to conductor 936 and to respond to the third, sixth and ninth clock pulses to apply "1's" to conductor 938.

At the end of the second clock pulse from NOR gate 922, output terminal eight of shift register 718 will apply a "0" to conductor 730, output terminal eight of shift register 720 will apply a "0" to conductor 728, output terminal eight of shift register 722 will apply a "1" to conductor 732, and output terminal eight of shift register 724 will apply a "1" to conductor 734. As indicated by Section B of TABLE I, at the end of that second clock pulse EXCLUSIVE OR gate 738 continued to apply a "0" to conductor 744 and hence to the J input of flip-flop 978 as well as to the J inputs of flip-flop 752 and 762. EXCLUSIVE OR gate 740 applied a "1" to the J inputs of flip-flops 754 and 764, and EXCLUSIVE OR gate 742 applied a "1" to the J input of flip-flops 756 and 766. However, because flip-flops 752, 754, 756, 762, 764 and 766 still are unable to respond to signals applied to the J inputs thereof — inverters 968 and 970 having "0's" at the outputs thereof — none of those flip-flops will change the states of the outputs thereof.

At the end of the fifth clock pulse, the signals at the output terminals eight of shift registers 718, 722 and 724 will again cause EXCLUSIVE OR gate 738 to apply a "0" to the J inputs of flip-flops 978, 752 and 762 and will cause EXCLUSIVE OR gates 740 and 742 to apply a "1" and a "1" to conductors 746 and 748, respectively. Because the flip-flops 752, 754, 756, 762, 764 and 766 still have "0's" applied to the clock inputs thereof, the application of signals to the J inputs of those flip-flops will, again, not be significant.

At the end of the eighth clock pulse, output terminals eight of flip-flops 718, 720, 722 and 724 will cause EXCLUSIVE OR gate 738 to apply a "0" to the J inputs of flip-flops 978, 752 and 762 and will cause EXCLUSIVE OR gates 740 and 742 to apply a "1" and a "1" to conductors 746 and 748, respectively. Because the flip-flops 752, 754, 756, 762, 764 and 766 still have "0's" applied to the clock inputs thereof, the application of signals to the J inputs of those flip-flops will, again, not be significant.

At the end of the tenth clock pulse from NOR gate 922, flip-flop 920 will be re-set with consequent halting of the development of clock pulses at the output of that NOR gate and with consequent re-setting of counters 930 and 934. The piece of scrip 130 will continue to move inwardly of the scrip transport 30, and the rest of the lines of pattern 134 will pass beyond the air gap of the magnetic head 208; and the FREQUENCY DETECTOR 618 will respond to those lines to apply additional signals to the input of counter 620. That counter was re-set by the "1" at the output of NAND gate 634, at the end of the momentary "1" which appeared on conductor 672, and hence those signals will be counted by that counter. However, because the total number of lines in pattern 134 does not exceed twice the count to which the counter 620 has been pre-set, the counting of those signals will not change the output of DETECTION block 590.

During the movement of the pattern 134 past the air gap of the magnetic head 208, the data in the shift registers 718, 720, 722 and 724 was shifted three times. At the end of each serial shift, the EXCLUSIVE OR gates 738, 740 and 742 compared the signals at the output terminals of shift registers 720, 722 and 724 with the signal at output terminal eight of shift register 718. However, the outputs of EXCLUSIVE OR gates 740 and 742 were not significant at that time, because "0's" were maintained at the clock inputs of flip-flops 752, 754, 756 762, 764 and 766. The output of EXCLUSIVE OR gate 738 was applied to the J input of flip-flop 978 and, because that output was "0" at the end of clock pulses 3, 6 and 9, that flip-flop continued to provide "0" at the output thereof. All of this means that during the movement of the pattern 134 past the air gap of magnetic head 208, three comparisons were made of the state of the output of EXCLUSIVE OR gate 738.

As the pattern 135 engages and moves past the air gap of magnetic head 210, DETECTION block 512 will momentarily apply a "1" to conductor 588 and will permit a "0" to remain on conductor 586. The momentary "1" on conductor 588 and the "0's" on conductors 586, 670 and 672 will cause the SIGNAL DECODING block 674 to apply a momentary "1" to conductors 710 and 714 and "0's" to conductors 708 and 712. The "1" on conductor 714 will parallel-load shift register 718 to the condition shown by Section C of Table I, will serially-shift shift register 942 to develop "0's" at output terminals seven and eight thereof, and will cause CLOCK GENERATOR block 918 to again develop clock pulses, but will not change the output of NAND gate 944. The "0" at the output terminal seven of shift register 942 will not change the output of NAND gate 964.

At the end of the second clock pulse from NOR gate 922, "0's" will appear on all of conductors 744, 746 and 748, and hence "0's" will be applied to the J inputs of flip-flops 752, 754, 756, 762, 764, 766 and 978. The "0" at the J input of flip-flop 978 is significant because it shows that EXCLUSIVE OR gate 738 has a coincidence at the inputs thereof.

At the end of the fifth clock pulse a "0" will be applied to conductor 744 and "1's" will be applied to conductors 746 and 748. Because the flip-flops 752, 754, 756, 762, 764 and 766 still have "0's" applied to the clock inputs thereof, the application of signals to the J inputs of those flip-flops will, again, not be significant. However, the "0" at the J input of flip-flop 978 is significant because it shows that EXCLUSIVE OR gate 738 has a coincidence at the inputs thereof.

At the end of the eighth clock pulse "0's" will appear on all of conductors 744, 746 and 748, and hence "0's" will be applied to the J inputs of flip-flops 752, 754, 756, 762, 764, 766 and 978. The "0" at the J input of flip-flop 978 is significant because it shows that EXCLUSIVE OR gate 738 has a coincidence at the inputs thereof.

At the end of the tenth clock pulse from NOR gate 922, flip-flop 920 will be re-set with consequent halting of the development of clock pulses at the output of that NOR gate and with consequent re-setting of counters 930 and 934. The piece of scrip 130 will continue to move inwardly of the scrip transport 30, and the rest of the lines of pattern 135 will pass beyond the air gap of the magnetic head 210; and counter 582 will count those lines, but because that counter was re-set and because the total number of lines in that pattern does not exceed twice the count to which the counter 582 has been pre-set, the counting of those lines will not change the output of DETECTION block 512.

As the pattern 136 engages and moves past the air gap of magnetic head 208, DETECTION block 590 will momentarily apply a "1" to conductor 670 and will permit a "0" to remain on conductor 672. The momentary "1" on conductor 670 and the "0's" on conductors 586, 588 and 672 will cause the SIGNAL DECODING block 674 to apply a momentary "1" to conductors 708, 710 and 714 and a "0" to conductor 712. The "1" on conductor 714 will parallel-load shift register 718 to the condition shown by Section D of TABLE I, will serially-shift shift register 942 to develop a "1" at output terminal seven thereof and a "0" at output terminal eight thereof, and will cause CLOCK GENERATOR block 918 to again develop clock pulses but will not change the output of NAND gate 944. The "1" at output terminal seven of shift register 942 will not change the output of NAND gate 964.

At the end of the second clock pulse from NOR gate 922, a "0" will appear on conductor 744 and "1's" will appear on conductors 746 and 748. Because the flip-flops 752, 754, 756, 762, 764 and 766 will still have "0's" applied to the clock inputs thereof, the application of signals to the J inputs of those flip-flops will, again, not be significant. The "0" at the J input of flip-flop 978 is significant because it shows that EXCLUSIVE OR gate 738 has a coincidence at the inputs thereof.

At the end of the fifth clock pulse, a "0" will appear on conductor 744 and "1's" will appear on conductors 746 and 748. Because the flip-flops 752, 754, 756, 762, 764 and 766 will still have "0's" applied to the clock inputs thereof, the application of signals to the J inputs of those flip-flops will, again, not be significant. The "0" at the J input of flip-flop 978 is significant because it shows that EXCLUSIVE OR gate 738 has a coincidence at the inputs thereof.

At the end of the eighth clock pulse, "0's" will appear on all of conductors 744, 746 and 748, and hence "0's" will be applied to the J inputs of flip-flops 752, 754, 756, 762, 764, 766 and 978. The "0" at the J input of flip-flop 978 is significant because it shows that EXCLUSIVE OR gate 738 has a coincidence at the inputs thereof.

At the end of the tenth clock pulse from NOR gate 922, flip-flop 920 will be re-set with consequent halting of the development of clock pulses at the output of that NOR gate, and with consequent re-setting of counters 930 and 934. The piece of scrip 130 will continue to move inwardly of the scrip transport 30, and the rest of the lines of pattern 136 will pass beyond the air gap of the magnetic head 208; and counter 608 will count those lines, but because that counter was re-set and because the total number of lines in that pattern does not exceed twice the count to which the counter 608 has been pre-set, the counting of those lines will not change the output of DETECTION block 590.

The patterns 132, 134, 135 and 136 constitute data field 1 of the piece of scrip 130, and that data field will enable the scrip validator to determine whether that piece of scrip is an authentic piece of scrip which should be validated. As each of those patterns moved past the air gap of the appropriate magnetic head, the SIGNAL DECODING block 674 developed signals on conductors 708, 710 and 712 and applied those signals to the COMPARISON REGISTER block 716 and also applied a signal, via conductor 714, to that COMPARISON REGISTER block and also to CLOCK GENERATOR block 918 and DATA FIELD AND VALIDATION block 940. The shift registers in the COMPARISON REGISTER block 716 applied signals to the EXCLUSIVE OR gates in the PATTERN REGISTER DECODING block 736 which caused those EXCLUSIVE OR gates to apply signals, via conductors 744, 746 and 748, to the DATA FIELD 2 FLIP-FLOP block 750 and to the DATA FIELD 3 FLIP-FLOP block 760 and, via conductor 744, to the DATA FIELD AND VALIDATION block 940. The flip-flops in the DATA FIELD 2 FLIP-FLOP block 750 and the flip-flops in the DATA FIELD 3 FLIP-FLOP block 760 were unable to respond to any of the signals on conductors 744, 746, and 748 because the inverters 968 and 970 in the DATA FIELD AND VALIDATION block 940 continuously applied "0's" to the clock inputs of those flip-flops. Consequently, the EXCLUSIVE OR gate 738 applied a "0" to the J input of flip-flop 978 in the DATA FIELD AND VALIDATION block 940.

Immediately prior to the time the pattern 132 engaged the air gap of the magnetic head 210, the states of the fifth, sixth and seventh stages of shift register 720 were, respectively, "0", "0" and "1"; and those states correspond to the "0", "0" and "1" which were applied to conductors 712, 710 and 708 as pattern 132 was sensed by magnetic head 210. The clock pulses which were developed as a result of the sensing of that pattern caused the data in shift register 720 to be shifted three times; and hence, immediately prior to the sensing of pattern 134 by the air gap of magnetic head 208, and states of the fifth, sixth and seventh stages of shift register 720 were "1", "0" and "0". The states of those stages matched the signals which conductors 712, 710 and 708 applied, respectively, to the fifth, sixth and seventh inputs of shift register 718 as pattern 134 was sensed by magnetic head 208. Consequently, the EXCLUSIVE OR gate 738 again applied a "0" to the J input of flip-flop 978 in the DATA FIELD AND VALIDATION block 940.

Because of the shifting of the data in the shift register 720, which occurred as a result of the sensing of pattern 134, the states of the fifth, sixth and seventh stages of that shift register were, immediately prior to the sensing of pattern 135 by magnetic head 210 "0", "1" and "0". Consequently, the states of those stages exactly matched the signals which conductors 712, 710 and 708 applied to the fifth, sixth and seventh inputs of shift register 718 as pattern 135 was sensed by magnetic head 210. This means that the EXCLUSIVE OR gate 738 again applied a "0" to the J input of flip-flop 978.

The shifting of the data in shift register 720, which occurred as the result of the sensing of pattern 135, caused the states of the fifth, sixth and seventh stages of shift register 720 to be "0", "1" and "1" immediately prior to the sensing of pattern 136. As a result, the states of those stages will exactly match the signals which conductors 712, 710 and 708 applied to the fifth, sixth and seventh inputs of shift register 718 as magnetic head 208 sensed pattern 136. Consequently, for the fourth time, the EXCLUSIVE OR gate 738 will apply a "0" to the J input of flip-flop 978. All of this means that as a result of the sensing of the patterns 132, 134, 135 and 136, the flip-flop 978 will continue to apply a "0" to the lower input of NOR gate 980. The continued application of that "0" is conclusive evidence that the spacing of the lines in the pattern 132 matched the frequency of the digital filter in the FREQUENCY DETECTOR block 526, that the spacing of the lines in the pattern 134 matched the frequency of the digital filter in the FREQUENCY DETECTOR 618, that the spacing of the lines in the pattern 135 matched the frequency of the digital filter in the FREQUENCY DETECTOR block 527, that the spacing of the lines in the pattern 136 matched the frequency of the digital filter in the FREQUENCY DETECTOR block 606, and that the speed of the belts 198 and 199 remained constant during the times when the patterns 132, 134, 135 and 136 were sensed. Further, the continued application of a "0" to the J input of flip-flop 978 is conclusive evidence that the comparison made during the sensing of pattern 132 immediately preceded the comparisons made during the sensing of pattern 134, that the comparisons made during the sensing of pattern 134 immediately succeeded the comparisons made during the sensing of pattern 132 and immediately preceded the comparisons made during the sensing of pattern 135, that the comparisons made during the sensing of pattern 135 immediately succeeded the comparisons made during the sensing of pattern 134 and immediately preceded the comparisons made during the sensing of pattern 136, and that the comparisons made during the sensing of pattern 136 immediately succeeded the comparisons made during the sensing of pattern 135. Moreover, the continued application of a "0" to the J input of flip-flop 978 is conclusive evidence that the total number of properly-spaced lines in each of the patterns 132, 134, 135 and 136 is greater than two but does not exceed twice the count to which the counter, which is connected to the FREQUENCY DETECTOR corresponding to that pattern has been pre-set.

The belts 198 and 199 will continue to move the piece of scrip 130 inwardly of the scrip transport 30; and, very promptly, the pattern 137 will move into engagement with the air gap of the magnetic head 210. As the pattern 137 engages and moves past the air gap of magnetic head 210, DETECTION block 512 will momentarily apply a "1" to conductor 586 and will permit a "0" to remain on conductor 588. The momentary "1" on conductor 586 and the "0's" on conductors 588, 670 and 672 will cause the SIGNAL DECODING block 674 to apply a momentary "1" to conductor 708 and 714 and "0's" to conductors 710 and 712. The "1" on conductor 714 will parallel-load shift register 718 to the condition shown by Section E of TABLE I, will serially-shift shift register 942 to develop a "0" at output terminal seven and a "1" at output terminal eight thereof, and will cause CLOCK GENERATOR block 918 to again develop clock pulses. The "1" at output terminal eight of shift register 942 will coact with the momentary "1" on conductor 714 to cause NAND gate 944 and inverter 950 to parallel-load shift registers 720, 722 and 724. At this time the various stages of shift registers 718, 720, 722 and 724 will have the states shown by section E of TABLE I. The "1" at output terminal eight of shift register 942 also will clock counter 954, and thereby cause a "1" to appear at output terminal two and hence at the lower input of NOR gate 956 and at the lower input of NAND gate 960. Also, it will cause a "0" to appear at output terminal one of that counter and hence at the lower input of NAND gate 958. Thereupon, NAND gate 958 will coact with inverter 966 to provide a "0" at the clock input of flip-flop 978, and thereby make that flip-flop un-responsive to any signals that will be applied to conductor 744 during the sensing of this pattern and all of the remaining patterns on the piece of scrip 130. Consequently, no mention will be made of the signals which are applied to the J input of flip-flop 978 throughout the processing of the signals obtained as a result of the sensing of patterns 137, 138, 139 and 141. The "0" at output terminal three of counter 954 will continue to appear at the lower input of NAND gate 962 and at the upper input of NAND gate 964; and hence the outputs of those NAND gates will remain unchanged.

At the end of the second clock pulse from NOR gate 922, "0's" will appear on conductors 744 and 746 and a "1" will appear on conductor 748; and the "0" on conductor 744 will be applied to the J inputs of flip-flop 752 and 762, the "0" on conductor 746 will be applied to the J inputs of flip-flops 754 and 764, and the "1" on conductor 748 will be applied to the J inputs of flip-flops 756 and 766. At the end of the third clock pulse from NOR gate 922, counter 930 will apply a "1" to the upper input of NAND gate 960 and that NAND gate will cause inverter 968 to apply a "1" to conductor 971, and thus to the clock inputs of flip-flops 752, 754 and 756; but NAND gate 962 and inverter 970 will not be able to apply a "1" to the clock inputs of flip-flops 762, 764 and 766; and hence those flip-flops will not respond to any signals applied to the J inputs thereof. "0's" will continue to appear at the clock inputs of flip-flops 762, 764 and 766 throughout the rest of the sensing of pattern 137 and throughout the entire sensing of pattern 138; and hence no mention will be made of the signals which are applied to the J inputs of flip-flops 762, 764 and 766 throughout those sensings. Flip-flop 756 will respond to the "1" at the J input thereof to change the state of its output; but the resulting application of a "1" to conductor 778 and of a "0" to conductor 772 cannot be significant at this time because NOR gate 810 is applying a continuous "1" to the middle input of NOR gate 980 and transistor 876 is back biasing the diodes 874 in the PRICE LINE ENABLE block 850.

At the end of the fifth clock pulse from NOR gate 922, a "1" will appear on conductor 748 and "0's" will appear on conductors 744 and 746. Those signals will be applied to the DATA FIELD 2 FLIP-FLOP block 750; but the "1" which will be applied to the flip-flops of that block at the end of the sixth clock pulse from NOR gate 922 will leave flip-flops 752 and 754 upset. Flip-flop 756 will, of course, remain set.

At the end of the eighth clock pulse from NOR gate 922, "0's" will appear on conductors 744, 746 and 748; and those "0's" will be applied to the J inputs of flip-flops 752, 754 and 756. At the end of the ninth clock pulse, a "1" will again be applied to the clock inputs of those flip-flops; but flip-flops 752 and 754 will remain unset. Flip-flop 756 will, of course, remain set.

At the end of the tenth clock pulse from NOR gate 922, flip-flop 920 will be reset with consequent halting of the development of clock pulses at the output of that NOR gate and with consequent re-setting of counters 930 and 934. The piece of scrip 130 will continue to move inwardly of the scrip transport 30, and the rest of the lines of pattern 137 will pass beyond the air gap of the magnetic head 210; and counter 540 will count those lines, but because that counter was re-set and because the total number of lines in that pattern does not exceed twice the count to which the counter 540 has been pre-set, the counting of those lines will not change the output of DETECTION block 512. The movement of the pattern 137 past the air gap of magnetic head 210 caused the shift registers 718, 720, 722 and 724 to shift the data therein three times; and hence provided three comparisons of the signals at the inputs of each of the EXCLUSIVE OR gates 738, 740 and 742. The first comparison caused flip-flop 756 to be set, the second comparison applied a further setting pulse to flip-flop 756, and the third comparison applied "0's" to all three of the flip-flops 752, 754 and 756. Consequently, as the pattern 137 moved beyond the air gap of the magnetic head 210, flip-flops 752 and 754 remained unset but flip-flop 756 remained set.

All of this means that at the end of the sensing of pattern 137, the upper output of flip-flop 756 will be applying a "1" to the lower input of NOR gate 798, to the upper input of NOR gate 826, to the upper input of NOR gate 828, and to the upper input of NOR gate 830, thereby causing "0's" to appear at the outputs of those NOR gates. Also, the lower output of flip-flop 756 will permit "0's" to appear at the lower input of NOR gate 794 and at the upper input of NOR gate 796. The output states of those various NOR gates are not significant at this time because NOR gate 810 continues to apply a "1" to the middle input of NOR gate 980, and because transistor 876 continues to back bias the diodes 874 in the PRICE LINE ENABLE block 850.

As the pattern 138 moves into engagement with the air gap of magnetic head 208, the FREQUENCY DETECTOR 618 and counter 620 of the DETECTION block 590 will cause SIGNAL DECODING block 674 to apply a "1" to conductor 712 and "0's" to conductors 710 and 708 and also will cause a "1" to appear on conductor 714. That "1" will re-set shift register 718, will clock shift register 942, and will cause the CLOCK GENERATOR 918 to start developing further clock pulses. The "1" at output terminal seven of shift register 942 can not at this time change the state of NAND gate 964; and the "0" at the output terminal eight can not change the state of counter 954 and of NAND gate 944.

At the end of the second clock pulse from NOR gate 922, a "0" will appear on conductor 744 and "1's" will appear on conductors 746 and 748. The "1" on conductor 746 will be applied to the J input of flip-flop 754, and the "1" on conductor 748 will be applied to the J input of flip-flop 756. The "1" at the J input of the latter flip-flop will not be significant at this time because that flip-flop is in its set state, but the "1" at the J input of flip-flop 754 will set that flip-flop.

At the end of the fifth pulse from NOR gate 922, a "0" will appear on conductor 744 and "1's" will appear on conductors 746 and 748; and, similarly, at the end of the eighth clock pulse from that NOR gate, a "0" will appear on conductor 744 and "1's" will appear on conductors 746 and 748. This means that the same signals will be applied to the DATA FIELD 2 FLIP-FLOP block 750 at the ends of the second, fifth and eighth clock pulses; and hence it also means that no changes will occur in that block at the ends of the sixth and ninth clock pulses.

At the end of the tenth clock pulse from NOR gate 922, flip-flop 920 will be reset with consequent halting of the development of clock pulses at the output of that NOR gate and with consequent re-setting of counters 930 and 934. The piece of scrip 130 will continue to move inwardly of the scrip transport 30, and the rest of the lines of pattern 138 will pass beyond the air gap of the magnetic head 208; and counter 620 will count those lines, but because that counter was re-set and because the total number of lines in that pattern does not exceed twice the count to which the counter 620 has been pre-set, the counting of those lines will not change the output of DETECTION block 590.

As the flip-flop 754 became set, the upper output thereof applied a "1" via conductor 774 to the middle input of NOR gate 796, to the upper input of NOR gate 820, to the upper input of NOR gate 822, and to the upper input of NOR gate 824. Also, the lower output of that flip-flop permiited a "0" to appear at the middle inputs of NOR gates 794 and 798. At this time, NOR gates 820, 822, 824, 826, 828 and 830 will be developing "0's" at the outputs thereof and hence at the bases of the transistor 870 in the sub-blocks 858, 860, 862, 864, 866 and 868 of the PRICE LINE ENABLE block 850. However, all of those transistors will continue to be held non-conductive, because transistor 876 will continue to back bias the diodes 874 in those sub-blocks. Also at this time, NOR gate 794 will have "0's" at all of the inputs thereof, and thus will be applying a "1" to the upper input of NOR gate 800. Although the latter NOR gate will apply a "0" to the upper input of NOR gate 980 via conductor 801, that "0" will not be significant at this time because NOR gate 810 continues to apply a "1" to the middle input of NOR gate 980.

The overall result of the engagement of pattern 138 with the air gap of magnetic head 208 was to make three comparisons between the data in shift register 718 and the data in shift registers 720, 722 and 724. At the end of the first comparison, EXCLUSIVE OR gates 740 and 742 failed to have coincidences at the inputs thereof, and hence applied "1's" to the inputs of flip-flops 754 and 756 — thereby "setting" flip-flop 754. Flip-flop 756 which was set during the sensing of pattern 137, of course, remained set. During the second and third comparisons, EXCLUSIVE OR gates 740 and 742 again failed to find coincidences at theinputs thereof, and again applied "1's" to the J inputs of flip-flops 754 and 756. However, at those times, those flip-flops were in their "set" states and continued to remain in those states. The setting of flip-flops 754 and 756 caused NOR gates 796 and 798 to apply "0's" to the middle and lower inputs of NOR gate 800; and the setting of those flip-flops and the continued unset state of flip-flop 752 caused NOR gate 794 to apply "1" to the upper input of NOR gate 800. That NOR gate thereupon changed the "1" at the upper input of NOR gate 980 to a "0". That "0" is conclusive evidence that, during the sensing of data field 2, the comparisons made during the sensing of pattern 137 immediately preceded the comparisons made during the sensing of pattern 138, that the comparisons made during the sensing of the pattern 138 immediately succeeded the comparisons made during the sensing of pattern 137, and that the sensing of pattern 137 immediately succeeded the sensing of a data field which had four patterns that provided the proper numbers of countable lines at the proper frequencies, and did so in the proper sequence.

The patterns 137 and 138, which constitute data field 2 of the piece of scrip 130, are relied upon to cause the NOR gates 820, 822, 824, 826, 828 and 830 in the SELECTION DECODER block 812 to hold non-conductive the transistors 870, in the sub-blocks of the PRICE LINE ENABLE block 850, to which they are connected — thereby preventing the energization of the corresponding relay coils 914 in the appropriate sub-blocks of the PRICE LINE relay block 894. Also, the data field is relied upon to change the "1" at the upper input of NOR gate 980 to a "0". At this time, however, transistor 876 is continuing to hold all of the transistors 870 in the PRICE LINE ENABLE block 850 non-conductive, and NOR gate 810 is continuing to apply a "1" to the middle input of NOR gate 980. As a result, even though the "0" which flip-flop 978 is applying to the lower input of NOR gate 980 and the "0" which NOR gate 800 is applying to the upper input of the former NOR gate are conclusive evidence that data field 1 and data field 2 are acceptable, no relay coil in the PRICE LINE RELAY block 894 can be energized until the data field 3 has been sensed.

The belts 198 and 199 will continue to move the piece of scrip 130 inwardly of the scrip transport 30; and, very promptly, the pattern 139 will move into engagement with the air gap of the magnetic head 210. As the pattern 139 engages and moves past the air gap of magnetic head 210, DETECTION block 512 will momentarily apply a "1" to conductor 586 and will permit a "0" to remain on conductor 588. The momentary "1" on conductor 586 and the "0's" on conductors 588, 670 and 672 will cause the SIGNAL DECODING block 674 to apply a momentary "1" to conductors 708 and 714 and "0's" to conductors 710 and 712. The "1" on conductor 714 will parallel-load shift register 718 to the condition shown by Section G of TABLE I, will serially-shift shift register 942 to develop a "0" at output terminal seven and a "1" on output terminal eight thereof, will cause CLOCK GENERATOR block 918 to again develop clock pulses, and will appear at the lower input of NAND gate 944. The "0" at output terminal seven will appear at the lower input of NAND gate 964; and the "1" at output terminal eight of shift register 942 will appear at the serial input of that shift register, at the upper input of NAND gate 944, and at the clock input of counter 954. Thereupon, counter 954 will continue to apply a "0" to the lower input of NAND gate 958, will change the "1" at the lower input of NAND gate 960 to a "0", and will change the "0's" at the lower input of NAND gate 962 and at the upper input of NAND gate 964 to "1's". NAND gate 960 and inverter 968 will, at this time, apply continuous "0's" to the clock inputs of flip-flops 752, 754 and 756; and hence those flip-flops will be kept from responding to any signals which will be developed on conductors 744, 746 and 748 during the sensing of patterns 139 and 141. NAND gate 944 will respond to the "1" at the upper input thereof and to the momentary "1" on conductor 714 to cause NAND gate 944 and inverter 950 to parallel load shift registers 720, 722 and 724. At this time, the various stages of shift registers 718, 720, 722 and 724 will have the states shown by section G of TABLE I.

At the end of he second clock pulse from the NOR gate 922, "0's" will appear on conductors 744 and 746 and a "1" will appear on conductor 748. Those signals will be applied to the DATA FIELD 2 FLIP-FLOP block 750 and to the DATA FIELD 3 FLIP-FLOP block 760. At the end of clock pulse three from NOR gate 922, NAND gate 962 and inverter 970 will apply "1's to flip-flops 762, 764 and 766; and the flip-flops 762 and 764 will remain unset but flip-flop 766 will be set. The resulting "1" on conductor 788 will be applied to the lower input of NOR gate 808, to the lower input of NOR gate 818, to the lower input of NOR gate 824, and to the lower input of NOR gate 830; and the resulting "0" on conductor 790 will appear at the lower input of NOR gate 804 and at the upper input of NOR gate 806. The application of "1's" to the lower inputs of NOR gates 824 and 830 will not change the outputs of those NOR gates because DATA FIELD 2 FLIP-FLOP block 750 is applying "1's" to the upper inputs of those NOR gates. However, the application of "1's" to the lower inputs of NOR gates 808 and 818 will permit the former NOR gate to continue to develop a "0" at the output thereof and will cause the latter NOR gate to develop a "0" at the outputs thereof; and hence, those NOR gates will apply "0's" respectively to the lower input of NOR gate 810 and to the base of transistor 870 in the sub-block 856 of the PRICE LINE ENABLE block 850. However, NOR gate 810 will not change the output thereof, and transistor 876 will continue to hold all of the transistors 870 in the PRICE LINE ENABLE block 850 non-conductive.

At the end of the fifth clock pulse from NOR gate 922, "0's" will again appear on conductors 744 and 746 and a "1" will again appear on conductor 748; and those signals will be applied to the DATA FIELD 3 FLIP-FLOP block 760. At the end of the sixth clock pulse from NOR gate 922, a "1" will be applied to the clock inputs of flip-flops 762, 764 and 766; but flip-flops 762 and 764 will remain unset, and, of course, flip-flop 766 will remain set.

At the end of the eighth clock pulse from NOR gate 922, "0's" will appear on all of conductors 744, 746 and 748; and those signals will be applied to the DATA FIELD 3 FLIP FLOP block 760. At the end of the ninth clock pulse from NOR gate 922, a "1" will be applied to the clock inputs of flip-flops 762, 764 and 766; but the "0's" at the J inputs of all of those flip-flops will leave flip-flops 762 and 764 unset and, of course, flip-flop 766 will remain set.

At the end of the tenth clock pulse from NOR gate 922, flip-flop 920 will be reset with consequent halting of the development of clock pulses at the output of that NOR gate and with consequent re-setting of counters 930 and 934. The piece of scrip 130 will continue to move inwardly of the scrip transport 30, and the rest of the lines of pattern 139 will pass beyond the air gap of the magnetic head 210; and counter 540 will count those lines, but because that counter was re-set and because the total number of lines in that pattern does not exceed twice the count to which the counter 540 has been pre-set, the counting of those lines will not change the output of DETECTION block 512.

The movement of the pattern 139 past the air gap of magnetic head 210 caused the shift registers 718, 720, 722 and 724 to shift the data therein three times; and hence provided three comparisons of the signals at the inputs of each of the EXCLUSIVE OR gates 738, 740 and 742. The first comparison caused flip-flop 766 to be set, the second comparison applied a further setting pulse to flip-flop 766, and the third comparison applied "0's" to all three of the flip-flops 762, 764 and 766. Consequently, as the pattern 139 moved beyond the air gap of the magnetic head 210, flip-flops 762 and 764 remained unset but flip-flop 766 remained set.

All of this means that at the end of the sensing of pattern 139, the upper output of flip-flop 766 will be applying a "1" to the lower inputs of NOR gates 808, 818, 824 and 830; and the lower input of that flip-flop will permit "0's" to appear at the lower input of NOR gate 804 and at the upper input of NOR gate 806. The resulting "1's" at the lower inputs of NOR gates 824 and 830 did not change the outputs of those NOR gates, because DATA FIELD 2 FLIP-FLOP block 750 was applying "1's" to the upper inputs of those flip-flops; but the resulting "1's" at the lower inputs of NOR gates 808 and 818 will permit the output of the former NOR gate to continue to be a "0" and will change the output of the latter NOR gate to be a "0". The output states of those various NOR gates are not significant at this time because NOR gate 810 continues to apply a "1" to the middle input of NOR gate 980, and because transistor 876 continues to back bias the diodes 874 in the PRICE LINE ENABLE block 850.

As the pattern 141 moves into engagement with the air gap of magnetic head 208, DETECTION BLOCK 590 will momentarily apply a "1" to conductor 670 and will permit a "0" to remain on conductor 672. The momentary "1" on conductor 670 and the "0's" on conductors 586, 588 and 672 will cause the SIGNAL DECODING block 674 to apply a momentary "1" to conductor 708, 710 and 714 and a "0" to conductor 712. The "1" on conductor 714 will parallel-load shift register 718 to the condition shown by Section H of TABLE I, will serially-shift shift register 942 to develop a "1" at output terminal seven and a "0" at output terminal eight thereof, and will cause CLOCK GENERATOR block 918 to again develop clock pulses, but will not change the output of NAND gate 944.

The "1" at the lower input of NAND gate 964 will coact with the "1" at the upper input of the NAND gate to cause that NAND gate to develop a "0" at the output thereof. Thereupon, capacitor 977 will start to discharge through resistor 975, but that capacitor and that resistor constitute an RC network which will maintain a "1" at the input of inverter 972 for a time interval at least as great as the time required for the CLOCK GENERATOR 918 to develop nine clock pulses at the output of NOR gate 922, inverter 972 will continue to apply a "0" to the clock input of counter 982.

At the end of the second clock pulse from NOR gate 922, a "1" will appear on conductor 744 and "0's" will appear on conductors 746 and 748; and those signals will be applied to the DATA FIELD 2 FLIP-FLOP block 752 and to the DATA FIELD 3 FLIP-FLOP block 760. At the end of the third clock pulse from NOR gate 922, a "1" will be applied to the clock input of flip-flops 762, 764 and 766; and, thereupon, flip-flop 762 will respond to the "1" at the J input thereof to become set. The resulting "1" at the upper output of that flip-flop will be applied to the upper input of NOR gate 804, to the lower input of NOR gate 814, to the lower input of NOR gate 820, and to the lower input of NOR gate 826; the resulting "0" at the lower output of that flip-flop will permit "0's" to appear at the lower input of NOR gate 806 and at the upper input of NOR gate 808. The application of the "1's" to the lower inputs of NOR gates 820 and 826 will not be significant at this time because DATA FIELD 2 FLIP FLOP block 750 will be applying "1's" to the upper inputs of those NOR gates; but the application of "1's" to the upper input of NOR gate 804 and to the lower input of NOR gate 814 will, respectively, cause those NOR gates to apply "0's" to the upper input of NOR gate 810 and to the transistor 870 in the sub-block 852 of PRICE LINE ENABLE block 850.

At this time, NOR gate 806 will respond to the "0" from the lower output of flip-flop 766, from the upper output of flip-flop 764, and from the lower output of flip-flop 762 to develop a "1" at the output thereof and to apply that "1" to the middle input of NOR gate 810. The latter NOR gate will change the "1" at the output thereof to a "0"; and hence the NOR gate 980 will have "0's" at all of the inputs therof and will develop a "1" at the output thereof. That "1" will be applied to the data input of counter 982; but, because resistor 975 and capacitor 977, are still keeping a "0" at the clock input of the counter, the output of that counter at this moment will continue to be a "0". Also at this moment, transistor 876 will continue to hold all of the transistors 870 in the PRICE LINE ENABLE block 850 non-conductive.

At the end of the fifth and eighth clock pulses from NOR gate 922, "1's" will appear on conductor 744 and "0's" will appear on conductors 746 and 748. Because those same signals were applied to those conductors at the end of the second clock pulse, the "1's" which appear at the clock inputs of flip-flops 762, 764 and 766 at the end of the ninth clock pulse will not change the states of those flip-flops.

At this time, each of the NOR gates 814, 818, 820, 822, 824, 826, 828 and 830 in the SELECTION DECODER block 812 will have a "1" applied to at least one of the inputs thereof; and hence all of the NOR gates will be developing "0's" at the outputs thereof. However, NOR gate 816 in that block will have "0's" at both inputs thereof and hence will apply a "1" to the base of transistor 870 in sub-block 854 of the PRICE LINE ENABLE block 850. However, because transistor 876 is applying a "1" to the cathode of the diode 874 in that sub-block, that sub-block will not energize the relay coil 914 in the sub-block 898 in the PRICE LINE RELAY block 894.

At the end of the tenth clock pulse from NOR gate 922, flip-flop 920 will be reset with consequent halting of the development of clock pulses at the output of that NOR gate and with consequent re-setting of counters 930 and 934. The "0" which is applied to the middle input of NOR gate 980 is conclusive evidence that during the sensing of data field 3, the comparisons made during the sensing of pattern 139 immediately preceded the comparisons made during the sensing of pattern 141, that the comparisons made during the sensing of the pattern 141, immediately succeeded the comparisons made during the sensing of pattern 139, and that the sensing of pattern 139 immediately succeeded the sensing of a data field which had two patterns that provided the proper numbers of countable lines at the proper frequencies, and did so in the proper sequence.

Either shortly before or shortly after the tenth clock pulse from NOR gate 922, the charge on capacitor 977 will dissipate to the point where a "0" will appear at the input of inverter 972, and hence that inverter will apply a "1" to the clock input of counter 982. At this time, NOR gate 800 will be applying a "0" to the upper input of NOR gate 980, NOR gate 810 will be applying a "0" to the middle input of NOR gate 980, and flip-flop 978 will be applying a "0" to the lower input of NOR gate 980; and hence the latter NOR gate will be applying a "1" to the data input of counter 982. This means that as the inverter 972 applies a "1" to the clock input of that counter, a "1" will appear at the output terminal one of that counter, and hence on conductor 276 and at the input of inverter 988. The "1" on conductor 276 and the "0" which inverter 988 will apply to conductor 260, are considered to be validation signals; and the development of those validation signals is conclusive evidence that the piece of scrip 130 had a data field 1 thereon which exactly matched the data field 1 memory which is stored within the COMPARISON REGISTER block 716, had a data field 2 thereon which exactly matched the data field 2 memory which is stored within that block, and had a data field 3 thereon which exactly matched the data field 3 memory which is stored within that block.

The "0" validation signal on conductor 260 will be applied to the upper input of NAND gate 240 in the TIMING block 230; and that "0" will cause that NAND gate to develop a "1" at the output thereof. The "0" on conductor 260 also will be applied to the upper input of NAND gate 360; and the resulting "1" at the output of that NAND gate will cause inverter 362 to apply a "0" to the lower input of NOR gate 353. At this time, conductor 330 will be applying a "0" to the upper input of that NOR gate, and inverter 352 will be applying a "0" to the middle input of that NOR gate; and hence that NOR gate will apply a "1" to the anode of diode 355. The resulting forward biasing of that diode will apply a "1" to the input of inverter 356; and that inverter will apply a "0" to the MOTOR CONTROLLING sub-block 354 and thereby will de-energize the motor 562. Very promptly, the belts 198 and 199 will come to rest and will permit the piece of scrip 130 to come to rest within the scrip transport 30. At this time, that piece of scrip will be in position beneath actuator 164 and will cause the actuator to hold switch 162 closed; and the trailing edge of that piece of scrip will be disposed inwardly of the slots 166 and 171 and inwardly of the slots 168 and 172.

The "0" on conductor 260 also is applied to the upper input of NOR gate 392 in the BLOCKING FINGER CONTROL block 370. At this time, conductor 262 is permitting a "0" to appear at the lower input of that NOR gate; and hence that NOR gate applies a "1" to conductor 410, and hence to the input of inverter 394 and to the upper inputs of NOR gates 460 and 468. The resulting "0's" at the outputs of NOR gates 460 and 468 will effectively keep any further actuation of either of the switches 146 and 156 from applying a "1" to either of conductors 274 and 262. Inverter 394 will develop a "0" at the output thereof; and that "0" will cause NAND gate 396 to apply a "1" to the input of inverter 398 — with consequent application of a "0" to the lower input of NAND gate 376 to the left-hand terminal of capacitor 400, and to the base of transistor 406. Transistor 406 will respond to that "0" to become de-energized; and NAND gate 376 will respond to the "0" at the lower input thereof to apply a "1" to the lower input of NOR gate 364 and also to the input of inverter 378. The application of the "1" to the lower input of NOR gate 364 will not be effective at this time because a "1" has been maintained at the upper input of that NOR gate by conductor 436. The application of the "1" to inverter 378 will cause that inverter to apply a "0" to the upper input of NOR gate 380, and resistor 402 will be applying a "0" to the lower input of that NOR gate; and hence that NOR gate will apply a "1" to the input of inverter 382. The resulting "0" at the base of transistor 386 will hold that transistor de-energized. This means that the "0" was applied to conductor 260, the transistor 406 in the BLOCKING FINGER CONTROL block 370 became non-conductive and the transistor 386 in that block remained non-conductive. Consequently, solenoid 388 became de-energized and the spring 393 moved the fingers 180 and 181 downwardly through the slots 168 and 166 in the upper platen 118, through the passageway defined by that platen and platen 40, and into the slots 172 and 171 in the platen 40. At this time, those fingers will positively prevent the withdrawal of the piece of scrip 130 from the scrip transport 30 in intact form.

The "1" validation signal on conductor 276 is applied to the upper input of NAND gate 892 in FIG. 19; but that NAND gate will continue to provide a "1" at the output thereof because conductor 266 is applying a "0" to the lower input of that NAND gate. The "1" on conductor 276 also is applied to the lower input of NOR gate 292; and the resulting "0" will be applied to input terminal one, and hence to input terminals three and seven, of the multiplexer 296 in the MULTIPLEXER block 288. The application of that "0" will not be significant at this time, because conductor 268 is applying a "1" to the C input of that multiplexer; and hence that multiplexer is connecting input terminal four, and hence input terminal six, to the output terminal, thereby causing that output terminal to maintain a "1" on conductor 302.

As the blocking member 178 moved downwardly and disposed the fingers 180 and 181 thereof in blocking position, the ear 184 on that block member permitted the switch 494 in the switch block 452 of FIG. 23, to close and thereby apply a "0" to the input of inverter 508. The resulting "1" on conductor 266 will appear at the upper input of NAND gate 376 in the BLOCKING FINGER CONTROL block 370, but that "1" will not be effective at this time because a "0" is being applied to the lower input of that NAND gate. The conductor 266 also will apply a "1" to the Inhibit input of multiplexer 296, and that multiplexer will thereupon isolate the numbered inputs thereof from the output; at such time, resistor 298 will continue the "1" which has been applied to conductor 302. Further, the "1" on conductor 266 will be applied to the lower input of NOR gate 235 in the TIMING block; and the resulting "0" at the output of that NOR gate will be applied to the middle input of NOR gate 232. At this time, conductor 262 will be applying a "0" to the upper input of NOR gate 232 and NOR gate 236 will be applying a "0" to the lower input of that NOR gate; and hence NOR gate 232 will apply a "1" to the reset input of the BINARY COUNTER 238 — with consequent re-setting of the counter. That BINARY COUNTER will remain reset as long as the NOR gate 232 applies "1" to the re-set terminal thereof; and, as long as that BINARY COUNTER is reset, the outputs thereof will be "0". The re-setting of the BINARY COUNTER 238 will not, at this time, change the states of any of the components connected to the outputs thereof.

The "1" on conductor 266 also will be applied to the lower input of NAND gate 892 in FIG. 19, and it will coact with the "1" which conductor 276 is applying to the upper input of that NAND gate to cause the NAND gate to apply "0" to the input of inverter 890. The resulting "1" at the output of that inverter will forward bias transistor 876 and render it conductive. Thereupon, current will flow from NOR gate 816 via conductor 834, resistor 872 in sub-block 854, the base-emitter circuit of transistor 870 in that sub-block, diode 874 in that sub-block, conductor 871, the collector-emitter circuit of transistor 876 and resistor 880 to ground. The resulting rendering conductive of transistor 870 in sub-block 854 will permit current to flow from the source of 24 volts via conductor 873, relay coil 914 in sub-block 898 of the PRICE LINE RELAY block 894, the collector-emitter circuit of the transistor 870 in sub-block 854, the diode 874 in that sub-block, conductor 871, the collector-emitter circuit of transistor 876, and resistor 880 to ground. At this time, a patron of the vending machine can press any of the selection buttons associated with the sub-block 898; and that vending machine will respond to the pressing of that selection button to initiate the dispensing of the desired product or service.

As that product or service is being dispensed, switch 336 in COLLECT block 334 of FIG. 22 will close momentarily. Thereupon, current will flow through the light-emitting diode of the opto-coupler 342; and the light-sensitive element of that opto-coupler will become conductive and permit a "0" to appear on conductor 312. The application of that "0" to the upper input of NAND gate 306 in the ACCEPT LATCH block 304 will cause NAND gate 306 to develop a "1" at the output thereof, and thus at the upper input of NAND gate 308 and on conductor 330. The electronic "latch" 307 constituted by NAND gates 306 and 308 will develop a continuous "1" on conductor 330 and a continuous "0" on conductor 284. The "0" on conductor 284 will be applied to the lower input of NOR gate 284 in the TIMING block 230; but that "0" will not change the output of that NOR gate. The "0" on conductor 284 also will be applied to the upper input of NAND gate 396 in the BLOCKING FINGER CONTROL block 370; but that "0" will not change the output of that NAND gate because inverter 394 is applying a "0" to the lower input of that NAND gate. Further, the "0" on conductor 284 will be applied to the middle input of NAND gate 434 in the REVERSE LATCH block 426 to make certain that the output of that NAND gate remains a "1". In this way, the scrip validator prevents reversal of the motor 562.

The "1" on conductor 330 will be applied to the upper input of the NOR gate 416 in the VALIDATE ENABLE block 412 of FIG. 23. The resulting "0" at the output of that NOR gate will cause inverter 422 to apply a "1" to conductor 424, and that "1" will be applied to the reset inputs of flip-flop 978 and of counters 954 and 982 in the DATA FIELD AND VALIDATION block 940 of FIG. 20, will parallel load shift register 942 in that block, will reset all of the flip-flops in the DATA FIELD 2 FLIP-FLOP block 750 and in the DATA FIELD 3 FLIP FLOP block 760, and to the lower inputs of NOR gates 584 and 632 in FIGS. 16 and 17, respectively. The resulting "0's" at the outputs of those NOR gates will be applied to the lower inputs of NAND gates 552 and 634, and thereby will cause those NAND gates to maintain resetting "1's" to the reset inputs of counters 540, 582, 608 and 620. The re-setting of counter 982 in FIG. 20 will cuase a "0" to again appear at output terminal one of that counter, and hence on conductor 276 and at the input of inverter 988 — with consequent application of a "1" to conductor 260. The "0" on conductor 276 will appear at the upper input of NAND gate 892 in FIG. 19; and, thereupon, that NAND gate and inverter 890 will render transistor non-conductive by applying a "0" to the base thereof. At this time, all of the diodes 874 in the PRICE LINE ENABLE block 850 will be back biased and will thereby keep all of the relay coils 914 in the PRICE LINE RELAY block 894 deenergized. The "1" on conductor 260 will cause NOR gate 392 in the BLOCKING FINGER CONTROL block 370 to apply "0's" to the upper inputs of NOR gates 460 and 468 via conductor 410; and those "0's" will again make those NOR gates subject to the control of switches 146 and 156. The various flip-flops and counters will be held in their reset states, as long as the conductor 424 has a "1" thereon.

The "1" on conductor 330 will be applied to the upper input of NOR gate 353 in the MOTOR START AND RUN block 348. The resulting "0" at the output of that NOR gate will back bias the diode 355, and hence will permit a "0" to appear at the input of inverter 356. The resulting "1" at the input of the MOTOR CONTROLLING sub-block 354 will start the motor 562 rotating in the "forward" direction. The belts 198 and 199 will move the piece of scrip 130 further inwardly of the scrip transport 30; and, as the trailing edge of that piece of scrip moves beyond the actuator 164, the switch 162 will re-open. Thereupon, a "1" will appear on conductor 264 and inverter 476 will apply a "0" to conductor 268. The resulting "0" will appear at the lower input of NOR gate 414 in the VALIDATE ENABLE block 412; and that "0" will coact with the "0" at the upper input of that NOR gate to cause that NOR gate to apply a "1" to the middle input of NOR gate 416. That "1" will not be significant at this time because conductor 330 is applying a "1" to the upper input of that NOR gate; but that "1" will cause NOR gate 416 to continue to apply a "0" to the input of inverter 422 after the "1" on conductor 330 is changed to a "0". The "0" on conductor 268 will be applied to the lower input of NAND gate 360, and that NAND gate will apply a "1" to the input of inverter 362; but the resulting "0" at the lower input of NOR gate 353 will not change the output of that NOR gate, because conductor 330 is still applying a "1" to the upper input of that NOR gate. The "0" on conductor 268 also will be applied to the C input of multiplexer 296 in the MULTIPLEXER block 288; and that "0" will coact with the "0's" at the A and B inputs to tend to connect the output terminal to the source of twelve volts which is connected to input terminal zero of that multiplexer.

The "1" on conductor 264 will be applied to the lower input of NAND gate 242 in the TIMING block 230, and it will cause that NAND gate to apply a "0" to conductor 282 and to the input of inverter 244. The "0" on conductor 282 will appear at the lower input of NAND gate 434 in the REVERSE LATCH block 426 and it will make certain that NAND gate 434 will continue to develop a "1" on conductor 436. The inverter 244 will respond to the "0" at the input thereof to apply a "1" to the lower input of NAND gate 246; but that "1" will not be effective at this time because binary output terminal eight of the BINARY COUNTER 238 will be applying a "0" to the upper input of that NAND gate. The "0" on conductor 268 will be applied to the upper input of NOR gate 236; and that "0" will coact with the "0" on conductor 284 to cause that NOR gate to apply a "1" to the lower input of NOR gate 232. The resulting "0" at the output of NOR gate 232 will permit the BINARY COUNTER 238 to start counting again.

Approximately 134 milliseconds later, when the count reaches eight, a "1" will be applied to the upper input of NAND gate 246; and that NAND gate will apply a "0" to conductor 286, and hence to the interconnected middle and lower inputs of NAND gate 308 of the electronic latch 307 in the ACCEPT LATCH block 304. That electronic "latch" will thereupon change the "0" on conductor 284 back to a "1" and will change the "1" on conductor 330 back to a "0". The "1" on conductor 284 will be applied to the middle input of NAND gate 434 in the electronic "latch" 437, but that "1" will not change the output of that NAND gate because conductor 282 is applying a "0" to the lower input of that NAND gate. The "0" on conductor 330 will be applied to the upper input of NOR gate 416 in the VALIDATE ENABLE block 412, but that "0" will not be effective at this time because NOR gate 414 is applying a "1" to the middle input of that NOR gate. The "0" on conductor 330 also will be applied to the upper input of NOR gate 353 in the MOTOR START AND RUN block 348; and that NOR gate will apply a "1" to the anode of diode 355. The resulting forward biasing of that diode will apply a "1" to the input of inverter 356; and the resulting "0" at the input of the MOTOR CONTROLLING sub-block 354 will cause the motor 562 to come to rest. By this time, the piece of scrip 130 will have been discharged from the scrip transport 30 and will have been moved into a suitable receiving area within the vending machine.

The "1" which conductor 284 applies to the lower input of NOR gate 236 in the TIMING block 230 of FIG. 21 will cause that NOR gate to apply a "0" to the lower input of NOR gate 232. The resulting "1" at the output of that NOR gate will be applied to the reset input of BINARY COUNTER 238, and thereby will cause all of the output terminals of that BINARY COUNTER to reset to "0" and to remain at "0". The "1" which conductor 284 applies to the upper input of NAND gate 396 in the BLOCKING FINGER CONTROL block 370 will coact with the "1" at the output of inverter 394 to cause that NAND gate to apply a "0" to the input of inverter 398. That inverter will apply a "1" to the lower input of NAND gate 376, to the left-hand input of capacitor 400, and to the base of transistor 406. The "1" at the lower input of NAND gate 376 will coact with the "1" at the upper input of that NAND gate to apply a "0" to the lower input of NOR gate 364 and to the input of inverter 378. The "0" at the lower input of NOR gate 364 will be ineffective at this time, but the "0" at the input of inverter 378 will cause that inverter to apply a "1" to the upper input of NOR gate 380. The "1" which was applied to the left-hand terminal of capacitor 400 will be applied to the lower input of NOR gate 380; and that NOR gate will apply a "0" to the input of inverter 382. The resulting "1" at the output of that inverter will be applied to the base of transistor 386, and will render that transistor conductive. The resulting flow of current from the source of 24 volts via solenoid 388 and the collector-emitter circuit of transistor 386 will energize that solenoid and will cause it to pull the blocking member 178 upwardly to the position of FIG. 9. As that blocking member moves upwardly, the switch 494 in the SWITCH BLOCK 452 of FIG. 23 will be re-opened. The capacitor 400 and the resistor 402 constitute an RC network which will act to keep a "1" at the lower input of NOR gate 380 for a short time after the inverter 398 applies a "1" to the left-hand terminal of that capacitor. The "1" which inverter 398 applies to the base of transistor 406 will render that transistor conductive, but the major portion of the current flowing through solenoid 388 will flow through the transistor 386.

As the switch 494 re-opens, inverter 508 will have a "1" applied to the input thereof; and the resulting "0" will be applied to the upper input of NAND gate 376 in the BLOCKING FINGER CONTROL block 370. The resulting "1" at the lower input of NOR gate 364 will not be effective at this time, but the "1" at the input of inverter 378 will cause that inverter to apply a "0" to the upper input of NOR gate 380. At this time, the "1" which was applied to the lower input of NOR gate 380 will have changed to a "0", and hence that NOR gate will apply a "1" to the input of inverter 382. The resulting "0" at the base of transistor 386 will render that transistor non-conductive. However, sufficient current will flow from the source of twenty-four volts via solenoid 388, resistor 408, and the collector-emitter circuit of transistor 406 to keep that solenoid energized. As a result, the fingers 180 and 181 on the blocking member 178 will be kept out of the passageway defined by the platens 40 and 118, and the switch 494 will be kept open.

The "0" which conductor 266 applies to the Inhibit input of the multiplexer 296 will permit the twelve volts at the zero input of that multiplexer to appear at the output of that multiplexer and hence on conductor 302. The "0" on conductor 266 also will be applied to the lower input of NOR gate 235; but that "0" will be effective at this time, because conductor 264 is applying a "1" to the input of that NOR gate. At this time, the scrip validator is in its at-rest condition; and it will remain in that condition until a further piece of scrip or other object is inserted in the scrip transport 30.

Validation Of Authentic Piece of Scrip: The FREQUENCY DETECTOR sub-block 526 in the DETECTION block 512 of FIG. 16 includes two timers 537 and 521 which are wired to act as monostable multivibrators, an NPN transistor 547, two inverters 557 and 561 and a NOR gate 559. As indicated hereinbefore, RCA 4017 timers are very useful, and two such timers are shown in FIG. 25. The sub-block 526 coacts with an inverted-inputs AND gate 565 and an inverter 563 which are located within the counter 540 to constitute a digital filter. That inverted-inputs AND gate and that inverter have been used to take the place of the usual coincidence gate at the output of a digital filter, because they were available and because they obviated the cost of providing such a gate. Although that inverted-inputs AND gate and that inverter are located in the counter 540, they will be considered hereinafter as being in, and as being integral parts of, the FREQUENCY DETECTOR 526.

As one of the patterns on the piece of scrip 130 engages and moves past the air gap of the magnetic head 210, that magnetic head will generate narrow pulses and apply them to the input of amplifier 514. Because those pulses were generated as a result of the engagement of an authentic pattern with that air gap, the amplitudes of those pulses will amply exceed the threshold level of that amplifier. However, that threshold level is made high enough to keep the amplifier 514 from responding to pulses which are generated as a simulated piece of scrip, which has insufficient amounts of magnetic ink in the lines thereof, is being sensed.

The amplified pulses from the amplifier 514 are applied to the input of the PEAK DETECTOR 516. As explained hereinbefore, that PEAK DETECTOR will respond to those amplified pulses to develop positive-going pulses whose positive-going edges are coincident in point of time with the trailing edges of the positive-going amplified pulses from the amplifier 514 — and hence precisely represent the trailing edge-to-edge spacing of the lines in the pattern which is being sensed. The use of a peak detector rather than of a slope detector or of an amplitude detector makes it possible for the DETECTION block 512 to make highly precise determinations of the trailing edge-to-edge spacings of the lines in a sensed pattern and hence of the authenticity of that pattern. Specifically, the output of the PEAK DETECTOR 516 will always represent the edge of a sensed line, whereas the output of a slope detector or the output of an amplitude detector could — depending upon the amplitude and hence the slope of an amplified pulse corresponding to a sensed line — represent any of an infinite number of indeterminate and variable points intermediate the leading edge and the center of that sensed line.

The positive-going pulses from the PEAK DETECTOR 516 will be applied to capacitor 518 and resistor 520 which act as an edge detector; and that capacitor and resistor will develop positive-going spikes in response to these positive-going pulses from that PEAK DETECTOR. Those positive-going spikes will closely represent the trailing edge-to-edge spacing of the lines in the pattern which is being sensed. The capacitor 518 and the resistor 520 will coact with the inverter 522 to provide negative-going square waves of uniform width and configuration; and inverter 524 will invert those square waves and apply them to the inputs of FREQUENCY DETECTORS 526 and 527 and of inverter 542.

The positive-going square waves from inverter 524 are applied to the input of inverter 542; and the latter inverter will apply the resulting negative-going square waves to the input of the ENVELOPE DETECTOR 548. As pointed out hereinbefore, that ENVELOPE DETECTOR will respond to the negative-going square waves which correspond to an authentic pattern to develop a "1" at the output thereof which is continuous throughout the sensing of that pattern and from approximately eight milliseconds thereafter. As that ENVELOPE DETECTOR develops the "1" at the output thereof, that "1" will appear at the upper input of NAND gate 552. At the time switch 156 was closed, the VALIDATE ENABLE block 412 applied a "0" to the lower input of NOR gate 584 in the DETECTION block 512. That "0" coacted with "0's" at the upper and middle inputs of that NOR gate to cause that NOR gate to apply a "1" to the lower input of NAND gate 552. Consequently, as the ENVELOPE DETECTOR 548 applies the "1" at the output thereof to the upper input of NAND gate 552, that NAND gate will remove the "1" which it has been applying to the re-set inputs of counters 540 and 582 and which has been holding those counters re-set.

The "1" at the output of the ENVELOPE DETECTOR 548 also is applied to the upper inputs of NAND gates 550 and 554; and, because "1's" are being applied to the lower inputs of those NAND gates, "0's" will appear at the outputs of those NAND gates. The resulting removal of "1" from the re-set inputs of the flip-flops 556 and 567 will condition those flip-flops to respond to signals from the outputs of the counters 540 and 582.

Although each of the FREQUENCY DETECTORS 526 and 527 will receive the positive-going square waves from the inverter 524, one of those FREQUENCY DETECTORS will be set to respond to one frequency whereas the other of those FREQUENCY DETECTORS will be set to respond to a different frequency. For purposes of illustration it will be assumed that FREQUENCY DETECTOR 526 will respond to the frequencies which are developed as each of the patterns 132, 137 and 139 passes under magnetic head 210 and that FREQUENCY DETECTOR 527 will respond to frequencies which are developed as the pattern 135 passes under that magnetic head. In addition, it will be assumed that the FREQUENCY DETECTOR 606 in the DETECTION block 590 will respond to frequencies which are developed as each of the patterns 136 and 141 passes under magnetic head 208 and that FREQUENCY DETECTOR 618 will respond to frequencies which are developed as each of patterns 134 and 138 passes under magnetic head 208.

As the pattern 132 engages and passes the air gap of the magnetic head 210, the FREQUENCY DETECTOR 526 will develop and will apply to the counter 540, a number of pulses which correspond to one less than the total number of lines in the pattern 132. The first square wave which inverter 524 applies to the input of FREQUENCY DETECTOR 526 will merely activate that FREQUENCY DETECTOR; and it will not cause that FREQUENCY DETECTOR to supply a pulse to the counter 540. However, all succeeding square waves from the inverter 524 will cause the FREQUENCY DETECTOR 526 to supply corresponding numbers of pulses to the counter 540.

One of the output terminals of counter 540 is connected to the clock terminal of flip-flop 556; and the numeric value of that output terminal must be two or more and must be one less than the number of lines which are to be counted as an indication of the authenticity of a pattern on the piece of scrip 130. As the appropriate line of pattern 132 passes beyond the air gap of magnetic head 210, counter 540 will apply a "1" to the clock input of flip-flop 556. At such time, the Data input of that flip-flop, which is connected to the source of plus twelve volts, will be connected to the conductor 586, and thus will apply a "1" to the SIGNAL DECODING block 674, and to the upper input of NOR gate 584. Simultaneously, the lower output of flip-flop 556 will change the state thereof from a "1" to a "0" and will tend to apply that "0" to the lower input of NAND gate 550. However, the capacitor 560 and the resistor 558 constitute an RC network which will tend to maintain the "1" at the lower input of that NAND gate, and will thereby delay the resetting of the flip-flop 556 — which will occur as soon as the "1" at the lower input of that NAND gate changes to a "0".

The "1" which the upper output of flip-flop 556 applies to the upper input of NOR gate 584 will cause that NOR gate to apply a "0" to the lower input of NAND gate 552 and thereby establish a "1" at the output of that NAND gate — and hence at the re-set terminals of counters 540 and 582 to re-set those counters. As long as the capacitor 560 remains charged, the value of the lower input of NAND gate 550 will be a "1" and hence the re-set input of flip-flop 556 will remain at "0"; and, therefore, the counters 540 and 582 will remain re-set. The time constant of the RC network constituted by capacitor 560 and resistor 558 will be very short, and hence the NAND gate 550 will apply a "0" to the re-set input of flip-flop 556 very shortly after that flip-flop applied the "1" to conductor 586; and, thereupon the "1" at the upper output of that flip-flop, and hence at the re-set terminals of counters 540, and 582, will be changed to a "0". The counter 540 will be able to, and will, count any further pulses from the FREQUENCY DETECTOR 526; but the number of such further pulses will be less than the numeric value of the output terminal of that counter which is connected to the clock input of flip-flop 556. This is so because the total number of lines in each of the patterns 132, 134, 135, 136, 137, 139 and 141 does not exceed twice the numeric value of that output terminal; and hence the total of said further pulses can not cause the counter 540 to count up to its pre-set value. Approximately eight milliseconds after that pattern has moved beyond the air gap of the magnetic head 210, the ENVELOPE DETECTOR 548 will again apply a "0" to the upper input of NAND gate 552 and that ENVELOPE DETECTOR will maintain that "0" at the input of NAND gate 552 until another pattern moves into engagement with the air gap of the magnetic head 210. That "0" at the input of NAND gate 552 will cause that NAND gate to apply a "1" at the re-set terminals of the counters 540 and 582, and will re-set and maintain those counters reset until another pattern moves into engagement with the air gap of the magnetic head 210. All of this means that the DETECTION block 512 will respond to the sensing of the pattern 132 to apply a momentary "1" to conductor 586. "0's" will continue to appear on all of the conductors 588, 670 and 672; and hence the DETECTION blocks 512 and 590 will apply a "1" and three "0's" to the SIGNAL DECODING block 674 via conductors 586, 588, 670 and 672.

The DETECTION blocks 512 and 590 will apply those same four signals via those same four conductors when pattern 137 or pattern 139 is being sensed. However, when pattern 135 is being sensed, the FREQUENCY DETECTOR 527 and the counter 582 will respond to the square waves from the inverter 524 to cause the DETECTION block 512 to apply a "1" to conductor 588. At such time, "0's" will appear on conductors 586, 670 and 672; and hence the DETECTION blocks 512 and 590 will apply a "1" and three "0's" to the SIGNAL DECODING block 674 via conductors 588, 586, 670 and 672. When pattern 134 or 138 is being sensed, the FREQUENCY DETECTOR 618 and the counter 620 will respond to the square waves from the inverter 524 to cause the DETECTION block 590 to apply a "1" to conductor 672. At such time, "0's" will appear on conductors 586, 588 and 670; and hence the DETECTION blocks 512 and 590 will apply a "1" and three "0's" to the signal decoding block 674 via conductors 672, 586, 588 and 670. When pattern 136 or 141 is being sensed, the FREQUENCY DETECTOR 606 and the counter 608 will respond to the square waves from the inverter 524 to cause the DETECTION block 590 to apply a "1" to conductor 570. At such time, "0's" will appear on conductors 586, 588 and 672; and hence the DETECTION blocks 512 and 590 will apply a "1" and three "0's" to the SIGNAL DECODING block 674 via conductors 670, 586, 588 and 672.

In the drawing and accompanying description the switches 146, 156 and 162 are switches which have movable and stationary contacts and which have actuators which respond to the leading and trailing edges of bills to move those movable contacts. However, if desired, photoelectric cells and other bill-sensing devices could be substituted for the switches 146, 156 and 162. Consequently, it will be recognized that the term "switch" as used herein includes photo cells and other bill-sensing devices. Further, in the accompanying description certain wave-forms have been described as square waves; as used herein, square waves refers to any wave-form having a shape that is approximately square or rectangular, and that may have a duty-cycle other than fifty-percent.

Operation Of Scrip Validator By Pieces Of Scrip Having Same Data Field 1 But Different Data Fields 2 Or 3: If a given piece of scrip has the same data field 1 as the piece of scrip 130, the scrip validator will respond to the sensing of that field to permit a "0" to continue to appear at the lower input of NOR gate 980 in the DATA FIELD AND VALIDATION block 940 in FIG. 20. If that given piece of scrip has any one of three specifically-different data fields 2 or if it has any one of three specifically-different data fields 3, that piece of scrip will be accepted by the scrip validator.

In the foregoing description of the operation of the scrip validator in response to the insertion of the piece of scrip 130, it was pointed out that a data field 2 which included pattern 137 as the leading pattern thereof and pattern 138 as the second pattern thereof set certain flip-flops in the DATA FIELD 2 FLIP-FLOP block 750 and caused NOR gate 800 to apply a "0" to the upper input of NOR gate 980. Also, that description showed a data field 3 which included pattern 139 as the leading pattern thereof and pattern 141 as the second pattern thereof set certain flip-flops in the DATA FIELD 3 FLIP-FLOP block 760 and caused NOR gate 810 to apply a "0" to the middle input of NOR gate 980. As described hereinafter, that scrip validator will be able to respond to pieces of scrip which have the same data field 1 as the piece of scrip 130 but which have data fields 2 and 3 which differ from the data fields 2 and 3 of the piece of scrip 130.

For example the scrip validator could respond to pieces of scrip which have a data field 2 that utilizes a leading pattern with a line spacing corresponding to the frequency of either of the FREQUENCY DETECTORS 526 and 527 in DETECTION block 512 and which utilizes a second pattern with a line spacing corresponding to the frequency of either of the FREQUENCY DETECTORS 606 and 618 in DETECTION block 590. Also, the scrip validator could respond to pieces of scrip which have a data field 3 that utilizes a leading pattern with a line spacing corresponding to the frequency of either of the FREQUENCY DETECTORS 526 and 527 in DETECTION block 512 and which utilizes a second pattern with a line spacing corresponding to the frequency of either of the FREQUENCY DETECTORS 606 and 618 in DETECTION block 590. Because the patterns 132, 137 and 139 all have the same line spacings, because both of the patterns 134 and 138 have the same line spacings, and because both of the patterns 136 and 141 have the same line spacings, the following description of pattern combinations will refer only to patterns 132, 134, 135 and 136.

Specifically, a piece of scrip with patterns 132 and 134 in data field 2 thereof and with patterns 132 and 134 in data field 3 thereof will cause the scrip validator to energize the relay coil 914 in sub-block 896 of the PRICE LINE RELAY block 894, and a piece of scrip with patterns 132 and 134 in data field 2 thereof and with patterns 135 and 136 in data field 3 thereof will cause the scrip validator to energize the relay coil 914 in sub-block 900. Further, a piece of scrip with patterns 132 and 136 in data field 2 thereof and with patterns 132 and 134 in data field 3 thereof will cause the scrip validator to energize the relay 914 in sub-block 902; a piece of scrip with patterns 132 and 136 in data field 2 thereof and with patterns 132 and 136 in data field 3 thereof will cuase the scrip validator to energize the relay 914 in sub-block 904; and a piece of scrip with patterns 132 and 136 in data field 2 thereof and with patterns 135 and 136 in data field 3 thereof will cause the scrip validator to energize the relay 914 in sub-block 906. In addition, a piece of scrip with patterns 135 and 136 in data field 2 thereof and with patterns 132 and 134 in data field 3 thereof will cause the scrip validator to energize the relay 914 in sub-block 908; a piece of scrip with patterns 135 and 136 in data field 2 thereof and with patterns 132 and 136 in data field 3 thereof will cause the scrip validator to energize the relay 914 in sub-block 910; and a piece of scrip with patterns 135 and 136 in data field 2 thereof and with patterns 135 and 136 in data field 3 thereof will cause the scrip validator to energize the relay 914 in sub-block 912. In this way, the scrip validator can respond to pieces of scrip which have the same data field 1 but which have different data fields 2 and 3 to selectively energize any one of the relay coils 914 in the PRICE LINE RELAY block 894.

Vending Machine Is Usable To Supply Desired Product Or Service: If, at the time the patron of the vending machine makes a selection, that vending machine is unable to supply the desired product or service, the patron may decide to select another product or service or may decide to effect the return of his piece of scrip. To effect the return of his piece of scrip, he will close the switch 490 in the RETURN SCRIP block 478 of FIG. 23. Thereupon, the light-emitting diode in the opto-coupler 484 will become illuminated, and the light-sensitive element in that opto-coupler will become conductive. Conductor 481 will then apply a "0" to the upper input of NAND gate 432 of the electronic "latch" 437 in the REVERSE LATCH block 426; and that electronic "latch" will apply a "1" to conductor 435 and a "0" to conductor 436. The "0" on conductor 436 will be applied to the upper input of NOR gate 364, but that NOR gate will continue to develop a "0" at the output thereof because conductor 439 is applying a "1" to the lower input of that NOR gate. The "0" on conductor 436 also will be applied to the input of inverter 438, and that inverter will apply a "1" to the bases of transistors 440 and 442. The resulting conductivity of transistor 442 will illuminate lamp 450 in the vending machine and indicate that the piece of scrip will be returned to the patron. The resulting conductivity of transistor 440 will apply a "0" to the MOTOR CONTROLLING sub-block 354, via conductor 333; and that sub-block will shift relay contacts therein from their "forward" to their "reverse" positions. The "1" on conductor 435 will be applied to the lower input of NOR gate 416 in the VALIDATE ENABLE block 412; and the resulting "0" at the output of that NOR gate will cause inverter 422 to apply a "1" to conductor 424 — with consequent parallel loading of shift register 942 in DATA FIELD AND VALIDATION block 940 of FIG. 20, with consequent re-setting of flip-flop 978 and of counters 954 and 982, with consequent re-setting of the flip-flops in DATA FIELD 2 FLIP-FLOP block 750, with consequent re-setting of the flip-flops in the DATA FIELD 3 FLIP-FLOP block 760, and with the application of a re-setting "1" to the DETECTION blocks 512 and 590 in FIGS. 16 and 17. The re-setting of counter 982 will remove the validation signal "1" on conductor 276 and the validation "0" on conductor 260.

At this time, a "1" will be applied to the upper input of NOR gate 392 in the BLOCKING FINGER CONTROL block 370, and the resulting "0" at the output of that NOR gate will be applied to the upper inputs of NOR gates 460 and 468 and to the input of inverter 394.

The "0's" at the upper inputs of NOR gates 460 and 468 will again make those NOR gates responsive to the states of switches 146 and 156, and the inverter 394 will apply a "1" to the lower input of NAND gate 396. That "1" will coact with the "1" which conductor 284 is applying to the upper input of that NAND gate to cause that NAND gate to apply a "0" to the input of inverter 398. The resulting "1" at the output of that inverter will be applied to the lower input of NAND gate 376, to the left-hand terminal of capacitor 400 and to the base of transistor 406. NAND gate 376 will respond to that "1" and to the "1" at the upper input thereof to apply a "0" to the lower input of NOR gate 364 in the MOTOR START AND RUN block 348, and also to the input of inverter 378. That NOR gate will respond to that "0" and to the "0" at the upper input thereof to apply a "1" to the anode of diode 366, thereby forward biasing that diode and causing a "1" to appear at the input of inverter 356. The resulting "0" at the input of MOTOR CONTROLLING sub-block 354 will keep the motor 356 de-energized until the solenoid 388 has become energized and has raised the blocking member 178 to the position of FIG. 9. The "0" at the input of inverter 378 will cause that inverter to apply a "1" to the upper input of NOR gate 380; and the resulting "0" at the input of inverter 382 will cause that inverter to apply a "1" to the base of transistor 386. The resulting conductivity of that transistor will cause solenoid 388 to become energized and to raise the blocking member 178 upwardly to the position of FIG. 9.

The "1" on conductor 260 also will be applied to the upper input of NAND gate 360; and that NAND gate will coact with inverter 362 to apply a "1" to the lower input of NOR gate 353. The resulting "0" at the output of that NOR gate will back bias diode 355; but the "1" at the cathode of diode 366 will cause inverter 356 to keep the motor 562 de-energized. The "1" which conductor 260 applies to the upper input of NAND gate 240 is not effective at this time because at least one of the binary output terminals four and thirty-two is applying a "0" to that NAND gate.

The "0" on conductor 276 will be applied to the upper input of NAND gate 892 in FIG. 19 and that NAND gate and inverter 890 will apply a "0" to the base of transistor 876 to render that transistor non-conductive. At this time, all of the diodes 874 in the PRICE LINE ENABLE block 850 will be back biased, and hence all of the relay coils 914 in the PRICE LINE RELAY block 894 will be kept de-energized. The "0" on conductor 276 will also appear at the lower input of NOR gate 292, and that NOR gate will apply a "1" to the input terminal one, and hence to input terminals three and seven of multiplexer 296; but the output of that multiplexer will continue to be connected to input terminal four.

As the blocking member 178 moves up to the position of FIG. 9, it will re-open the switch 494; and the resulting "0" on conductor 266 will be applidd to the lower input of NAND gate 892 in FIG. 19, but that NAND gate will not change the state of the output thereof. The conductor 266 also will apply a "0" to the Inhibit terminal of the multiplexer 296, and that multiplexer will respond to that "0" to re-connect the output terminal thereof to input terminal four thereof, and hence to input terminal six thereof; and hence a "1" will continue to appear on conductor 302. Further, the "0" on conductor 266 will be applied to the lower input of NOR gate 235; and that NOR gate will respond to that "0", and to the "0" which is applied to the upper input thereof by conductor 264, to apply a "1" to the middle input of NOR gate 232. The resulting "0" at the re-set input of BINARY COUNTER 238 will again permit the BINARY COUNTER to start counting. In addition, the "0" on conductor 266 will be applied to the upper input of NAND gate 376 in the BLOCKING FINGER CONTROL block 370; and the resulting "1" at the output of that NAND gate will be applied to the lower input of NOR gate 364 and to the input of inverter 378. That inverter will apply a "0" to the upper input of NOR gate 380; and that "0" and the "0" at the lower input of that NOR gate will enable that NOR gate to apply "1" to inverter 382 — with consequent application of a "0" to the base of transistor 386. Although the transistor will become non-conductive, the continued conductivity of transistor 406 will keep the solenoid 388 energized, and thereby will enable that solenoid to continue to hold the fingers 180 and 181 of the blocking member 178 out of the passageway defined by the platens 40 and 118. The "1" which was developed at the output of NAND gate 376 also will be applied to the lower input of NOR gate 364 in the MOTOR START AND RUN block 348, and the "0" which will appear at the output of that NOR gate will back-bias diode 366. The resulting "0" at the input of inverter 356 will cause that inverter to apply a "1" to the MOTOR CONTROLLING sub-block 354 to start the motor 562. However, as explained hereinbefore, conductor 333 is applying a "0" to that MOTOR CONTROLLING sub-block; and hence the motor 562 will start operating in the reverse direction, all as pointed out in the said Carter et al application.

As the belts 198 and 199 move the piece of scrip outwardly toward the platform 32, that piece of scrip will engage the actuator 158 and re-close switch 156. The resulting "1" on conductor 262 will be applied to the upper input of NOR gate 414; but that "1" will not be effective at this time because conductor 268 is applying a "1" to the lower input of that NOR gate. The "1" which conductor 262 applies to the lower input of NOR gate 392 will not be effective at this time, because conductor 260 has been applying a "1" to the upper input of that NOR gate. The "1" which conductor 262 applies to the upper input of NOR gate 350 in the MOTOR START AND RUN block 348 will cause that NOR gate to apply a "0" to the input of inverter 352, and that inverter will apply a "1" to the middle input of NOR gate 353; that "1" will not be effective at this time because NAND gate 360 and inverter 362 are applying a "1" to the lower input of that NOR gate. The "1" on conductor 262 also will be applied to the upper input of NOR gate 232 in the TIMING block 230 of FIG. 21, but that "1" will not be significant at this time because NOR gate 235 is applying a "1" to the middle input of that NOR gate. Further, the "1" on conductor 262 will be applied to the B input of multiplexer 296, and that "1" will coact with the "1" at the C input of that multiplexer to connect input terminal six, and hence input terminal four, to the output terminal of that multiplexer. However, the output of that multiplexer is not significant at this time because the "electronic latch" 437 in the REVERSE LATCH block 426 has been latched. Also at the time switch 156 is re-closed, a "0" will be applied to conductor 272, and hence to the middle input of NAND gate 242 in the TIMING block 230. Although that "0" will not be effective at this time, because conductor 264 is applying a "0" to the lower input of that NAND gate, that "0" will cause that NAND gate to continue to develop a "1" at the output thereof after the piece of scrip moves beyond the actuator 164 and permits the switch 162 to re-open. As the motor 562 continues to operate in the reverse direction, the belts 198 and 199 will move the piece of scrip into engagement with the actuator 148 and thereby re-close switch 146. The resulting "1" on conductor 274 will appear at the lower input of NOR gate 350 in the MOTOR START AND RUN block 348; but that "1" will not be effective at this time, because conductor 262 is applying a "1" to the upper input of that NOR gate. The "1" on conductor 274 will be applied to the A input of multiplexer 296, and it will coact with the "1's" at the B and C inputs to cause the signal at input terminal seven, and hence at input terminals one and three, to appear at the output terminal of that multiplexer. However, that signal will not be significant because the electronic "latch" 437 in the REVERSE LATCH block 426 is still latched. At the time the switch 146 re-closed, a "0" appeared on conductor 270 and was applied to the upper input of NAND gate 242. Although that "0" was not significant at that time, because conductors 272 and 264 were applying "0's" to the middle and lower inputs of that NAND gate, that "0" will enable that NAND gate to continue to develop a "1" at the output thereof after switches 162 and 156 re-open.

Continued operation of the motor 562 in the reverse direction will cause the belts 198 and 199 to move the piece of scrip outwardly beyond the actuator 164 of switch 162 and thereby permit that switch to re-open. The resulting "0" on conductor 268 will be applied to the lower input of NOR gate 414 in the VALIDATE ENABLE block 412, but that "0" will not be significant at this time because conductor 262 is applying a "1" to the upper input of that NOR gate. The "0" which conductor 268 applies to the lower input of NAND gate 360 in the MOTOR START AND RUN block 348 will cause that NAND gate to apply a "1" to the input of inverter 362. The resulting "0" at the lower input of NOR gate 353 will not be effective at this time because inverter 352 is applying a "1" to the middle input of that NOR gate. The "0" which conductor 268 applies to the C input of multiplexer 296 will cause that multiplexer to apply the signal at input terminal three thereof, and hence at input terminals one and seven thereof, to the output of terminal of that multiplexer and hence to conductor 302. However, that signal is not significant at this time, because the electronic "latch" 327 is still latched. The "0" which conductor 268 applies to the upper input of NOR gate 236 will not be significant at this time, because conductor 284 continues to apply a "1" to the lower input of that NOR gate. As switch 162 re-opened, the "1" on conductor 264 will be applied to the lower input of NAND gate 242 and to the upper input of NOR gate 235. The "1" at the lower input of NAND gate 242 will not be significant at this time, but the "1" at the upper input of NOR gate 235 will cause that NOR gate to apply a "0" to the middle input of NOR gate 232. However, NOR gate 232 will continue to develop a "0" to the output thereof because conductor 262 is applying a "1" to the upper input thereof.

The motor 562 will continue to operate in the reverse direction, and it will cause the belts 198 and 199 to move the piece of scrip outwardly beyond the actuator 158 and thereby permit switch 156 to re-open. The resulting "0" on conductor 262 will change the "1" at the upper input of NOR gate 414 in the VALIDATE ENABLE block 412 back to a "0", and that NOR gate will apply a "1" to the middle input of NOR gate 416. The latter NOR gate will continue to develop a "0" at the output thereof, because the electronic "latch" 437 will continue to apply a "1" to the lower input of that NOR gate. The "0" which conductor 262 applies to the lower input of NOR gate 392 will not be significant at this time, because conductor 260 will continue to apply a "1" to the upper input of that NOR gate. The "0" which conductor 262 applies to the upper input of NOR gate 350 will not be significant at this time, because conductor 274 will be applying a "1" to the lower input of that NOR gate. The "0" which conductor 262 applies to the B input of multiplexer 296 will cause that multiplexer to apply the signal at input terminal one thereof, and hence at input terminals three and seven thereof, to the output terminal of that multiplexer. However, because the electronic "latch" 437 is still latched, any signal on conductor 302 will not be significant. The "0" which conductor 262 applies to the upper input of NOR gate 232 will enable that NOR gate to re-apply a "1" to the re-set input of BINARY COUNTER 238. Thereupon, that BINARY COUNTER will be re-set, and "0's" will appear at all of the output terminals thereof. The "1" which appears on conductor 272 as switch 156 re-opens is applied to the middle input of NAND gate 242; but that "1" will not be significant at this time, because conductor 270 will still be applying a "0" to the upper input of that NAND gate.

Continued operation of the motor 562 in the reverse direction will cause the belts 198 and 199 to move the piece of scrip outwardly beyond the actuator 148 of switch 146 and thereby permit that switch to re-open. The resulting "1" on conductor 270 will be applied to the upper input of NAND gate 242 in the TIMING block 230, and it will cause that NAND gate to apply a "0" to the input of inverter 244 and also to conductor 282. The resulting "1" at the output of that inverter will be applied to the lower input of NAND gate 246, but that "1" will not be significant at this time because output terminal eight of the BINARY COUNTER 238 is applying a "0" to the upper input of that NAND gate. The "0" on conductor 282 will be applied to the lower input of NAND gate 434 in the REVERSE LATCH block 426 to re-set the electronic "latch" of which that NAND gate is a part. The "0" which NAND gate 432 develops at the output thereof as the switch 146 is re-opened will be applied to the lower input of NOR gate 416; but that "0" will not be effective at this time because NOR gate 414 will continue to apply a "1" to the middle input of NOR gate 416.

The "1" which appears at the output of NAND gate 434 as the electronic "latch" is re-set, will be applied to the lower input of NAND gate 432 and also to the conductor 436. The consequent "1" at the upper input of NOR gate 364 in the MOTOR START AND RUN block 348 will not be significant at this time, because NAND gate 376 has been applying a "1" to the lower input of that NOR gate. The "1" which conductor 436 applies to the input of inverter 438 will cause that inverter to apply a "0" to the bases of transistors 440 and 442. The resulting rendering of transistor 442 non-conductive will permit the lamp 450 to become dark; and the resulting rendering of transistor 440 non-conductive will cause conductor 333 to apply a "1" to the MOTOR CONTROLLING sub-block 354, thereby permitting the relay contacts in that sub-block to return to their "forward" positions. Simultaneously, the "0" which appeared on conductor 274, as the switch 146 reopened, will cause NOR gate 350 to apply a "1" to the input of inverter 352; and that inverter will apply a "0" to the middle input of NOR gate 353. That NOR gate will apply a "1" to the anode of diode 355 and thereby forward bias that diode, thereby causing a "1" to appear at the input of inverter 356. The resulting application of a "0" to the MOTOR CONTROLLING sub-block 354 will cause the motor 562 to come to rest. The "0" on conductor 274 will be applied to the A input terminal of the multiplexer 296; and hence the output of that multiplexer will be connected to the twelve volts at the zero input of that multiplexer — to permit a "1" to continue to appear on conductor 302.

At this time, all of the mechanical and electronic components of the scrip validator will be in the re-set conditions described hereinbefore in the section entitled At-Rest Condition Of Scrip Validator. Also at this time, the piece of scrip will be resting on the platform 32 where it can be retrieved by the patron.

Operation of Scrip Validator When A Piece Of Scrip Is Inserted To Which Scrip Validator Should Not Respond: If a given piece of scrip, which is inserted in the scrip transport 30, has one or more of the eight patterns thereof provided with line spacings which differ from the spacings of the lines in the various patterns on the piece of scrip 130, that given piece of scrip will be rejected by the scrip validator. Specifically, if any one of the four patterns in the data field 1 on a piece of scrip has a line spacing which is different from the line spacing in the corresponding patterns on the piece of scrip 130, the EXCLUSIVE OR gate 738 will not find a coincidence at the inputs thereof as that pattern is being sensed by the appropriate magnetic head. The lack of coincidence at the inputs of that EXCLUSIVE OR gate will cause that EXCLUSIVE OR gate to apply a "1" to the J input of flip-flop 978 in the DATA FIELD AND VALIDATION block 940. During the subsequent application of a clocking pulse to the clock input of that flip-flop, that flip-flop will become set and will apply a steady "1" to the lower input of NOR gate 980. If all of the data field 1 patterns on a given piece of scrip are acceptable but either of the data field 2 patterns is not acceptable, NOR gate 800 will continue to apply a "1" to the upper input of NOR gate 980. If all of the data field 1 patterns on a given piece of scrip are acceptable, and if both of the data field 2 patterns are acceptable, but either of the data field 3 patterns is not acceptable, NOR gate 810 will continue to apply a "1" to the middle input of NOR gate 980. Subsequently, at the conclusion of the sensing of that given piece of scrip, the shift register 942 will cause NAND gate 964, resistor 975, capacitor 977 and inverter 972 to apply a "1" to the clock input of counter 982, the "0" at the data input of that counter will cause that counter to continue to apply a "0" to the conductor 276 and to the input of inverter 988 — thereby preventing the development of the "1" validation signal on conductor 276 and of the "0" validation signal on conductor 260.

The "0" on conductor 276 will continue to cause NAND gate 892 and inverter 890 in FIG. 19 to apply a "0" to the base of transistor 876. Consequently, that transistor will continue to back bias all of the diodes 874 in the sub-blocks of the PRICE LINE ENABLE block 850, and thereby keep all of the relays 914 in the PRICE LINE RELAY block 894 de-energized. The continued "1" on conductor 260 will cause NOR gate 392, inverter 394, NAND gate 396, inverter 398 and transistor 406 in the BLOCKING FINGER CONTROL block 370 to keep the solenoid 388 energized, and thereby will cause that solenoid to keep the blocking member 178 in its raised position. The continued "1" on conductor 260 will coact with NAND gate 360, inverter 362, NOR gate 353, diode 355 and inverter 356 of the MOTOR START AND RUN block 348 to cause the MOTOR CONTROLLING sub-block 354 to continue to keep the motor 562 energized. As that motor continues to cause the belts 198 and 199 to move the given piece of scrip inwardly of the scrip transport 30, the BINARY COUNTER 238 in the TIMING block 230 of FIG. 21 will continue to count.

Approximately six hundred and one milliseconds after switch 156 was closed, the BINARY COUNTER 238 will apply "1's" to the middle and lower inputs of NAND gate 240; and those "1's" will coact with the continued "1" on conductor 260 to cause that NAND gate and conductor 278 and inverter 290 in the MULTIPLEXER block 288 to apply "1's" to the upper inputs of NOR gates 292 and 294. NOR gate 292 will apply a "0" to input terminal one, and hence to input terminals three and seven, of MULTIPLEXER 296; and NOR gate 294 will apply a "0" to input terminal four, and hence to input terminal six of that multiplexer. At this time, all of the numbered input terminals of the multiplexer 296 will have "0's" applied thereto. The resulting "0" at the output terminal of that multiplexer will be applied by conductor 302 to the middle input of NAND gate 432; and, thereupon, the electronic "latch" 437 will be set, and it will cause the motor 562 to reverse and to continue to operate in the reverse direction until the given piece of scrip was moved outwardly into position on the platform 32 — all as explained hereinbefore in detail in the section entitled Vending Machine Is Unable To Supply The Desired Product Or Service.

The hereinbefore-described continued application of a "0" to the Data input of counter 982 in the DATA FIELD AND VALIDATION block 940 occurred because the line spacing in at least one of the patterns on the given piece of scrip was not the same as the line spacing of the corresponding pattern on the piece of scrip 130. Even if the line spacings in all of the patterns on a given piece of scrip were exactly the same as the line spacings in the corresponding patterns on the piece of scrip 130, the scrip validator would reject that given piece of scrip if the paper of that piece of scrip or the printing or engraving of the lines in those patterns was not top quality. Specifically, a poor quality paper or specifically a low quality printing or engraving of any of the lines on a given piece of scrip could, by causing the effective trailing edge-to-edge spacings of some of the lines in a given pattern to be different from the effective trailing edge-to-edge spacings of other of the lines in that pattern, make the PEAK DETECTORS 516 and 594 apply pulses to the FREQUENCY DETECTORS 526, 527, 606 and 618 which would not define a fixed frequency. Consequently, those FREQUENCY DETECTORS would be unable to supply signals to the counters with which they are associated that would cause counter 982 in the DATA FIELD AND VALIDATION block 940 to develop validation signals.

In addition, a low-quality printing or engraving of any of the lines on a given piece of scrip could, by causing some or all of those lines to have insufficient magnetic intensity, render the amplifiers 514 and 592 incapable of supplying signals to the PEAK DETEC- TORS 516 and 594. Specifically, the insufficient magnetic intensity in those lines could make the pulses, which were generated by the appropriate magnetic heads as those lines were sensed, too small to equal the threshold values of those amplifiers.

If any pattern on a piece of scrip does not have sufficient lines of the correct spacing to cause one of the counters 540, 582, 608 and 620 to count up to its pre-set count, neither of the DETECTION blocks 512 and 590 will provide an output, and hence the counter 982 in the DATA FIELD AND VALIDATION block 940 will not develop any validation signals. As explained hereinbefore in the section entitled Validation Of Authentic Piece Of Scrip, the digital filters in the FREQUENCY DETECTORS 526, 527, 606 and 618 are actuated by, but do not count, the first line of any pattern; and hence each of the patterns on the piece of scrip 130 has at least one more line than the total number of counts for which the corresponding counter is set. Consequently, if each pattern of a given piece of scrip does not have at least one more line of the correct spacing than the number of counts required by the corresponding counter, the scrip validator will reject that given piece of scrip.

If a pattern on a piece of scrip has a number of lines which at least equals one more than the number of counts required by the corresponding counter, and if, for any reason, one of those lines is incapable of causing the amplifier, the PEAK DETECTOR, or the edge detector to provide a proper signal to the digital dilter of the corresponding FREQUENCY DETECTOR, that digital filter would be unable to cause its counter to count that line. Furthermore that digital filter would be unable to cause its counter to count the next-succeeding line; because that digital filter would respond to that next-succeeding line to be actuated again but could not respond to that next-succeeding line to provide a count. The overall result is that the scrip validator will reject pieces of scrip which are not made of high quality paper and which do not have patterns thereon wherein the lines are printed or engraved lines of high quality.

If a given piece of scrip is made so the line spacing in each of the eight patterns thereon matches the line spacing of one or more of the eight patterns on the piece of scrip 130, and if the paper of, and the printing or engraving in the lines of each of the eight patterns on, that piece of scrip are of high quality, but if the patterns in data field 1 of that given piece of scrip do not have the exact sequence of the patterns in data field 1 of the piece of scrip 130, that given piece of scrip will be rejected. Consequently, to be accepted, each piece of scrip which is inserted in the scrip transport 30 must have a data field 1 that has the same patterns, and the same sequence of patterns, which the piece of scrip 130 has. This is due to the fact that the shift register 720 has been wired to pre-program four full pattern succession combinations therein, and the patterns in the data field 1 on each given piece of scrip must provide signals on the conductors 708, 710 and 712 which will enable the partially pre-programmed shift register 718 to successively match those pattern sequence combinations.

Specifically, as shown by Sections A, B, C and D of TABLE I hereof, shift register 720 is pre-wired to automatically develop four specifically-different combinations of "1's" and "0's" in stages five, six and seven thereof as the patterns 132, 134, 135 and 136 on any piece of scrip are successively sensed. If that piece of scrip can cause the DETECTION blocks 512 and 590 to apply signals to the fifth, sixth and seventh input terminals of shift register 718 which always exactly match the states of the fifth, sixth and seventh stages of shift register 720, that piece of scrip will be accepted. However, if during the sensing of a piece of scrip, even one of the signals applied to the fifth, sixth and seventh terminals of shift register 718 fails to exactly match the state of the corresponding stage of shift register 720, that piece of scrip will be rejected.

It should also be noted that the scrip validator will reject any piece of scrip which causes any counter therein to reach its predetermined count while the COMPARISON REGISTER block 716, the DATA FIELD 2 FLIP-FLOP block 750, the DATA FIELD 3 FLIP-FLOP block 760, the CLOCK GENERATOR block 918, and the DATA FIELD AND VALIDATION block 940 are processing the signal which another of the counters provided in response to the sensing of the preceding pattern. This is due to the fact that the conductor 714 will have a "1" applied thereto immediately after any of the counters 540, 582, 608 and 620 reaches its predetermined count; and if that "1" on conductor 714 is developed before it should be developed, the CLOCK GENERATOR block 918 would not be re-set to develop a further set of clock pulses, and the parallel loading of shift register 718 could prevent the attainment of the requisite comparisons shown by TABLE I hereof.

Further it should be noted that the scrip validator will reject any piece of scrip which has a pattern thereon in which the total number of lines exceeds twice the numeric value of the output terminal of the counter connected to the FREQUENCY DETECTOR corresponding to that pattern. Specifically, that pattern will cause that counter to twice clock the flip-flop to which that counter is connected; and the resulting extra "1" which that flip-flop will apply to the SIGNAL DECODING block 674 will cause that block to apply signals which will simulate a pattern that will not match the pattern-recognition data stored in the memory which is constituted by the shift registers 720, 722 and 724. As a result, the scrip validator will not be able to develop a "1" validation signal on conductor 276 and a "0" validation signal on conductor 260, and hence the motor 562 will reverse and the transistor 876 in FIG. 19 will remain non-conductive.

Other Rejection Modes Of Scrip Validator: If a person were to try to record on a magnetic tape, disc or card signals which he hoped could cause the magnetic heads 208 and 210 to develop signals comparable to the signals which the piece of scrip 130 causes those magnetic heads to develop, that person would have to align that magnetic tape, disc or card with those magnetic heads. In doing so, that person would align that magnetic tape, disc or card with the U-shaped permanent magnet 48; and, as that magnetic tape, disc or card was moved inwardly of the scrip transport 30, the magnetic field from that U-shaped permanent magnet would erase the data recorded on that magnetic tape, disc or card. Thereupon, that magnetic tape, disc or card would act as a blank piece of paper and it would be rejected by the scrip validator, all as explained hereinafter.

If, somehow, the "1" validation signal were to appear on conductor 276 at a time when switch 146 is closed, the multiplexer 296 would apply a "0" to conductor 302 and thereby effect the reversal of motor 562 — regardless of the states of switches 156 and 162. Specifically, if switch 146 was closed and both of switches 156 and 162 were open, the multiplexer 296 would connect the output terminal thereof to input terminal one thereof; and the "1" validation signal on conductor 276 would cause NOR gate 292 to apply a "0" to that input terminal one — with consequent application of a "0" to conductor 302, and immediate reversal of the motor 562.

If switch 156 as well as switch 146 closed at the time a "1" validation signal appeared on conductor 276, the output terminal of multiplexer 296 would be connected to input terminal three, and hence to input terminal one. The "0" which would appear at the output of NOR gate 292 would cause the multiplexer 296 to apply a "0" to conductor 302, with consequent application of a "0" to conductor 302, and immediate reversal of the motor 562.

If switches 156 and 162 were already closed at the time switch 146 closed, and if the "1" validation signal appeared on conductor 276, input terminal seven of the multiplexer 296, and hence input terminal one, would be connected to the output terminal of that multiplexer.

The resulting application of a "0" to conductor 302 would cause immediate reversal of the motor 562.

In the event switch 156 did, somehow, happen to close while switches 146 and 162 were open, the "0" which always appears at input terminal two of the multiplexer 296 would be applied to the output terminal of that multiplexer. Consequently, the conductor 302 would have a "0" thereon, and it will cause the motor 562 to reverse.

Similarly, if switches 146 and 162 could, somehow, ever close while the switch 156 was open, the "0" which always appears at input terminal five of multiplexer 296 would be applied to the output terminal of that multiplexer. The resulting "0" on conductor 302 would cause immediate reversal of the motor 562.

If switches 146 and 156 were held closed for approximately six hundred and one milliseconds after the latter switch was closed, but no validation signals were developed, the scrip validator would reverse the motor 562. Specifically, binary output terminals four and thirty-two of the BINARY COUNTER 238 would apply "1's" to the middle and lower inputs of NAND gate 240; and those "1's" would coact with the "1's" which conductor 260 applies to the upper input of that NAND gate to cause that NAND gate to apply a "0" to conductor 278. Inverter 290 would respond to that "0" to apply a "1" to the upper inputs of NOR gates 292 and 294; and the resulting "0" at the output of NOR gate 292 would appear at input terminal three of multiplexer 296. Because switches 146 and 156 would be closed, that multiplexer would apply the "0" at input terminal three thereof to the output terminal thereof, and hence to conductor 302. Thereupon, the motor 562 would reverse.

If switches 146, 156 and 162 were held closed for approximately six hundred and one milliseconds after switch 156 was closed, but no validation signals were developed, the scrip validator would reverse the motor 562. Specifically, binary output terminals four and thirty-two of the BINARY COUNTER 238 would apply "1's" to the middle and lower inputs of NAND gate 240, and those "1's" would coact with the "1" which conductor 260 applies to the upper input of that NAND gate to cause that NAND gate to apply a "0" to conductor 278. Inverter 290 would respond to that "0" to apply "1's" to the upper inputs of NOR gates 292 and 294; and NOR gate 292 would then apply a "0" to input terminal seven of multiplexer 296. That multiplexer would apply that "0" to the output terminal thereof, and hence to conductor 302 — with consequent reversal of the motor 562.

If switches 156 and 162 were held closed for approximately six hundred and one milliseconds after the former switch was closed, but no validation signals were developed, the scrip validator would reverse the motor 562. Specifically, binary output terminals four and thirty-two of the BINARY COUNTER 238 would apply "1's" to the middle and lower inputs of NAND gate 240; and those "1's" would coact with the "1" which conductor 260 applies to the upper input of that NAND gate to cause that NAND gate and inverter 290 to apply "1's" to the upper inputs of NOR gates 292 and 294. The latter NOR gate would apply a "0" to input terminal six of multiplexer 296; and the resulting "0" at the output terminal of that multiplexer would appear on conductor 302 — with consequent reversal of the motor 562.

If switch 162 was held closed for approximately six hundred and one milliseconds after switch 156 was closed, but no validation signals were developed — as would be the case if a blank piece of paper was inserted in the scrip transport 30 — the scrip validator would reverse the motor 562. Specifically, binary output terminals four and thirty-two of the BINARY COUNTER 238 would apply "1's" to the middle and lower inputs of NAND gate 240; and those "1's" would coact with the "1" which conductor 260 applies to the upper input of that NAND gate to cause that NAND gate and inverter 290 to apply "1's" to the upper inputs of NOR gates 292 and 294. NOR gate 294 would apply a "0" to input terminal four of multiplexer 296; and the resulting application of that "0" to conductor 302 would cause reversal of the motor 562.

If during the operation of the scrip validator, the switch 162 was in its closed condition when the "0" validation signal on conductor 260 was being applied to the upper input of NAND gate 240, and when the BINARY COUNTER 238 was applying a "1" to conductor 280, as it will do approximately one thousand and sixty-nine milliseconds after switch 156 was closed, NOR gate 294 would apply a "0" to input terminal six, and hence to input terminal four, of the multiplexer 296. Thereupon, a "0" would appear at the output terminal of that multiplexer and hence on conductor 302 — with resulting reversal of the motor 562.

If during the operation of the scrip validator the switches 156 and 162 are in the closed conditions when the "0" validation signal on conductor 260 was being applied to the upper input of NAND gate 240, and when the BINARY COUNTER 238 was applying a "1" to conductor 280, as it will do approximately 1069 milliseconds after switch 156 was closed, NOR gate 294 would apply a "0" to input terminal six of the multiplexer 296. Thereupon, a "0" would appear at the output terminal of that multiplexer and hence on conductor 302 — with resulting reversal of the motor 562.

If, as the piece of scrip 130 is moved inwardly beyond the slots 171 and 172, a person inserts an object which keeps the blocking member 178 from moving downwardly to the blocking position of FIGS. 3 and 4, the switch 494 will remain open. Subsequently, when the counter 982 develops the "1" validation signal on conductor 276 and the "0" validation signal on conductor 260, the continued open state of that switch will effect rejection of that piece of scrip and will prevent the dispensing of any product or service. Specifically, the NAND gate 892 of FIG. 19 will not have a "1" applied to the lower input thereof, and hence will not be able to coact with inverter 890 to render transistor 876 conductive. Further, NOR gate 235 in the TIMING block 230 of FIG. 21 will not have a "1" applied to the lower input thereof, and hence will not coact with NOR gate 232 to apply a re-setting "1" to the re-set imput of the BINARY COUNTER 238; and hence that BINARY COUNTER will continue to count. Approximately 1069 milliseconds after switch 156 was closed, the BINARY COUNTER 238 will apply a "1" to conductor 280 and hence to the lower input of NOR gate 294; and that NOR gate will apply a "0" to input terminal six, and hence to input terminal four of the multiplexer 296. Thereupon, a "0" will appear at the output terminal of that multiplexer and hence on conductor 302 — with resulting reversal of the motor 562.

If a person inserts an object in the scrip transport 30 and holds switch 146 closed for a time interval longer than eighteen seconds, an RC network in the MOTOR CONTROLLING sub-block 354 will automatically reverse the motor 562. Such reversal is explained in detail in the said Carter et al application.

Conclusion: During the time interval between the development by counter 982 of the "1" and "0" validation signals and the actuation of switch 336 or 490 in the vending machine by a patron, the piece of scrip 130 will be at rest in the passageway defined by the platens 40 and 118. At that time, the fingers 180 and 181 on the blocking member 178 will be in the blocking position shown by FIGS. 3 and 4; and those blocking fingers will resist all efforts of a patron to raise them — all as explained in the said Pescetto application. Further, after the belts 198 and 199 have moved a piece of scrip inwardly beyond the toothed members 216 and 218, those toothed members can resist all efforts of a patron to retrieve that piece of scrip — all as explained in the said Pescetto application.

The piece of scrip 130 has four patterns in data field 1 thereof and has two patterns in each of data fields 2 and 3 thereof. If desired, fewer than four patterns could be used in data field 1 on a piece of scrip if the scrip validator were to be modified for use in an area where high security was not required. Correspondingly, if desired, more than four patterns could be provided for data field 1, if unusually high security problems had to be met. The use of two patterns in each of data fields 1 and 2 makes it possible to use one scrip validator to control a considerable number of price selections in a vending machine. However, if it ever became desirable to control substantially greater numbers of price selections, it would only be necessary to pre-program the shift registers 772, 724 and 942 to enable each of them to provide three pattern succession combinations, to increase the capacities of the blocks in FIG. 19, and to add an additional pattern to data field 2 and/or data field 3 of each piece of scrip.

It should be noted that the signals which the DETECTION blocks 512 and 590 apply to the conductors 586, 588, 670 and 672 perform two important but entirely diverse functions. First, those signals indicate the authenticity and identity of the sensed patterns; and second, those signals cause a "1" to appear on conductor 714, and thereby initiate and pre-determine the processing of the signals on conductors 586, 588, 670 and 672.

If a person or persons learned how to make simulations of pieces of scrip which would be accepted by a scrip validator, that scrip validator could easily be modified to prevent the acceptance of any further such simulations. Specifically, one or more of the timer modules 528, 571, 573 and 575 could be removed and replaced by timer modules which had distinctively different frequencies. Any such removal and replacement could be effected quickly and easily because those various timer modules are made as plug-in circuit boards. Once the substitution had been accomplished, new scrip which had corresponding patterns thereon would have to be used. Alternatively, one or more of the pre-wired connections to shift registers 718 and 720 could be changed, the timer modules 528, 571, 573 and 575 could be set in different positions, and new scrip would be used. For maximum increase in security, new timer modules would be used and one or more of the pre-wired connections to shift registers 718 and 720 would be changed.

In the preferred embodiment of the present invention, each of the counters 540, 582, 608 and 620 will be reset each time the total count in that counter reaches the value set for that counter. If desired, each of those counters could be arranged so it could respond to a higher-than-desired number of lines in a pattern to provide two consecutive signals to the SIGNAL DECODING block 674 without requiring that counter to be re-set. Specifically, the presently-shown output terminal of counter 540 and a higher-value terminal of that counter could be connected together and to the SIGNAL DECODING block 674 so that counter would supply a first signal when that counter reached the presently-set value and would automatically supply a second signal if the total number of lines in a pattern caused the count in that counter to match the higher-value terminal. In such an arrangement, a pulse-stretching element, such as a monostable multivibrator, could be interposed between the interconnected outputs of counter 540 and the input of SIGNAL DECODING block 674; and the signal from the envelope detector 548 could be suitably used to effect resetting of that counter when the pattern had moved past the magnetic head 210. Further, in such an arrangement, the flip-flop 556, the AND gate 550, the resistor 558, and the capacitor 560 could be eliminated. Moreover, in such an arrangement, if the count within the counter 540 causes that counter to supply two signals to the SIGNAL DECODING block 674, during the scanning of any pattern on a piece of scrip, the validator will reject that piece of scrip — in the same manner in which that validator will reject a piece of scrip if any of the counters 540, 582, 608 and 620 provides two output signals during the scanning of any pattern on that piece of scrip.

Whereas the drawing and accompanying description have shown and described a preferred embodiment of the present invention, it should be apparent to those skilled in the art that various changes may be made in the form of the invention without affecting the scope thereof.

What we claim is:

1. A validator which responds to a plurality of spaced lines in a pattern on a document to help determine the authenticity of said document and which comprises a sensor that scans said pattern to produce a signal having a frequency corresponding to the spacing of said plurality of lines in said pattern, a digital filter, and a counter which receives signals supplied by said digital filter, said digital filter responding to the developing of said signal by said sensor to determine whether the lines of said plurality of lines have a predetermined spacing, said digital filter responding to the first line in said pattern to become actuated and responding to the remainder of said plurality of lines in said pattern to supply to said counter signals corresponding to the number of said remaining lines of said plurality of lines in said pattern if all of said remainder of said lines in said pattern have the same predetermined spacing, said counter requiring a predetermined minimum number of signals, which corresponds to a predetermined minimum number of lines that have said predetermined spacing, before it can provide a predetermined output signal, said digital filter and said counter coacting to indicate that a pattern on said document is authentic if said pattern has a predetermined minimum number of lines that have said predetermined spacing, said digital filter not responding to patterns consisting of lines which do not have said predetermined spacing, and said counter not developing said predetermined output signal when said sensor senses a pattern which consists of an insufficient number of lines having said predetermined spacing, whereby said digital filter and said counter can distinguish between patterns that have said predetermined minimum number of lines with said predetermined spacing and patterns which either do not have a plurality of lines with said predetermined spacing or do not have enough of said lines that have said predetermined spacing.

2. A validator as claimed in claim 1 wherein said counter develops said predetermined output signal whenever the count therein reaches a pre-set value, and wherein said digital filter and said counter can indicate that a pattern on said document is authentic only if the total number of lines in said plurality of lines of said pattern which have said same predetermined spacing does not exceed a pre-set maximum.

3. A validator as claimed in claim 1 wherein said counter develops said predetermined output signal whenever the count therein reaches a pre-set value, wherein a sub-circuit responds to said predetermined output signal to develop data which is to be compared with stored data, wherein said validator will reject said document if said sub-circuit receives two successive predetermined output signals during the scanning of the same pattern and thereby is caused to repeat said developed data, and wherein said counter is re-set each time the count therein reaches said pre-set value.

4. A validator as claimed in claim 1 wherein said digital filter and said counter will indicate that a pattern is not authentic if said pattern has exactly said predetermined minimum number of lines and if any two of said lines are spaced apart a distance substantially greater than said predetermined spacing.

5. A validator which comprises a sensor that can scan a plurality of patterns on a document to develop signals, each of said patterns including a plurality of spaced lines so said sensor will develop a first plurality of signals as it scans the first of said patterns and will develop a second plurality of signals as it scans a subsequent one of said patterns, a circuit which should have a given signal applied thereto from the instant said sensor begins to develop said first plurality of signals from said first of said patterns until said sensor stops developing said first plurality of signals, an envelope detector, and means applying signals to the input of said envelope detector in response to the development by said sensor of said first plurality of signals as said sensor scans said plurality of lines of said first of said patterns, said means applying further signals to the input of said envelope detector in response to the development by said sensor of said second plurality of signals as said sensor scans said subsequent one of said patterns, said envelope detector responding to the application of the first of said first plurality of signals to the input thereof to provide said given signal and apply said given signal to said circuit, said envelope detector responding to the application of a succession of rapidly-recurring signals to said input thereof to maintain said given signal and to continue to apply said given signal to said circuit as long as said sensor develops a succession of rapidly-recurring signals in response to the scanning of said first of said patterns, said envelope detector not responding to any signals which said means applies to it when said sensor is scanning portions of said document intermediate said first and said subsequent one of said patterns, said envelope detector responding to the application of a further succession of rapidly-recurring signals to said input thereof to maintain said given signal and to continue to apply said given signal to said circuit as long as said sensor develops a succession of rapidly-recurring signals in response to the scanning of said subsequent one of said patterns.

6. A validator as claimed in claim 5 wherein said circuit normally maintains a re-setting signal at the re-set terminal of a counter, and wherein said circuit responds to said given signal to remove said re-setting signal from said re-set terminal of said counter, whereby said envelope detector will permit said counter to be in its re-set condition before and after said sensor responds to each of said patterns to develop said signals but will cause said circuit to remove said re-setting signal from said re-set terminal of said counter while said sensor responds to each said pattern to develop said signals.

7. A validator as claimed in claim 5 wherein a frequency detector receives signals corresponding to said signals which are developed by said sensor as said sensor scans said pattern, wherein said frequency detector is connected to a pulse-counting counter and supplies countable pulses to said counter, wherein said circuit normally maintains a re-setting signal at the re-set terminal of said counter, and wherein said circuit responds to said given signal to remove said re-setting signal from said re-set terminal of said counter, whereby said envelope detector will permit said counter to be in its re-set condition before and after said sensor responds to each of said patterns to develop said signals but will cause said circuit to remove said re-setting signal from said re-set terminal of said counter while said sensor responds to said patterns to develop said signals.

8. A validator which has a decoding means with inputs and outputs, a plurality of conductors extending to said inputs of said decoding means, sensing means that responds to a plurality of specifically-different patterns on a document to cause various distinctively-different combinations of signals corresponding to and identifying said patterns to be applied to said conductors and hence to said inputs of said decoding means, and further conductors extending from said outputs of said decoding means, said further conductors being fewer in number than the first said conductors, said decoding means responding to said various combinations of signals to apply further combinations of signals to said further conductors which are specifically-different from said various combinations of signals but which correspond to and identify said patterns on said document.

9. A validator which comprises a sensor that can respond to a plurality of lines on a document to develop signals corresponding to said lines, means that senses and counts those signals from said sensor which have the same predetermined frequency, whereby said sensor and said means can coact to determine the number of lines on said document which have a pre-set spacing and can coact to cause said means to develop an output signal whenever said number of lines, on said document which have said pre-set spacing, reaches a predetermined value, said means including a counter which develops said output signal, said lines on said document constituting a pattern, a sub-circuit that responds to said output signal to develop data which is to be compared with stored data, said validator rejecting said document if said sub-circuit receives two successive output signals during the scanning of the same pattern and thereby is caused to repeat said developed data, and said counter developing two output signals during the scanning of the said pattern if the total number of lines in said pattern which have said pre-set spacing exceeds a pre-set maximum.

10. A validator as claimed in claim 9 wherein said means includes a digital filter that determines which of said lines on said document have said pre-set spacing.

11. The combination of a validator and of documents for use with said validator wherein said validator responds to different documents to make different determinations, wherein each of said documents has a plurality of patterns thereon, wherein each document to be accepted by said validator has a common pattern thereon, wherein said validator has pattern-recognition components therein, wherein said pattern-recognition components respond to said common pattern to effect the acceptance of said documents, wherein said pattern-recognition components respond to other patterns on said documents to help said validator make said determinations, wherein each of said patterns has a plurality of spaced-apart lines, and wherein the number of spaced-apart lines in each pattern exceeds a predetermined minimum and is less than a predetermined maximum.

12. The combination of a validator and of a document for use with said validator wherein said validator has sensing means to sense a plurality of patterns on said document, comparing means that compares sensed data, which is obtained in response to the sensing of a pattern on said document, with preprogrammed data, and change-of-state devices which selectively respond to signals from said comparing means to change the states thereof, wherein said piece of scrip has a plurality of data fields thereon, each of said data fields having a plurality of patterns therein, and wherein said validator makes a plurality of comparisons of said sensed data with said pre-programmed data as a result of the sensing or each pattern, the number of change-of-state devices being less than the total number of comparisons, between said sensed data and said pre-programmed data, which are made as a result of the scanning of any data field on said document.

13. The combination claimed in claim 12 wherein a plurality of gates are connected to said change-of-state devices, and wherein said validator will respond to an authentic document to cause said sensing means, said comparing means, and said change-of-state devices to change the signals at the outputs of all but one of said gates.

14. A piece of scrip, for use in a validator which has a plurality of sensors that are spaced laterally relative to each other and that has a common utilization circuit which receives and responds to signals that are developed by both of said sensors, which has a plurality of patterns thereon that are disposable in register with one of said sensors and which has a second plurality of patterns thereon that are spaced laterally relative to the first said plurality of patterns and that are disposable in register with the other of said sensors, said piece of scrip being movable longitudinally relative to said sensors to provide sequential sensing of said patterns in said first said plurality of patterns and also to provide sequential sensing of said patterns in said second plurality of patterns, said first said plurality of patterns being so located relative to said second plurality of patterns that whenever said one sensor is sensing one of the patterns of said first said plurality of patterns the other sensor can not be sensing one of the patterns of said second plurality of patterns, said second plurality of patterns being so located relative to said first said plurality of patterns that whenever said other sensor is sensing one of the patterns of said second plurality of patterns said one sensor can not be sensing one of the patterns of said first said plurality of patterns, and each pattern of said first said plurality of patterns and each pattern of said second plurality of patterns being formed by a plurality of spaced-apart lines which have predetermined spacings, whereby said patterns are recognized by the spacing of said spaced-apart lines thereof.

15. A piece of scrip as claimed in claim 14 wherein said spaced-apart lines in said patterns on said piece of scrip extend transversely of said piece of scrip, and wherein the spacing of all of the spaced-apart lines in any given pattern is the same, whereby said sensors in said validator can respond to longitudinal movement of said piece of scrip at a predetermined speed relative to said sensors to develop and sense predetermined frequencies.

16. A validator which comprises document-moving members which can move a document, a reversible motor which can drive said document-moving members in the forward direction and in the reverse direction to move said document in the forward direction and in the reverse direction, a circuit which can cause said motor to drive said document-moving members in the reverse direction, a multiplexer which has control inputs and data inputs and an output, said output of said multiplexer being connected to said circuit, a plurality of position-responsive means which sense various positions into which said document-moving members move said document, said position-responsive means being connected to said control inputs of said multiplexer, and connections to said data inputs of said multiplexer which respond to various combinations of signals, applied to said control inputs of said multiplexer by said position-responsive means, to enable said output of said multiplexer to apply a signal to said circuit to cause said motor to drive said document-moving means in the reverse direction.

17. A validator as claimed in claim 16 wherein a blocking means is movable into blocking position to prevent withdrawal of said document from said validator but is movable into retracted position to permit movement of said document in the reverse direction, and an interlock between said blocking means and said multiplexer which inhibits said output of said multiplexer from applying a signal to said circuit to cause said motor to drive said document-moving members in the reverse direction whenever said blocking means is in said blocking position.

18. A validator as claimed in claim 16 wherein said validator responds to the insertion of a valid document to develop a validation signal, wherein a means responds to the development of said validation signal to apply a corresponding signal to one of said data inputs of said multiplexer, and wherein said multiplexer responds to said corresponding signal and to a signal from a given one of said position-responsive means to enable said output thereof to apply a signal to said circuit to cause said motor to drive said document-moving members in the reverse direction.

19. A validator as claimed in claim 16 wherein said position-responsive means are located so a given one of said position-responsive means should never at any time be the only position-responsive means sensing a document, and wherein said output of said multiplexer will apply a signal to said circuit to cause said motor to drive said document-moving members in the reverse direction if said one position-responsive member ever is the only position-responsive member sensing a document.

20. A validator as claimed in claim 16 wherein a first of said position-responsive means should sense a document when said document is adjacent said first position-responsive means or is adjacent both said first position-responsive means and a second position-responsive means but should not sense a document when said document is adjacent a third position-responsive means, and wherein said output of said multiplexer will apply a signal to said circuit to cause said motor to drive said document-moving members in the reverse direction if said first said and said third position-responsive means sense a document but said second position-responsive means does not.

21. A validator as claimed in claim 16 wherein a timer responds to the sensing of a document by a given one of said position-responsive means to start the timing of a specific time period, wherein one of said position-responsive means should sense a document during said specific time period, wherein said document-moving members should move said document away from said position-responsive means before the end of said specific time period, and wherein means responds to the continued sensing by said position-responsive means of said document at the end of said specific time period to apply a signal to a data input of said multiplexer which will enable said output of said multiplexer to apply a signal to said circuit to cause said motor to drive said document-moving members in the reverse direction.

22. A validator as claimed in claim 16 wherein a timer responds to the sensing of a document by a given one of said position-responsive means to start the timing of a specific timing period, wherein means responds to the timing out of said specific time period to apply a signal to a data input of said multiplexer, and wherein said output of said multiplexer will respond to the application of said signal to said data input of said multiplexer to apply a signal to said circuit to cause said motor to drive said document-moving members in the reverse direction if a different position-responsive means senses a document at the time said specific timing period times out.

23. A validator as claimed in claim 16 wherein said validator responds to the insertion of a valid document to develop a validation signal, wherein a means responds to the development of said validation signal to cause a timer to start the timing of a timing period, wherein one of said position-responsive means should sense a document during said timing period, wherein said document-moving members should move said document away from said one of said position-responsive means before the end of said timing period, and wherein means responds to the continued sensing by said one of said position-responsive means of said document at the end of said time period to apply a signal to a data input of said multiplexer which will enable said output of said multiplexer to apply a signal to said circuit to cause said motor to drive said document-moving members in the reverse direction.

24. A validator as claimed in claim 16 wherein said validator responds to the insertion of a valid document to develop a validation signal, wherein a means responds to the development of said validation signal to cause a timer to start the timing of a timing period, wherein one of said position-responsive means should sense a document during said timing period, wherein said document-moving members should move said document away from said one of said position-responsive means before the end of said timing period, wherein means responds to the continued sensing by said one of said position-responsive means of said document at the end of said time period to apply a signal to a data input of said multiplexer which will enable said output of said multiplexer to apply a signal to said circuit to cause said motor to drive said document-moving members in the reverse direction, wherein said validation-signal-responsive means comprises a switch associated with a blocking member that is selectively movable into and out of blocking position, wherein said blocking member is out of blocking position until said validation signal is developed, and wherein said blocking member moves into blocking position and said switch causes said timer to stop the timing of said timing period when said validation signal is developed.

25. A validator which has document-moving members, a motor to cause said document-moving members to move a document inwardly of said validator, blocking means to prevent withdrawal of said document from said validator, means to selectively permit said blocking means to be in blocking position or to move said blocking means out of blocking position, said motor being operable in the reverse direction to move said document out of said validator, an interlock which prevents energization of said motor in said reverse direction until after said blocking means has been moved out of blocking position, and a switch that is part of said interlock and that is actuated by said blocking means.

26. A validator which comprises document-moving members, a reversible motor to cause said document-moving members to move a document in the forward and reverse directions, blocking means selectively movable into blocking position to block withdrawal of a document and into retracted position to permit said document-moving members to move said document in the reverse direction, an accept latch which can be actuated to start said motor operating in the forward direction and can simultaneously prevent movement of said blocking means out of said blocking position, and a timer which starts a predetermined timing period as said accept latch is actuated and which will re-set said accept latch at the end of said timing period and will thereby permit said motor to come to rest and said blocking means to be moved out of blocking position and into retracted position.

27. A validator which comprises sensing means that can sense a plurality of predetermined patterns on a document in a predetermined sequence to effect the developing of sensed data, a first recognition circuit to which said sensed data is applied, a second recognition circuit to which said sensed data is applied, said sensing means responding to one of said predetermined patterns on said document to effect the developing of sensed data in the form of a signal to which said first recognition circuit will respond but to which said second recognition circuit can not respond, said sensing means responding to a second of said predetermined patterns of said document to effect the developing of sensed data in the form of a signal to which said second recognition circuit will respond but to which said first recognition circuit can not respond, said sensing means not responding to a spurious pattern to develop signals to which either of said recognition circuits will respond, said first recognition circuit normally having a first logic level signal at the output thereof but acting whenever it responds to sensed data corresponding to said one predetermined pattern on said document to develop a second logic level signal at said output thereof, said second recognition circuit normally having a third logic level signal at the output thereof but acting whenever it responds to sensed data corresponding to said second predetermined pattern on said document to develop a fourth logic level signal at said output thereof, preprogrammed means that can not respond to just one of said four logic level signals to develop pattern-recognition data but that responds in a predetermined way to the developing of a predetermined combination of two of said four logic level signals and that responds in a different predetermined way to the developing of a second and different predetermined combination of two of said four logic level signals, said pre-programmed means sensing the sequence in which the first said predetermined pattern-recognition data and said second and different predetermined pattern-recognition data were developed and thereby indicating the sequence in which said one predetermined pattern on said document and said second predetermined pattern on said document were sensed, further means responsive to the indication provided by said pre-programmed means to indicate whether the sequence of sensing of said one predetermined pattern on said document corresponds to the sequence of sensing of corresponding patterns on a valid and acceptable document, patterns of different value on said document being defined by differently spaced-apart lines, said sensed data developed by said sensing means being signals having different frequencies corresponding to the spacing of said differently spaced-apart lines, said recognition circuits including frequency detectors which respond to said different-frequency signals to help develop said second and said fourth logic signals, said frequency detectors being made in the form of printed circuits on removable circuit boards, and said validator being enabled to accept documents having patterns which are defined by spaced-apart lines having still-different spacings by replacing said frequency detectors with frequency detectors that are made in the form of printed circuits on removable circuit boards and that respond to still-different frequencies.

28. The combination of a validator and of documents for use with said validator wherein said validator responds to different documents to make different determinations, wherein each of said documents has a plurality of patterns thereon, wherein each document to be accepted by said validator has a common pattern thereon, wherein said validator has pattern-recognition components therein, wherein said pattern-recognition components respond to said common pattern to effect the acceptance of said documents, wherein said pattern-recognition components respond to other patterns on said documents to help said validator make said determinations, wherein said validator develops sensed data in response to the scanning of patterns, wherein said validator has pre-programmed data stored therein, wherein said validator has a coincidence detector, wherein said validator compares said sensed data with said pre-programmed data to develop signals and to apply said signals to said coincidence detector, wherein said validator repeatedly develops said signals in response to the sensing of each pattern, wherein said coincidence detector finds coincidence during the developing of signals in response to the sensing of said common pattern, and wherein said coincidence detector finds a coincidence and a lack of coincidence during the developing of signals in response to the sensing of each of said other patterns.

* * * * *